United States Patent
Divvi et al.

(10) Patent No.: US 12,452,769 B2
(45) Date of Patent: Oct. 21, 2025

(54) METHODS AND APPARATUS FOR DISCOVERING HIDDEN NETWORK SERVICE SET IDENTIFIERS

(71) Applicant: Charter Communications Operating, LLC, St. Louis, MO (US)

(72) Inventors: Venkata Divvi, Centennial, CO (US); Christopher Teague, Highlands Ranch, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 456 days.

(21) Appl. No.: 17/696,431

(22) Filed: Mar. 16, 2022

(65) Prior Publication Data

US 2023/0300719 A1  Sep. 21, 2023

(51) Int. Cl.
*H04W 48/08* (2009.01)
*H04W 48/16* (2009.01)

(52) U.S. Cl.
CPC ........... *H04W 48/08* (2013.01); *H04W 48/16* (2013.01)

(58) Field of Classification Search
CPC ............................. H04W 48/08; Y02D 30/70
See application file for complete search history.

(56) References Cited

U.S. PATENT DOCUMENTS

| | | | |
|---|---|---|---|
| 9,979,710 B2 | 5/2018 | Chu et al. | |
| 2014/0355523 A1* | 12/2014 | Congdon | H04W 48/12 370/328 |
| 2014/0365669 A1 | 12/2014 | Shamis et al. | |
| 2015/0085725 A1* | 3/2015 | Estevez | H04W 52/0206 370/311 |
| 2017/0070947 A1* | 3/2017 | Zhang | H04W 48/14 |
| 2020/0015043 A1* | 1/2020 | Patil | H04W 4/06 |
| 2022/0039051 A1* | 2/2022 | Ergen | G01S 5/0205 |

OTHER PUBLICATIONS

Notification of Transmittal of the International Search Report and the Written Opinion of the International Searching Authority, International Search Report and Written Opinion of the International Searching Authority from PCT/US2023/015186, dated Jun. 12, 2023, pp. 1-14.

(Continued)

*Primary Examiner* — Fabricio R Murillo Garcia
(74) *Attorney, Agent, or Firm* — Straub & Straub; Stephen T. Straub; Michael P. Straub

(57) ABSTRACT

The presentation invention relates to methods and apparatus for a mobile device to discover the hidden SSID of a network. An exemplary method embodiment includes the steps of: receiving, at the mobile device, a first beacon frame having a Service Set Identifier (SSID) field set to NULL from a first Access Point; determining, at the mobile device, based on information received from the first Access Point that the mobile device is provisioned to connect to a first network advertised by the first beacon frame; discovering, by the mobile device, a first SSID name for the first network advertised by the first beacon frame for which the mobile device is provisioned. In another embodiment the mobile device associates with the first network after discovering the first SSID name.

22 Claims, 28 Drawing Sheets

(56) References Cited

OTHER PUBLICATIONS

LAN/MAN Standards Committee of the IEEE Computer Society, IEEE Standard for Information Technology—Telecommunications and Information Exchange between Systems Local and Metropolitan Area Networks—Specific Requirements Part 11: Wireless LAN Medium Access Control (MAC) and Physical Layer (PHY) Specifications IEEE Std 802.11-2020, Dec. 3, 2020, 4379 pages, The Institute of Electrical and Electronics Engineers, Inc., 3 Park Avenue, New York, N.Y., 10016-5997, USA.

* cited by examiner

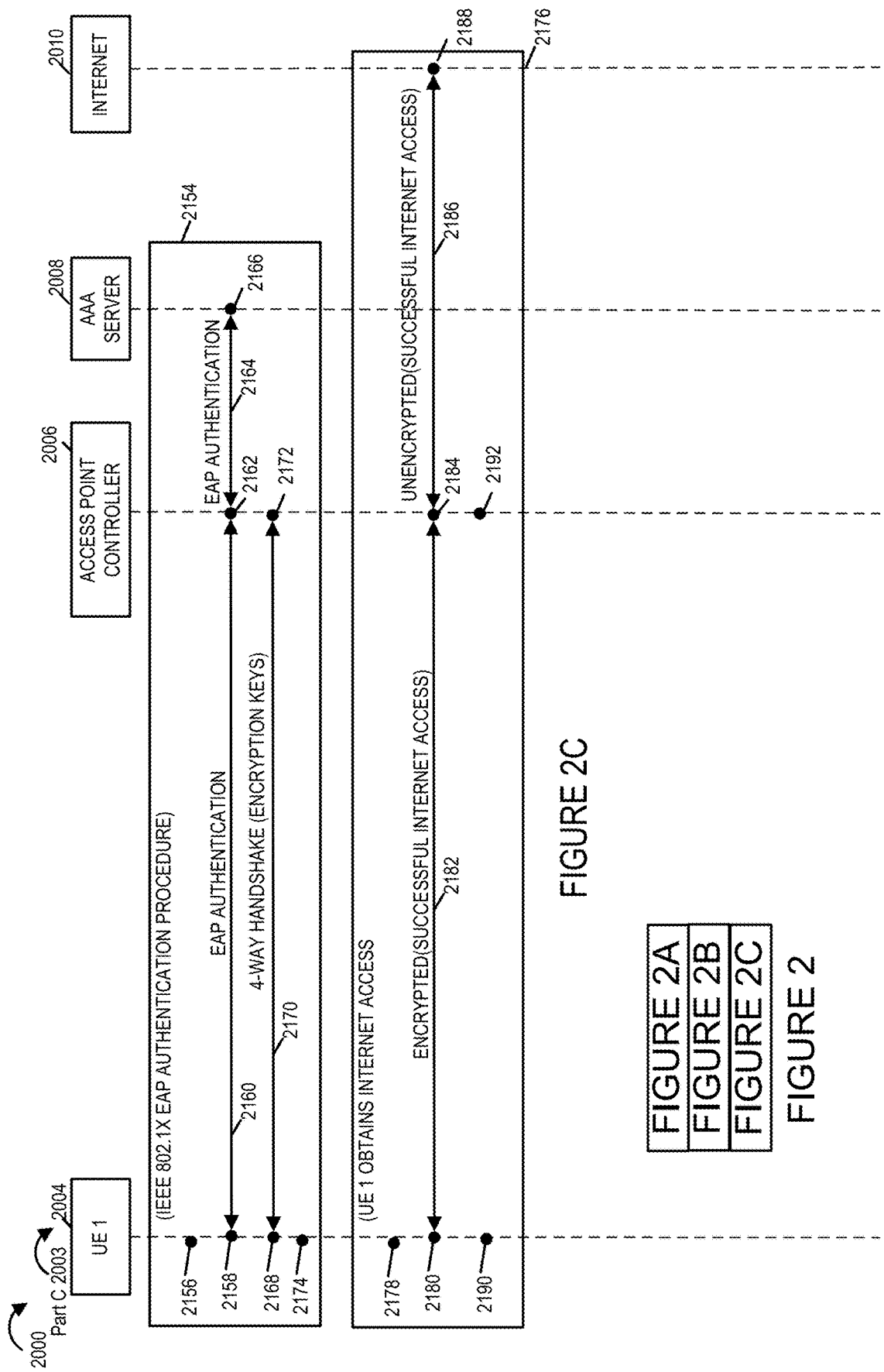

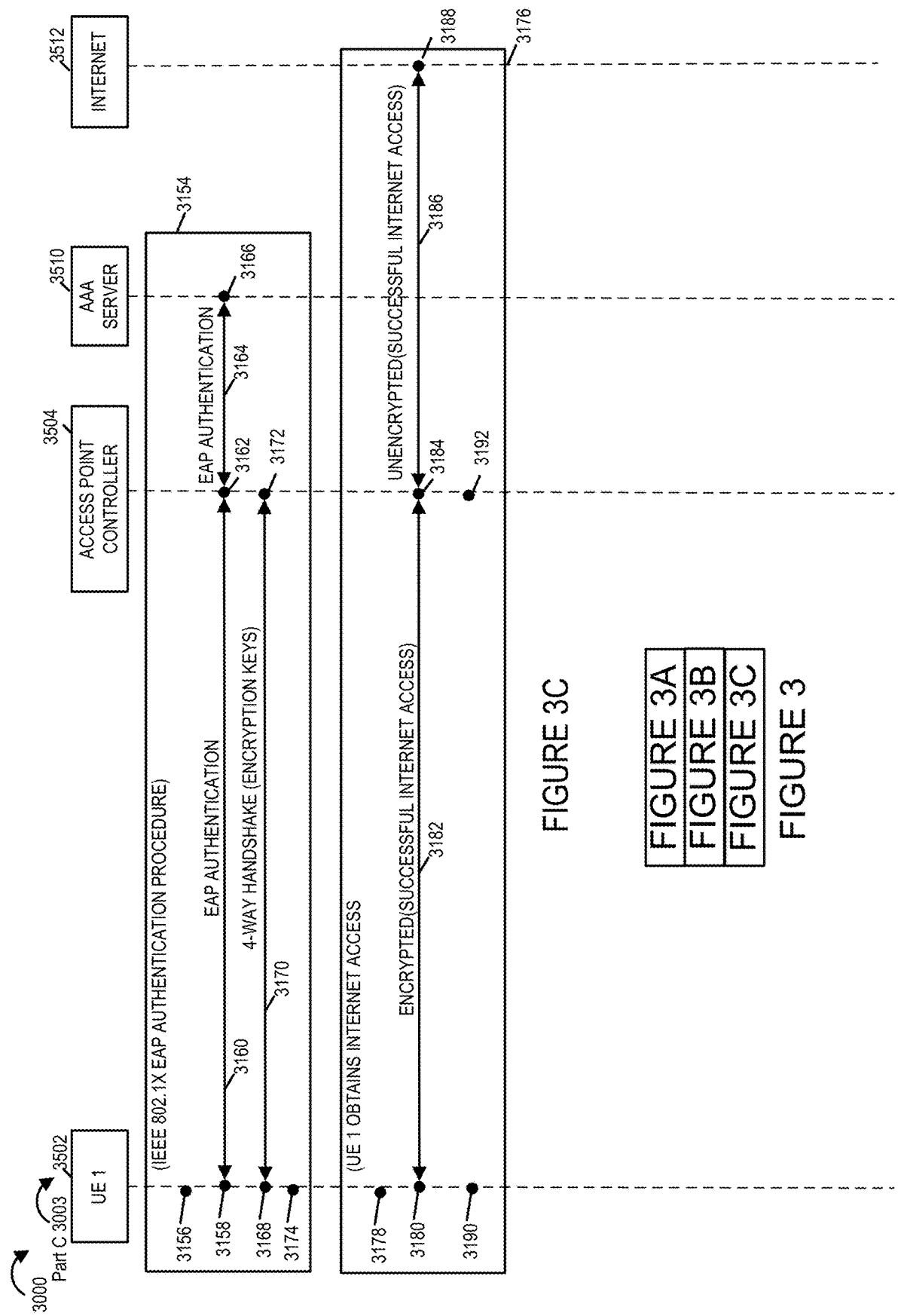

CONTINUED

1026'

1044 — DETERMINING, BY THE MOBILE DEVICE, WHILE OPERATING IN AN ENHANCED PUBLIC ACTION FRAME MODE OF OPERATION, A FIRST SSID NAME FOR THE FIRST NETWORK ADVERTISED BY THE FIRST BEACON FRAME FOR WHICH THE MOBILE DEVICE IS PROVISIONED USING A HIDDEN SSID QUERY PROCEDURE, SAID HIDDEN SSID QUERY PROCEDURE UTILIZING AN ENHANCED PUBLIC ACTION FRAME REQUEST, E.G., A UNICAST GENERIC ADVERTISEMENT SERVICE PUBLIC ACTION FRAME REQUEST, INCLUDING AN SSID QUERY MESSAGE TRANSMITTED OVER THE AIR FROM THE MOBILE DEVICE TO THE FIRST ACCESS POINT REQUESTING THE SSID NAME OF THE FIRST NETWORK

1046

1048 — OBTAINING, BY THE MOBILE DEVICE, A LIST OF SERVICE PROVIDER SUBSCRIPTION NETWORK ADDRESS IDENTIFIER (NAI) REALM NAMES FROM THE FIRST ACCESS POINT USING A GENERIC ADVERTISEMENT SERVICE QUERY, SAID LIST OF SERVICE PROVIDER SUBSCRIPTION NAI REALM NAMES BEING SERVICE PROVIDER NAI REALM NAMES SUPPORTED BY THE FIRST ACCESS POINT

IDENTIFYING, BY THE MOBILE DEVICE, A SERVICE PROVIDER NAI REALM NAME CORRESPONDING TO THE FIRST NETWORK BY COMPARING THE LIST OF SERVICE PROVDER SUBSCRIPTION NETWORK ADDRESS IDENTIFIER (NAI) REALM NAMES OBTAINED FROM THE FIRST ACCESS POINT TO A LIST OF SERVICE PROVIDER NAI REALM NAMES PRE-PROVISIONED ON THE MOBILE DEVICE

1050 — TRANSMITTING, BY THE MOBILE DEVICE, A FIRST ENHANCED PUBLIC ACTION FRAME REQUEST TO THE FIRST ACCESS POINT, SAID FIRST ENHANCED PUBLIC ACTION FRAME REQUEST INCLUDING AT LEAST SOME INFORMATION FROM THE FIRST BEACON FRAME AND/OR A SSID NAME QUERY WITH A SET OF CRITERION (E.G., SET OF CRITERION INCLUDING ONE OR MORE NETWORK ACCESS IDENTIFIER (NAI) REALM NAMES, THE ONE OR MORE NAI REALM NAMES IN THE SET OF CRITERION INCLUDING A FIRST NAI REALM NAME CORRESPONDING TO THE FIRST NETWORK)

1052 — TRANSMITTING, BY THE MOBILE DEVICE, A UNICAST GENERIC ADVERTISEMENT SERVICE (GAS) PUBLIC ACTION FRAME REQUEST INCLUDING AN ACCESS NETWORK QUERY PROTOCOL (ANQP) VENDOR SPECIFIC CONTENT FIELD, SAID ANQP VENDOR SPECIFIC CONTENT FIELD INCLUDING A SSID NAME QUERY WITH A SET OF CRITERION

1054 — RECEIVING, BY THE MOBILE DEVICE, A FIRST ENHANCED PUBLIC ACTION FRAME RESPONSE, E.G., A UNICAST GENERIC ADVERTISEMENT SERVICE (GAS) PUBLIC ACTION FRAME RESPONSE INCLUDING AN ACCESS NETWORK QUERY PROTOCOL (ANQP) VENDOR SPECIFIC CONTENT FIELD, FROM THE FIRST ACCESS POINT IN RESPONSE TO THE FIRST ENHANCED PUBLIC ACTION FRAME REQUEST

1056 — DETERMINING, BY THE MOBILE DEVICE, SAID FIRST SSID NAME FROM THE ENHANCED FIRST PUBLIC ACTION FRAME RESPONSE

1058 — EXTRACTING, BY THE MOBILE DEVICE, SAID FIRST SSID NAME FROM A VENDOR SPECIFIC CONTENT FIELD OF THE FIRST ENHANCED PUBLIC ACTION FRAME RESPONSE, SAID FIRST SSID NAME BEING INCLUDED IN THE VENDOR SPECIFIC CONTENT FIELD OF THE FIRST ENHANCED PUBLIC ACTION FRAME RESPONSE BY THE FIRST ACCESS POINT

1060 — EXTRACTING, BY THE MOBILE DEVICE, SAID FIRST SSID NAME FROM A VENDOR SPECIFIC CONTENT FIELD OF THE FIRST GAS PUBLIC ACTION FRAME RESPONSE, SAID FIRST SSID NAME BEING INCLUDED IN THE ANQP VENDOR SPECIFIC CONTENT FIELD OF THE FIRST GAS PUBLIC ACTION RESPONSE BY THE FIRST ACCESS POINT

METHODS AND APPARATUS FOR DISCOVERING HIDDEN NETWORK SERVICE SET IDENTIFIERS

FIELD OF INVENTION

The present invention relates to methods and apparatus for discovering, associating and/or connecting with wireless networks with hidden Service Set Identifiers (SSID)s also referred to as hidden SSID names. The present invention further relates to methods and apparatus for providing seamless connectivity of Wi-Fi devices to Passpoint enabled hidden wireless local area networks.

BACKGROUND OF THE INVENTION

Passpoint, also known as Hotspot 2.0, is an IEEE 802.11u standard based protocol to enable network discovery, seamless connectivity and roaming between Wireless Local Area Network (WLAN)Wi-Fi and cellular networks. It provides cellular network like connectivity to a WLAN automatically with no manual intervention required, and offload of traffic to a Wi-Fi network.

Passpoint supported Access Point (AP) advertises the available network services at regular intervals using beacon frames. A mobile device can also request capabilities and services provided by the AP prior to associating with the respective AP. With the information received from the AP, the mobile device makes a decision as to whether to connect to the WLAN served by the AP or not.

In conventional Wi-Fi based wireless networks, Access Points (APs) advertise WLAN presence by sending out Beacon frames with Service Set IDentifier (SSID, Basic Service Set Identifier (BSSID), and other generic information such as capability information for the network such as network supported rates. A SSID is typically a natural language label that serves as a network name. Client devices use two different scanning mechanisms to learn and/or determine a WLAN's availability, without associating to the AP.

The first scanning mechanism is passive scanning. In passive scanning, clients perform one-by-one channel scanning to listen to the Beacons on each channel. The second scanning mechanism is active scanning. In active scanning, clients, send out Probe Request frames on each channel. Probe Requests can be either for a specific WLAN (if a client device is pre-configured) or wildcard. APs that receive Probe Requests respond to the Probe Requests with Probe Response frames. The Probe Response frames contain the same content as Beacon frames.

The Beacon frames and Probe Response frames play a major role in the learning or discovery of network details like WLAN/SSID name, capabilities, etc. prior to the client device associating with the network. However, the IEEE 80211 protocol standard provides the provision for an AP not to include SSID (i.e., setting the field as NULL) in both of these (Beacon and Probe Response) frames. This is referred to as hidden SSID (aka non-broadcasting SSID). A client device must send a Probe Request with the SSID name of the network, for successful association with an AP serving the hidden SSID.

In Passpoint (aka Hotspot 2.0), network discovery and selection is automated through protocol-based discovery and selection procedures. A client device's decision to associate with a WLAN is linked to credentials it holds in its profile than the name of the network, i.e., SSID name. This works well in the case of AP configured to broadcast its SSID. However, the same client device will fail to connect, if the SSID of the AP is hidden due to missing a network name in subsequent procedures.

From the foregoing, it should be understood that there is a need for new and/or improved methods and apparatus for connecting to hidden Passpoint SSID/WAN. Further there is a need for new and/or improved methods and apparatus for discovering and/or obtaining a hidden SSID name from an Access Point. Furthermore, there is a need for a technological solution to how a client device can obtain or discover an SSID name and/or connect to a hidden Passpoint SSID AP/WLAN. There is a further need for new and/or improved methods and apparatus for automated network discovery and selection in networks implementing Passpoint/Hotspot 2.0 (IEEE 802.11u) standard based protocol. There is a further need for new and/or improved methods and apparatus for providing seamless connectivity of Wi-Fi devices to Passpoint enabled hidden Wireless Local Area Networks.

SUMMARY OF THE INVENTION

The present invention provides new and/or improved methods and apparatus for connecting to hidden Passpoint SSID/WLAN. Various embodiments of the present inventions provide new and/or improved methods and apparatus for obtaining and/or discovering a hidden SSID name from an Access Point. Various embodiments of the present invention provide a technological solution to how a client device can obtain and/or discover an SSID name and/or connect to a hidden Passpoint SSID AP/WLAN. The present invention is also directed to implementing new and/or improved methods and apparatus for automated network discovery and selection in networks implementing Passpoint/Hotspot 2.0 (IEEE 802.11u) standard based protocol. Various embodiments of the present invention also provides new and/or improved methods and apparatus for providing seamless connectivity of Wi-Fi devices to Passpoint enabled hidden Wireless Local Area Networks. Various embodiments of the present invention solve one or more of the problems discussed above.

In one exemplary embodiment of the present invention, an enhanced active scanning procedure is implemented to allow a wireless client device, e.g., user equipment (UE) device, to successfully retrieve hidden name and be able to connect to a hidden Passpoint SSID/WLAN. In this enhanced active scanning embodiment, a wireless user equipment client device invokes the active scanning procedure using an enhanced Probe request message. The enhancement is to query the nearby APs to get or discover the hidden SSID name with a set criterion (e.g., criteria: credentials matched realm or Public LAN Mobile Network (PLMN) ID or roaming consortium ID). The receiving Access Point which matches the requested criteria responds to the enhanced Probe request message in a Probe response message providing the SSID name specifically to the requesting device. The requesting device than uses the SSID name to connect to the Access Point.

In another exemplary embodiment of the present invention, enhanced Public Action Frames procedure is implemented to allow a wireless client device, e.g., user equipment (UE) device, to successfully obtain hidden name and be able to connect to a hidden Passpoint SSID/WLAN. The wireless client device sends a query message with a set of criterion (e.g., criteria: credentials matched realm or Public LAN Mobile Network (PLMN) ID or roaming consortium ID) to a nearby access point with a hidden SSID name in an attempt to discover the hidden SSID name. The AP which receives the query and has the matching criteria uses a Public Action Frame response message to provide the SSID name specifically to the requesting device.

An exemplary method in accordance with one embodiment of the present invention includes the steps of: receiving, at a mobile device, a first beacon frame having a Service Set Identifier (SSID) field set to NULL from a first Access Point; determining, at the mobile device, based on information received from the first Access Point that the mobile device is provisioned to connect to a first network advertised by the first beacon frame; discovering, by the mobile device, a first SSID name for the first network advertised by the first beacon frame for which the mobile device is provisioned.

In some embodiments, the step of discovering, by the mobile device, a first SSID name for the first network advertised by the first beacon frame for which the mobile device is provisioned includes: (i) transmitting, by the mobile device, a first enhanced probe request to the first Access Point, said first enhanced probe request including a SSID name query with a set of criterion; (ii) receiving, by the mobile device, a first enhanced probe response from the first Access Point in response to said first probe request; and (iii) determining said first SSID name from the first enhanced probe response.

In some embodiments, the set of criterion included in the first enhanced probe request includes one or more service provider identifiers. At least one of the one or more service provider identifiers corresponding to or belonging to the service provider of the first network. In some such embodiments, the at least one service provider identifier corresponding to or belonging to the service provider of the first network is pre-provisioned in the mobile device as part of the service provider's credentials. The service provider identifier is also included in a record in the first Access Point as corresponding to the first network SSID name. In some such embodiments, the service provider identifiers included in the set of criterion are one of the following: a Network Access Identifier (NAI) realm name, Public Land Mobile Network (PLMN) Identifier, or a Roaming Consortium Identifier.

In some embodiments, the set of criterion included in the first enhanced probe request includes one or more Network Access Identifier (NAI) realm names. In some embodiments, the set of criterion included in the first enhanced probe request includes one or more Network Access Identifier (NAI) realm names. PLMN IDs, and/or Roaming Consortium IDs. The Network Access Identifier (NAI) is a user identifier or subscription identifier used to identify a user requesting access to a network. The NAI is also submitted by the user equipment device, e.g., mobile device, during network access authentication. A PLMN ID is a Public Land Mobile Network Identifier that globally identifies a mobile network operator. Roaming Consortium ID or Roaming Consortium Organization Identifier is an identifier that globally identifies an organization, e.g., mobile network operator. It should be understood that while the invention has been described below using the Network Access Identifier/realms this is only illustrative and other parameters and/or identifiers, e.g., service provider and/or operator identifiers of the first network such as PLMN IDs and/or Roaming Consortium IDs may be, and in some, embodiments are used in place of or in addition to the NAI/realms.

In some embodiments, the one or more NAI realm names includes a first NAI realm name corresponding to the first network.

In some embodiments, the SSID name query with the set of criterion are included in a vendor specific content field of the first enhanced probe request. In some embodiments, the first SSID name is included in a vendor specific content field of the first enhanced probe response.

In some embodiments the step of discovering, by the mobile device, a first SSID name for the first network advertised by the first beacon frame for which the mobile device is provisioned includes: (i) obtaining, by the mobile device, a list of service provider subscription Network Address Identifier (NAI) realm names from the first Access Point using a Generic Advertisement Service query, said list of service provider subscription NAI realm names being service provider NAI realm names supported by the first Access Point; and (ii) identifying the first SSID name for the first network by comparing the list of supported service provider subscription Network Address Identifier realm names to a list of pre-provisioned Network Address Identifier realm names for which corresponding SSID names have also been pre-provisioned on the mobile device.

In some embodiments, the step of discovering, by the mobile device, a first SSID name for the first network advertised by the first beacon frame for which the mobile device is provisioned includes: (i) obtaining, by the mobile device, a list of service provider subscription Network Address Identifier (NAI) realm names from the first Access Point using a Generic Advertisement Service query, said list of service provider subscription NAI realm names being service provider NAI realm names supported by the first Access Point; and (ii) identifying a service provider NAI realm name corresponding to the first network by comparing the list of service provider subscription Network Address Identifier (NAI) realm names obtained from the first Access Point to a list of service provider NAI realm names pre-provisioned on the mobile device; (iii) transmitting, by the mobile device, an enhanced public action frame request to the first Access Point, said enhanced public action frame request including a SSID name query with a set of criterion; (iv) receiving, by the mobile device, an enhanced public action frame response from the first Access Point in response to the enhanced public action frame request; and (v) determining said first SSID name from the enhanced public action frame response.

In some embodiments, the set of criterion included in the enhanced public action frame request includes one or more Network Access Identifier (NAI) realm names. In some embodiments, the one or more NAI realm names includes a first NAI realm name corresponding to the first network.

In some embodiments, the enhanced public action frame request is a unicast Generic Advertisement Service (GAS) public action frame request including an Access Network Query Protocol (ANQP) vendor specific content field; and wherein the SSID name query with the set of criterion are included in the Access Network Query Protocol (ANQP) vendor specific content field of the unicast GAS public action frame request.

In some embodiments, the enhanced public action frame response is a unicast Generic Advertisement Service (GAS) public action frame response including an Access Network Query Protocol (ANQP) vendor specific content field; and wherein the first SSID name is included in the vendor specific content field of the unicast GAS public action frame response.

In some embodiments, the first network is a passpoint enabled hidden wireless local area network; and wherein said mobile device is a Wi-Fi device.

In some embodiments, the first network is a passpoint enabled hidden wireless local area network; and wherein said mobile device is a smartphone with Wi-Fi capability.

In some embodiments, the method further includes the step of associating, by the mobile device, with the first network via the first Access Point using the first SSID name.

In some embodiments, the method further includes the step of connecting, by the mobile device, to the Internet via the first network.

In some embodiments, the first beacon frame received by the mobile device is received from a first Access Point prior to the mobile device associating with the first Access Point.

In some embodiments, the first Access Point is a Hotspot 2.0 Passpoint Access Point, said Hotspot 2.0 Passpoint Access Point being an Access Point that supports IEEE 802.11u standard based protocol to enable network discovery.

In some embodiments, the method further includes the step of advertising, by the first Access Point, available network services at regular intervals by broadcasting beacon frames, said beacon frames having a hidden SSID, said hidden SSID including an SSID field set to NULL. In some embodiments, the first beacon frame having a Service Set Identifier (SSID) field set to NULL received by the mobile device is one of said beacon frames broadcasted by the first Access Point during said advertising, by the first Access Point, available network services at regular intervals by broadcasting beacon frames.

In some embodiments the method further includes the step of performing passive scanning at the mobile device prior to said associating, by the mobile device, with the first network using the first SSID name. In some of these embodiments, the first beacon frame with a Service Set Identifier (SSID) field set to NULL is received by the mobile device during said passive scanning.

In some embodiments, step of performing passive scanning includes performing by the mobile device, a one-by-one channel scan of each of a plurality of different channels to listen to the beacons on each of the plurality of different channels.

Another exemplary method embodiment including the steps of: transmitting, from a first Access Point, a first beacon frame advertising a first network, said first beacon frame having a Service Set Identifier (SSID) field set to NULL; receiving, at the first Access Point, from a mobile device a first request message including a SSID name query with a set of criterion, said first request message not including a SSID name; determining, by the first Access Point, based on the set of criterion included in the SSID name query whether or not to provide the SSID name of the first network advertised by the first beacon frame to the mobile device; and when the first Access Point determines to provide the SSID name of the first network advertised by the first beacon frame based on the set of criterion included in the SSID name query, transmitting a first response message to the mobile device including a SSID query name response including the SSID name of the first network.

The present invention is also applicable to apparatus and system embodiments wherein one or more devices implement the steps of the method embodiments. In some apparatus embodiments each of the wireless client devices, APs, user equipment devices, mobile terminals, and each of the other apparatus/devices/nodes of the system include one or more processors and/or hardware circuitry, input/output interfaces including receivers and transmitters, and a memory. The memory including instructions when executed by one or more of the processors control the apparatus/device/node of the system to operate to perform the steps and/or functions of various method embodiments of the invention.

The present invention is also applicable to and includes apparatus and systems such as for example, apparatus and systems that implement the steps and/or functions of the method embodiments. For example, a communication system in accordance with one embodiment of the present invention includes: A communications system comprising: a mobile device, said mobile device including: a memory; and a first processor that controls the mobile device to perform the following operations: receiving, at the mobile device, a first beacon frame having a Service Set Identifier (SSID) field set to NULL from a first Access Point; determining, at the mobile device, based on information received from the first Access Point that the mobile device is provisioned to connect to a first network advertised by the first beacon frame; discovering, by the mobile device, a first SSID name for the first network advertised by the first beacon frame for which the mobile device is provisioned.

In some apparatus and system embodiments, said operation of discovering, by the mobile device, a first SSID name for the first network advertised by the first beacon frame for which the mobile device is provisioned includes: (i) transmitting, by the mobile device, a first enhanced probe request to the first Access Point, said first enhanced probe request including at least some information from the first beacon frame and a SSID name query with a set of criterion; (ii) receiving, by the mobile device, a first enhanced probe response from the first Access Point in response to said first probe request; and (iii) determining said first SSID name from the first enhanced probe response.

In some such embodiments, the set of criterion included in the first enhanced probe request includes one or more Network Access Identifier (NAI) realm names. In some system embodiments, the one or more NAI realm names includes a first NAI realm name corresponding to the first network.

In some apparatus and systems embodiments, the SSID name query with the set of criterion are included in a vendor specific content field of the first enhanced probe request. In some embodiments, the first SSID name is included in a vendor specific content field of the first enhanced probe response.

In various apparatus and systems embodiments, the operation of discovering, by the mobile device, a first SSID name for the first network advertised by the first beacon frame for which the mobile device is provisioned includes: (i) obtaining, by the mobile device, a list of service provider subscription Network Address Identifier (NAI) realm names from the first Access Point using a Generic Advertisement Service query, said list of service provider subscription NAI realm names being service provider NAI realm names supported by the first Access Point; and (ii) identifying the first SSID name for the first network by comparing the list of supported service provider subscription Network Address Identifier realm names to a list of pre-provisioned Network Address Identifier realm names for which corresponding SSID names have also been pre-provisioned on the mobile device.

In some apparatus and systems embodiments the operation of discovering, by the mobile device, a first SSID name for the first network advertised by the first beacon frame for which the mobile device is provisioned includes: (i) obtaining, by the mobile device, a list of service provider subscription Network Address Identifier (NAI) realm names from the first Access Point using a Generic Advertisement Service query, said list of service provider subscription NAI realm names being service provider NAI realm names supported by the first Access Point; and (ii) identifying a service provider NAI realm name corresponding to the first network by comparing the list of service provider subscription Network Address Identifier (NAI) realm names obtained from the first Access Point to a list of service provider NAI realm names pre-provisioned on the mobile device; (iii) transmitting, by the mobile device, an enhanced public action frame request to the first Access Point, said enhanced public action frame request including a SSID name query with a set of criterion; (iv) receiving, by the mobile device, an enhanced public action frame response from the first Access Point in response to the enhanced public action frame request; and (v) determining said first SSID name from the enhanced public action frame response.

In some apparatus and systems embodiments, the set of criterion included in the enhanced public action frame request includes one or more Network Access Identifier (NAI) realm names.

In some apparatus and systems embodiments, the one or more NAI realm names includes a first NAI realm name corresponding to the first network.

In some apparatus and systems embodiments, the enhanced public action frame request is a unicast Generic Advertisement Service (GAS) public action frame request including an Access Network Query Protocol (ANQP) vendor specific content field. In some embodiments, the SSID name query with the set of criterion are included in the Access Network Query Protocol (ANQP) vendor specific content field of the unicast GAS public action frame request.

In some apparatus and systems embodiments, the enhanced public action frame response is a unicast Generic Advertisement Service (GAS) public action frame response including an Access Network Query Protocol (ANQP) vendor specific content field. In some embodiments, the first SSID name is included in the vendor specific content field of the unicast GAS public action frame response.

In some apparatus and systems embodiments, the first network is a passpoint enabled hidden wireless local area network. In some embodiments, the mobile device is a Wi-Fi device.

In various apparatus and systems embodiments, the first network is a passpoint enabled hidden wireless local area network. In some embodiments, the mobile device is a smartphone with Wi-Fi capability.

In some apparatus and systems embodiments, the first processor further controls the mobile device to perform the additional operation of: associating, by the mobile device, with the first network via the first Access Point using the first SSID name.

In some apparatus and systems embodiments, the first processor further controls the mobile device to perform the additional operation of: connecting, by the mobile device, to the Internet via the first network.

In some apparatus and systems embodiments, the first beacon frame received by the mobile device is received from a first Access Point prior to the mobile device associating with the first Access Point.

In some apparatus and systems embodiments, the first Access Point is a Hotspot 2.0 Passpoint Access Point, said Hotspot 2.0 Passpoint Access Point being an Access Point that supports IEEE 802.11u standard based protocol to enable network discovery.

In some apparatus and systems embodiments, said first Access Point includes a second processor, said second processor controlling the first Access Point to perform the following operations: advertising, by the first Access Point, available network services at regular intervals by broadcasting beacon frames, said beacon frames having a hidden SSID, said hidden SSID including an SSID field set to NULL. In some embodiments, the first beacon frame having a Service Set Identifier (SSID) field set to NULL received by the mobile device is one of said beacon frames broadcasted by the first Access Point during said advertising, by the first Access Point, available network services at regular intervals by broadcasting beacon frames.

In some apparatus and systems embodiments, the first processor further controls the mobile device to perform the following additional operation: performing passive scanning at the mobile device prior to said associating, by the mobile device, with the first network using the first SSID name. In some embodiments, the first beacon frame with a Service Set Identifier (SSID) field set to NULL is received by the mobile device during said passive scanning.

In some apparatus and systems embodiments, the operation of performing passive scanning includes performing by the mobile device, a one-by-one channel scan of each of a plurality of different channels to listen to the beacons on each of the plurality of different channels.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE DRAWINGS

FIG. 2 comprises FIG. 2A, FIG. 2B, and FIG. 2C.

FIG. 2C is the third part of a signaling diagram which illustrates the steps and signaling of an exemplary method in accordance with an embodiment of the present invention.

FIG. 3 comprises FIG. 3A, FIG. 3B, and FIG. 3C.

FIG. 3C is the third part of a signaling diagram which illustrates the steps and signaling of an exemplary method in accordance with an embodiment of the present invention.

DETAILED DESCRIPTION

As discussed above, the present invention provides new and/or improved methods and apparatus for connecting to hidden Passpoint SSID/WLAN. Various embodiments of the present inventions provide new and/or improved methods and apparatus for obtaining and/or discovering a hidden SSID name from an Access Point. Various embodiments of the present invention also provide a technological solution to how a client device can obtain and/or discover an SSID name and/or connect to a hidden Passpoint SSID AP/WLAN. The present invention is also directed to implementing new and/or improved methods and apparatus for automated network discovery and selection in networks implementing Passpoint/Hotspot 2.0 (IEEE 802.11u) standard based protocol. Various embodiments of the present invention also provides new and/or improved methods and apparatus for providing seamless connectivity of Wi-Fi devices to Passpoint enabled hidden Wireless Local Area Networks.

Figure 1:
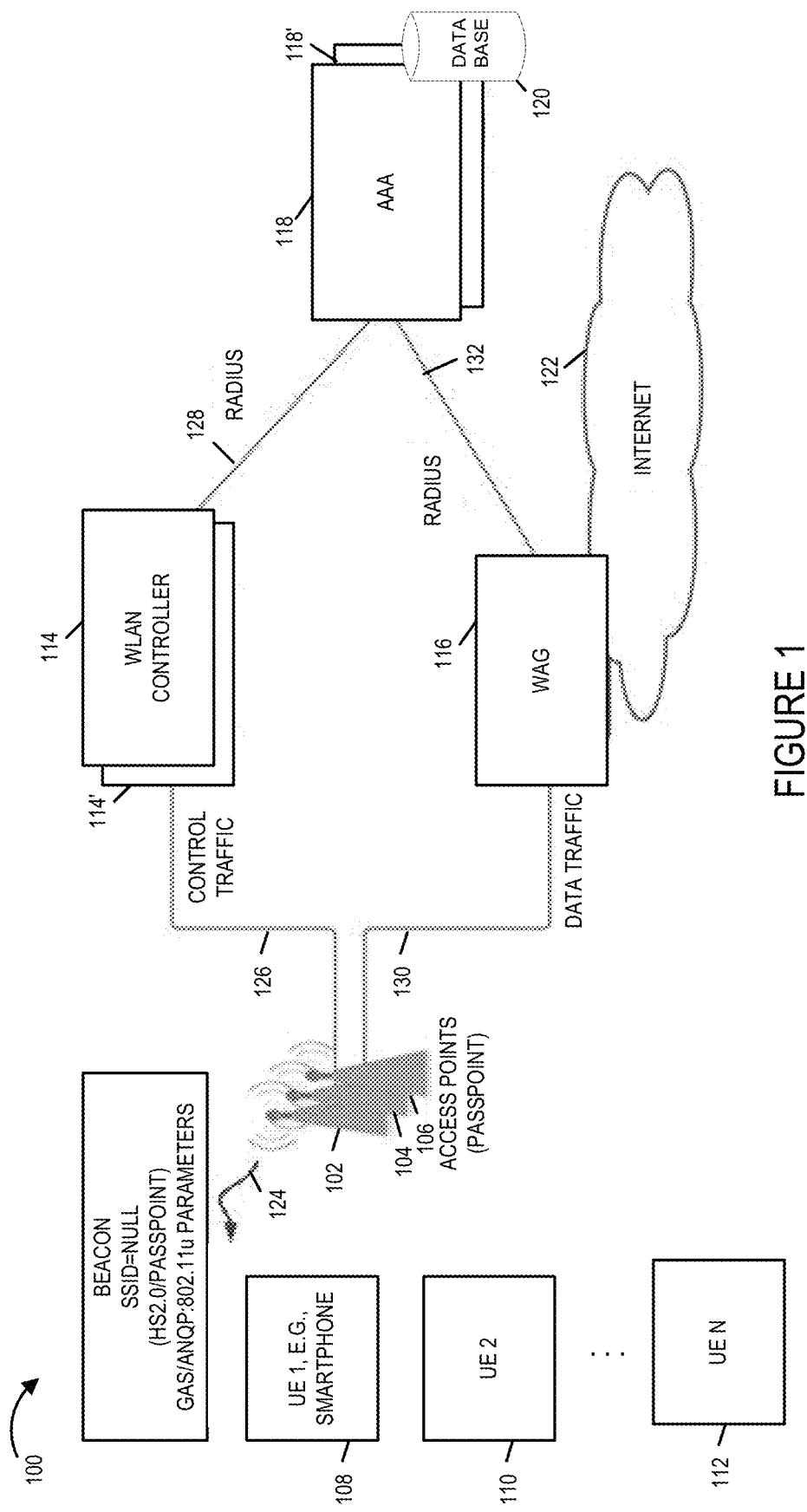
FIG. 1 illustrates an exemplary system in accordance with one embodiment of the present invention.

FIG. 1 illustrates an exemplary communications system 100 implemented in accordance with the present invention. This exemplary communications system includes a plurality of Access Points (AP 1 102, AP 2 104 and AP 3 106), a plurality of WLAN controllers (WLAN controller 114, WLAN controller 114'), a Wireless Access Gateway 116, a plurality of Authentication, Authorization and Accounting servers (AAA Servers 118, 118'), a database 120 and a plurality of user equipment devices (UE 1 108, UE 2 110, . . . , UE N 112, N being an integer greater than 2). The user equipment devices are wireless devices, e.g., mobile devices such as smartphones, cell phones, tablets, laptops, etc. The Access Points are Passpoint supported and/or enabled Access Points, i.e., that is they are Hotspot 2.0 Access Points which are enabled to implement IEEE 802.11u standard based protocol to enable network discovery, seamless connectivity and roaming between WLAN/Wi-Fi and cellular networks. Communications link 126 couples the Access Points 102, 104, 106 to the WLAN controllers 114, 114'. Communications link 128 couples the WLAN controllers 114, 114' to AAA servers 118, 118'. Communications link 130 couples the Access Points 102, 104, and 106 to the Wireless Access Gateway 116. Communications link 132 couples the Wireless Access Gateway 116 to the AAA servers 118 and 118'. The control traffic is communicated from the Access Points 102, 104, and 106 to the WLAN controllers 114, 114' using the communications link 126 while data traffic is communicated from the Access Points 102, 104, and 106 to the Wireless Access Gateway using communications link 130. The Wireless Access Gateway is coupled to the Internet 122 and allow authorized uses to connect to the Internet. In this exemplary embodiment, the Remote Authentication Dial-In User Service (RADIUS) networking protocol is used to provide authentication, authorization, and accounting management for the different networks supported by the Access Points. The WLAN controllers and WAG communicate with the AAA servers of system 100 using the RADIUS protocol on communications links 128 and 132 respectively. The communications links 126, 128, 130 and 132 are typically wired and/or optical cable communications links. The AAA servers are coupled to and/or include a database 120 with AAA credentials and information used for authenticating users and authorizing access to a network, WLAN network, and/or network services.

In various embodiments, different WLAN controllers of the plurality of WLAN controllers are owned and/or operated by different network service providers, e.g., the WLAN controller 114 being part of a first WLAN network operated by a first service provider and the WLAN controller 114' being part of a second WLAN network operated by a second service provider. In various embodiments, the Access Points 102, 104, and 106 are coupled to and can provide network services for a plurality of different WLAN networks such as a first WLAN network operated by the first service provider and a second WLAN network operated by a second service operator. In various embodiments, different AAA servers of the plurality of AAA servers are owned and/or operated by different network service providers, for example AAA server 118 provides authentication, authorization, and accounting management for the first WLAN network supported by the Access Points and the AAA server 118' provides authentication, authorization, and accounting management for the second WLAN network supported by the Access Points 102, 104 and 106. In some embodiments, a single WLAN controller, e.g., WLAN controller 114, supports and/or provides services for multiple WLAN networks some of which may be owned and/or operated by different service providers. In some embodiments, a single WLAN controller, e.g., AAA server, e.g., AAA server 118, supports and/or provides services for multiple WLAN networks some of which may be owned and/or operated by different service providers. The Access Points transmit beacon frames to the user equipment devices within their coverage area. The Access Points 102, 104 and 106 have been enabled to transmit beacon frames 124 with hidden SSID, that is the SSID has been set to NULL in the beacon frame. UE 1 108, UE 2 110, . . . , UE N 112 have been provisioned with network credentials, e.g., authentication and/or authorization credentials for one or more networks.

Figure 15:
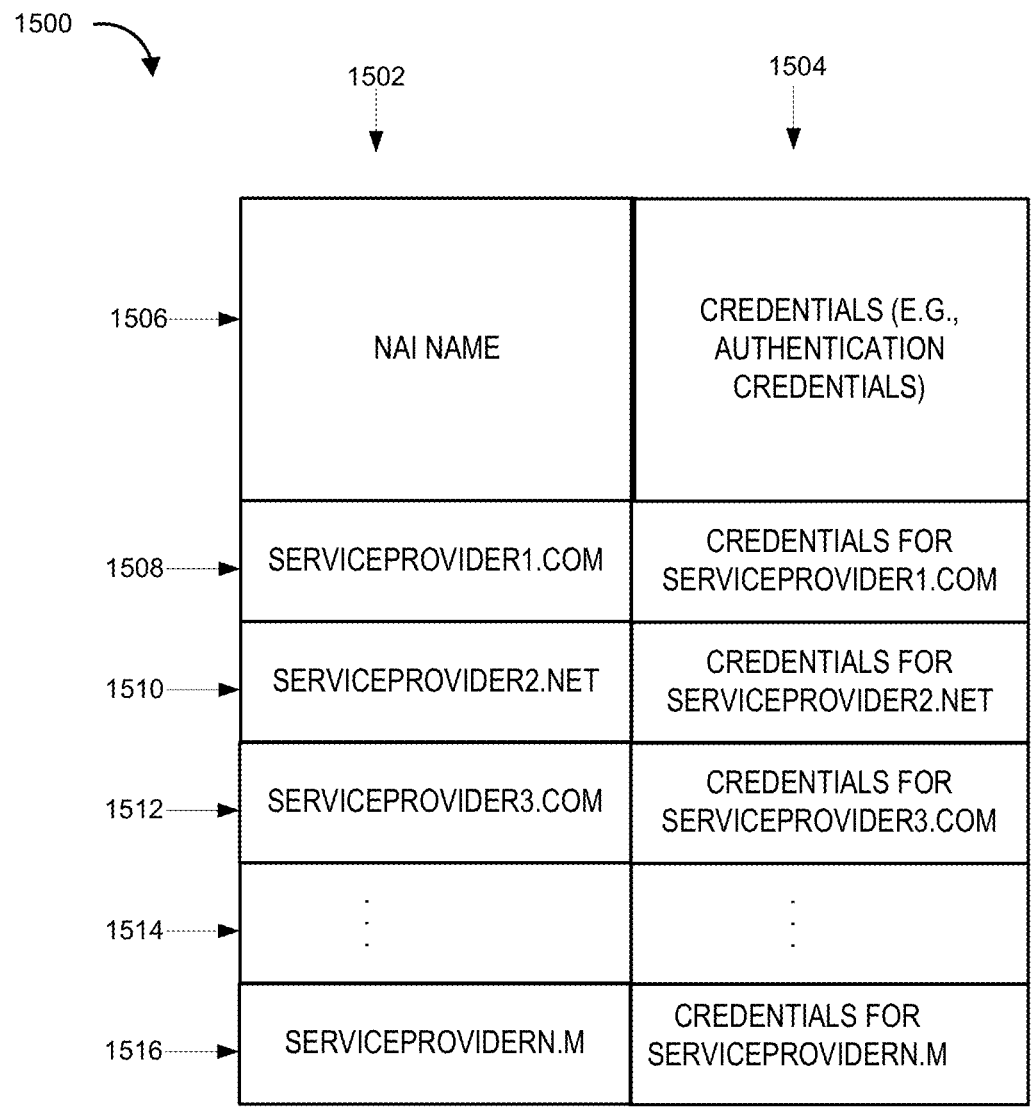
FIG. 15 illustrates a table including Network Address Identifier/realm (NAI realm name) information and corresponding credential information, e.g., authentication credential information, in accordance with an exemplary embodiment of the present invention.
Figure 16:
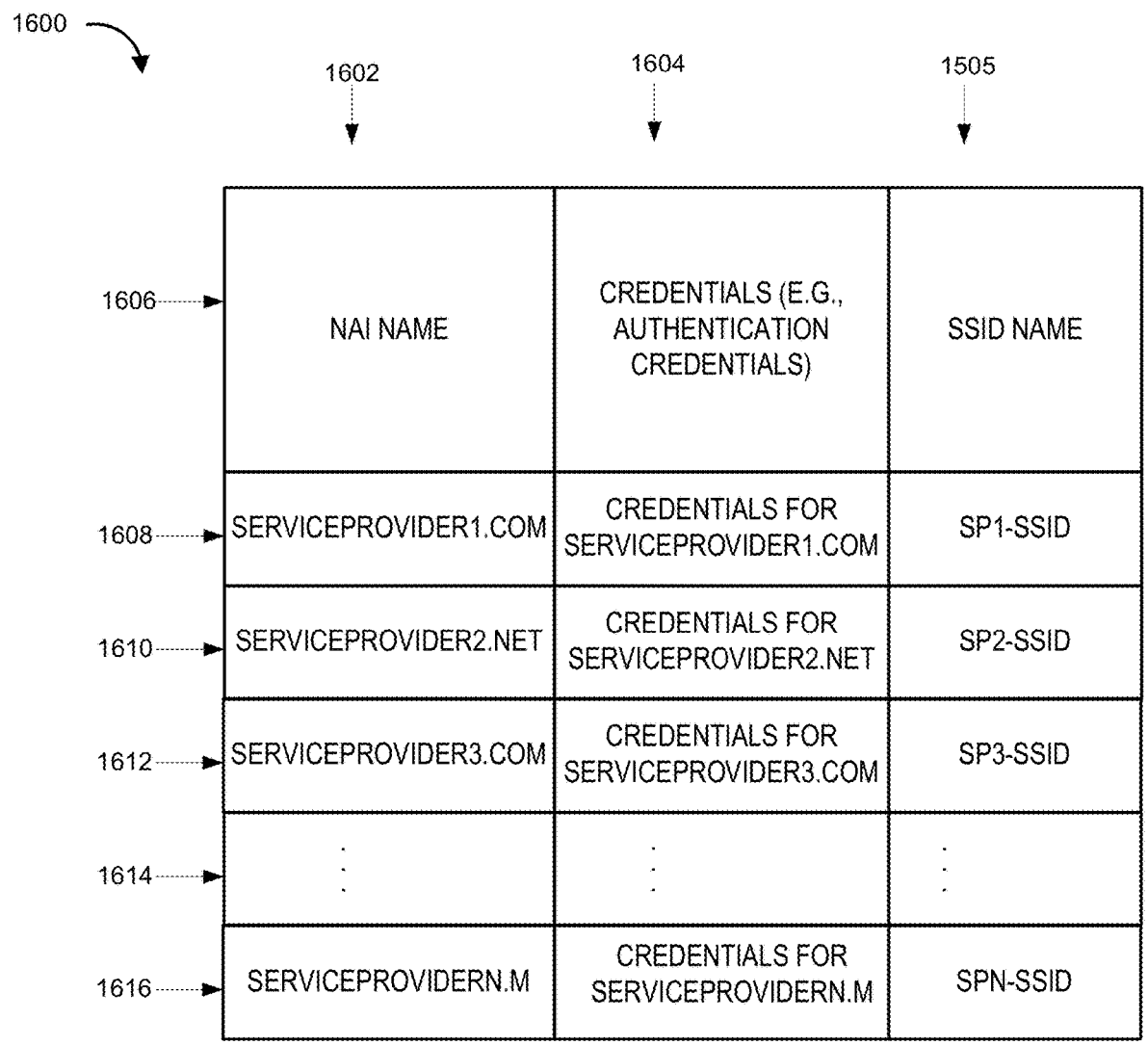
FIG. 16 illustrates a table including Network Address Identifier/realm (NAI realm name) information and corresponding credential information as well as corresponding SSID name information in accordance with an exemplary embodiment of the present invention.

FIG. 15 illustrates an example of a table 1500 of records that are stored in the non-volatile memory of a UE device, e.g., UE 1 108, in accordance with an embodiment of the present invention. While the information in the table are credentials which allow the UE to be authenticated by a service provider, the records in table 1500 do not include the SSID name for the network. The UE device discovers and/or obtains the SSID of various networks for which it has been provisioned with credentials Network Address and/or realm information, using the procedures discussed herein. FIG. 16 illustrates another example of a table 1600 of records that are stored in the non-volatile memory of a UE device, e.g., UE 1 108, in another embodiment of the invention. Table 1600 however includes the SSID name as well as the credentials which allow the UE to be authenticated by a service provider WLAN network for which the UE has been provisioned when a Network Address Identifier/realm name of WLAN network supported by an Access Point is discovered through passive and/or active scanning by the UE device. Having the ability to look up the SSID name of the network based on the NAI/realm information for the network allows the UE device to associate with the Access Point.

Figure 17:
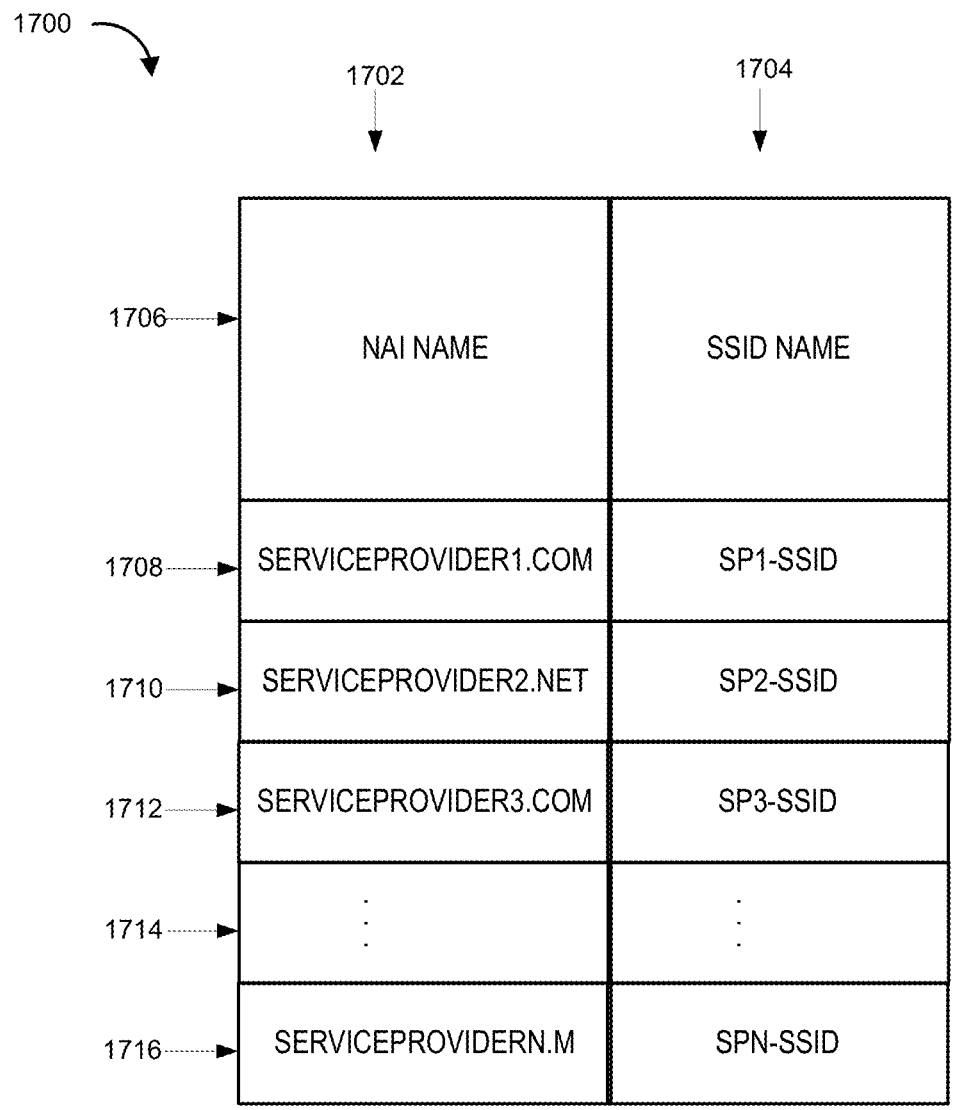
FIG. 17 illustrates a table including Network Address Identifier (NAI realm name) information and corresponding SSID name in accordance with an embodiment of the present invention.

FIG. 17 illustrates a table 1700 of records which include the Network Address Identifier/realm and the corresponding SSID name of the network. Table 1700 may be, and in some embodiments is stored in an Access Point and/or a user equipment device. For example, table 1700 may stored in a user equipment device once the user equipment device has learned, discovered or obtained the SSID names corresponding to the NAI/realm e.g., from Access Points with hidden SSIDs functionality enabled. The Network Address Identifier and realm may be, and typically are, part of the network credentials. In tables 1500, 1600, and 1700 the NAI realm name has also been used as index or look up field and has been shown separately from the other network credentials for ease of explanation. It is to be understood that the NAI and/or NAI/realm may be just one of a plurality of different network credentials and the manner and/or format of the data structures used to store the network credentials and/or records is not limited to table with the fields shown. In tables 1500, 1600, and 1700 the first row of the table are labels identifying the information in each column and each row thereafter is a record with information corresponding to a network.

Figure 12:
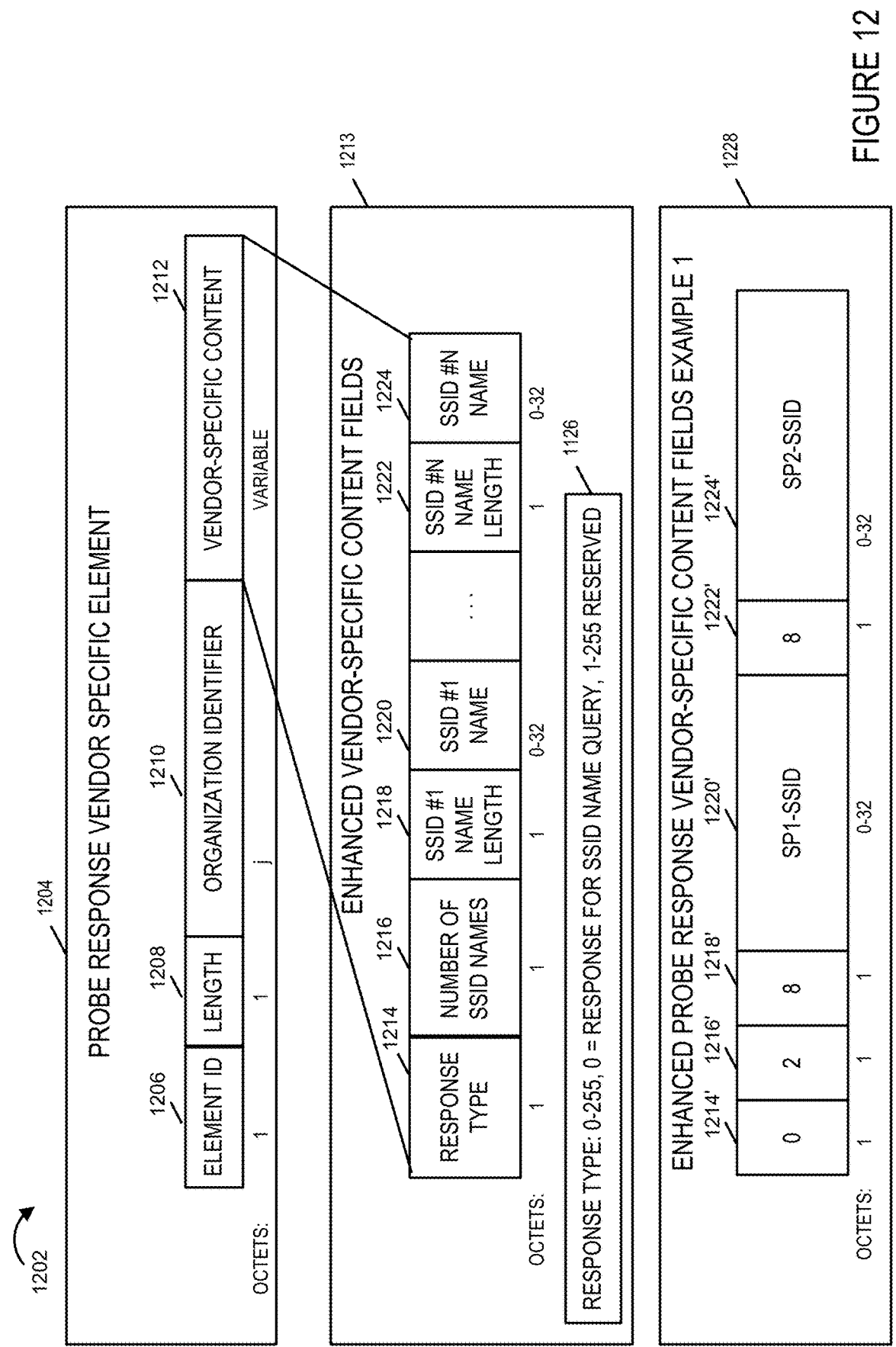
FIG. 12 illustrates exemplary enhanced probe response vendor specific content fields in accordance with an embodiment of the present invention.
Figure 13:
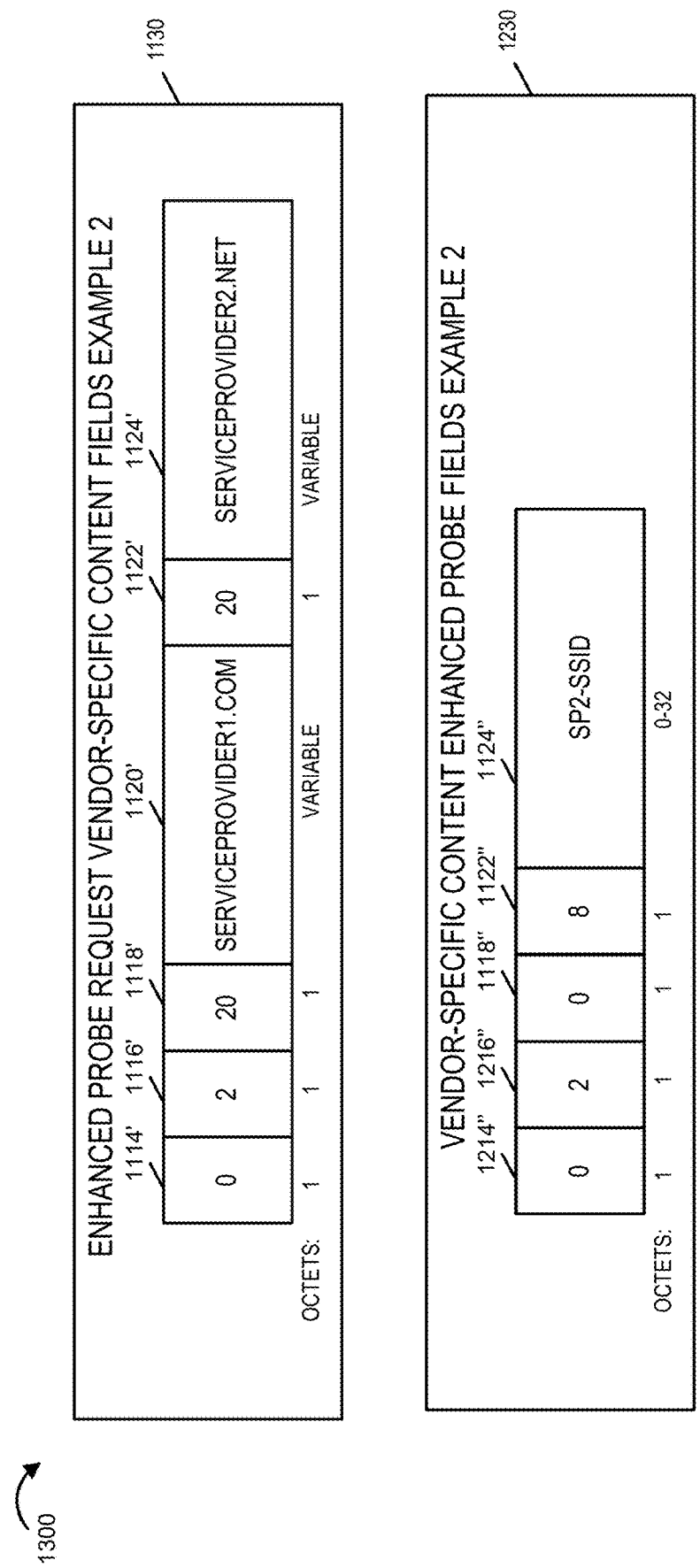
FIG. 13 illustrates another example of populated enhanced probe request vendor-specific content fields and another example of populated enhanced probe response vendor-specific content fields in accordance with an embodiment of the present invention.

The steps of an exemplary call flow procedure in accordance with an embodiment of the present invention will now be discussed. In this embodiment, an enhanced Probe Request is generated and sent by a user equipment device, e.g., mobile device, to a Passpoint Hotspot 2.0 Access Point. The enhanced Probe Request includes an SSID query which may be, and in some embodiments is, included in a vendor specific content field of the enhanced Probe Request. The Passpoint Hotspot 2.0 Access Point responds to the enhanced Probe Request with an enhanced Probe Response which is sent from the Access Point to the user equipment device. The enhanced Probe Response includes the SSID name of the network which matches the query criterion or set of criteria specified in the enhanced Probe Request. The SSID name is included in some embodiments in a vendor specific content field of the enhanced Probe Response. The user equipment device upon receiving the SSID name from the Access Point uses it to associate with the Access Point and then connect to the Internet. FIG. 12 illustrates exemplary enhanced probe request vendor-specific content fields that may be, and in some embodiments is, utilized for querying an Access Point for SSID names of networks with hidden SSIDs. FIG. 13 illustrates exemplary enhanced probe response vendor-specific content fields that may be, and in some embodiments is, utilized for responding to SSID queries.

In step 1, a Passpoint Hotspot 2.0 Access Point includes dual-band or multi-band radio interfaces with multiple SSIDs. Each of the radio interfaces support one or more SSIDs. Operation proceeds from step 1 to step 2.

In step 2, the Access Point is configured with HS 2.0 Passpoint SSID, e.g., SPECTRUM MOBILE. The SSID is hidden enabled, e.g., SSID or SSID length is set to NULL. Operation proceeds from step 2 to step 3

In step 3, a user equipment device, e.g., a mobile device, is pre-provisioned with the credentials required to connect to the network with SSID name SPECTRUM MOBILE and be provided internet access services. However, in this embodiment, the user equipment device is not pre-provisioned with the SSID name of the network. Instead, it has been pre-provisioned with the Network Address Identifier/realm name of the WLAN network which is SPECTRUM.COM in this example. The SSID names are generic per deployment/operator. SPECTRUM.COM has been used as the SSID name in this example for illustrative purposes. Additionally as previously discussed above the use of the Network Address Identifier/realm name is only exemplary and other identifiers or set of parameters which are defined as matching to a hidden SSID network may be utilized, such as for example PLMN Identifier or Roaming Consortium Identifier. Pre-provisioned referring to being provisioned prior to the start of the procedure.

In step 4, the user equipment device enters the coverage area of the Access Point serving the WLAN network with SSID: SPECTRUM MOBILE.

In step 5, the user equipment device performs passive scanning and determines and/or realizes there is a Hotspot 2.0 network available from the Beacon frames received from the Access Point. The user equipment device also determines from the Beacon frames it receives from the Access Point that the SSID name is set to NULL due to the fact that the network has been configured as hidden on the Access Point. The Beacon frames broadcast from the Access Point have the SSID set to NULL, e.g., the SSID length field is set to NULL or zero length. While multiple beacon frames have been described as being received by the UE a single beacon frame is sufficient in at least some embodiments. Exemplary beacon frames transmitted from the Access Point may be a beacon frame sent with hidden SSID name broadcast on 2.4 GHz radio spectrum and have a Basic Service Set Identifier (BSSID) (24:24:24:24:24:24) and another beacon frame sent with hidden SSID broadcast on 5 GHz radio spectrum and have a Basic Service Set Identifier (BSSID) (50:50:50:50: 50:50). Operation proceeds from step 5 to step 6.

In step 6, the UE performs network discovery procedures using the IEEE 802.11u protocol. These procedures are performed using ANQP (Access Network Query Protocol)/ GAS (Generic Advertisement Service) query also sometimes referred to as a GAS/ANQP query. Generic Advertisement Protocol (GAS), provides Layer 2 transport of advertisement protocol frames between a user equipment device (e.g., mobile device) and an Access Point prior to device authentication. The Access Network Query Protocol (ANQP) is a query and response protocol used by a mobile device to discover network information such as for example hotspot operator's domain name, 3GPP details, roaming consortium, credential type and Extensible Authentication Protocol (EAP) method supported for authentication; Internet Protocol address type availability and other details useful for a user equipment device (e.g., mobile device) network selection process, e.g., determining which network of a plurality of networks to associate and/or connect to. The UE generates and sends a GAS/ANQP query to the Access Point from which it received the beacon frames. Operation proceeds from step 6 to step 7.

In step 7, the Access Point receives the GAS/ANQP query from the UE and sends a GAS/ANQP query response to the UE with network information including the information described above in step 6. The GAS/ANQP query response however does not send the SSID name for the network or networks it is supporting. Operation proceeds from step 7 to step 8.

In step 8, the UE receives the GAS/ANQP query response from the Access Point. Operation proceeds from step 8 to step 9.

In step 9, the UE processes the received GAS/ANQP query response and based on GAS/ANQP query response, e.g., network information contained in the GAS/ANQP query response, makes a decision to associate, if the UE finds and/or determines that credentials in its profile match with the Network Address Identifier/realms or PLMN (Public Land Mobile Network), etc. The profile with one or more sets of network credentials having been stored or included in the UE during provisioning. In this example, the NAI/realm SPECTRUM.COM is included in the GAS/ANQP query response. The UE determines that it has credentials for the NAI/realm SPECTRUM.COM and makes the decision to associate with the network supported by the Access Point. However, the UE at this point does not have the SSID name for the network which is required for association and/or authentication with the network via the Access Point. Operation proceeds from step 9 to step 10.

In step 10, before attempting to perform the conventional 802.11 open system authentication procedure, the following Enhanced Active Scanning Procedure is performed. Step 10 includes sub-step 10A, 10B, 10C, 10D, 10E, 10F, 10G, and 10H.

Figure 11:
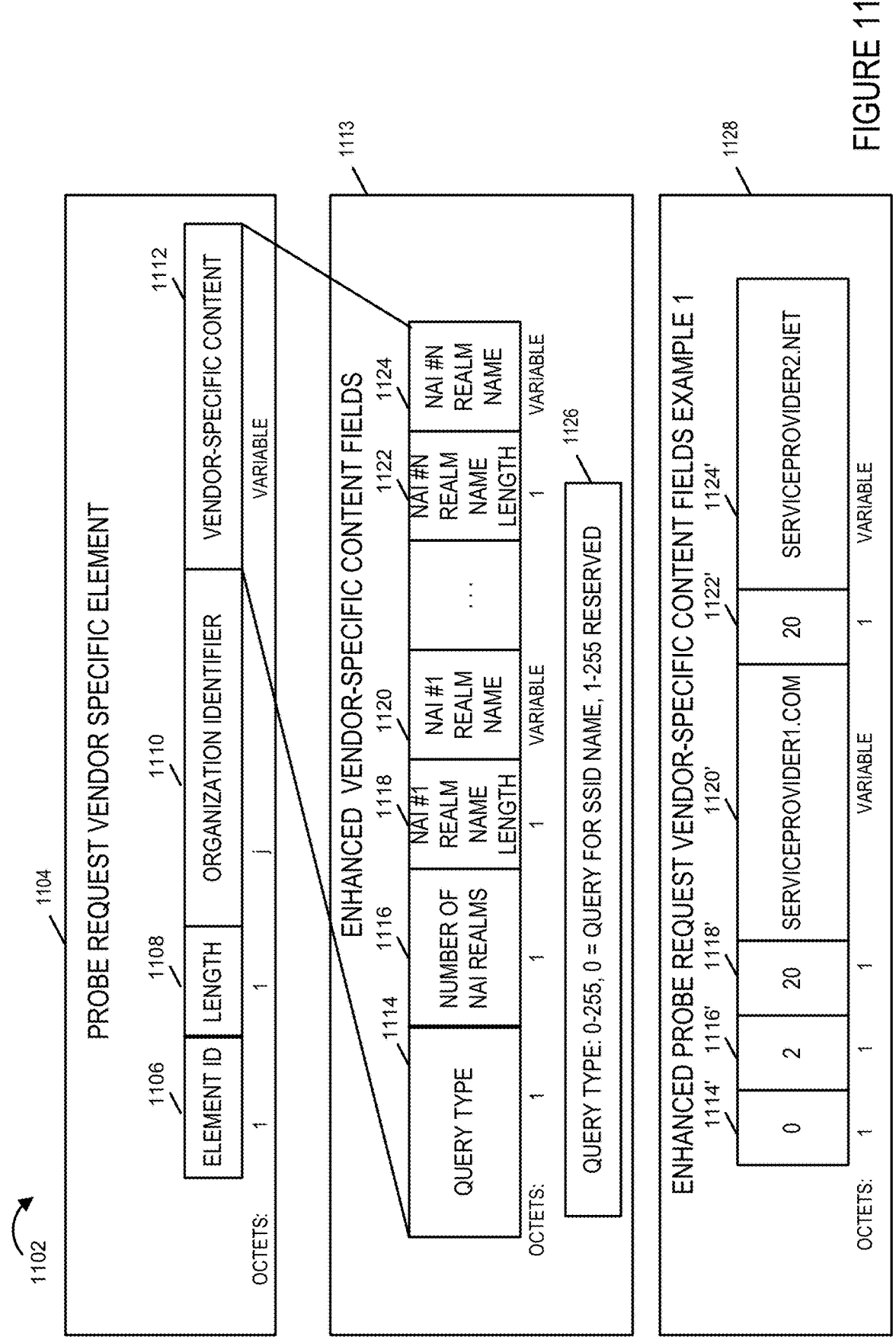
FIG. 11 illustrates exemplary enhanced probe request vendor specific content fields in accordance with an embodiment of the present invention.
Figure 14:
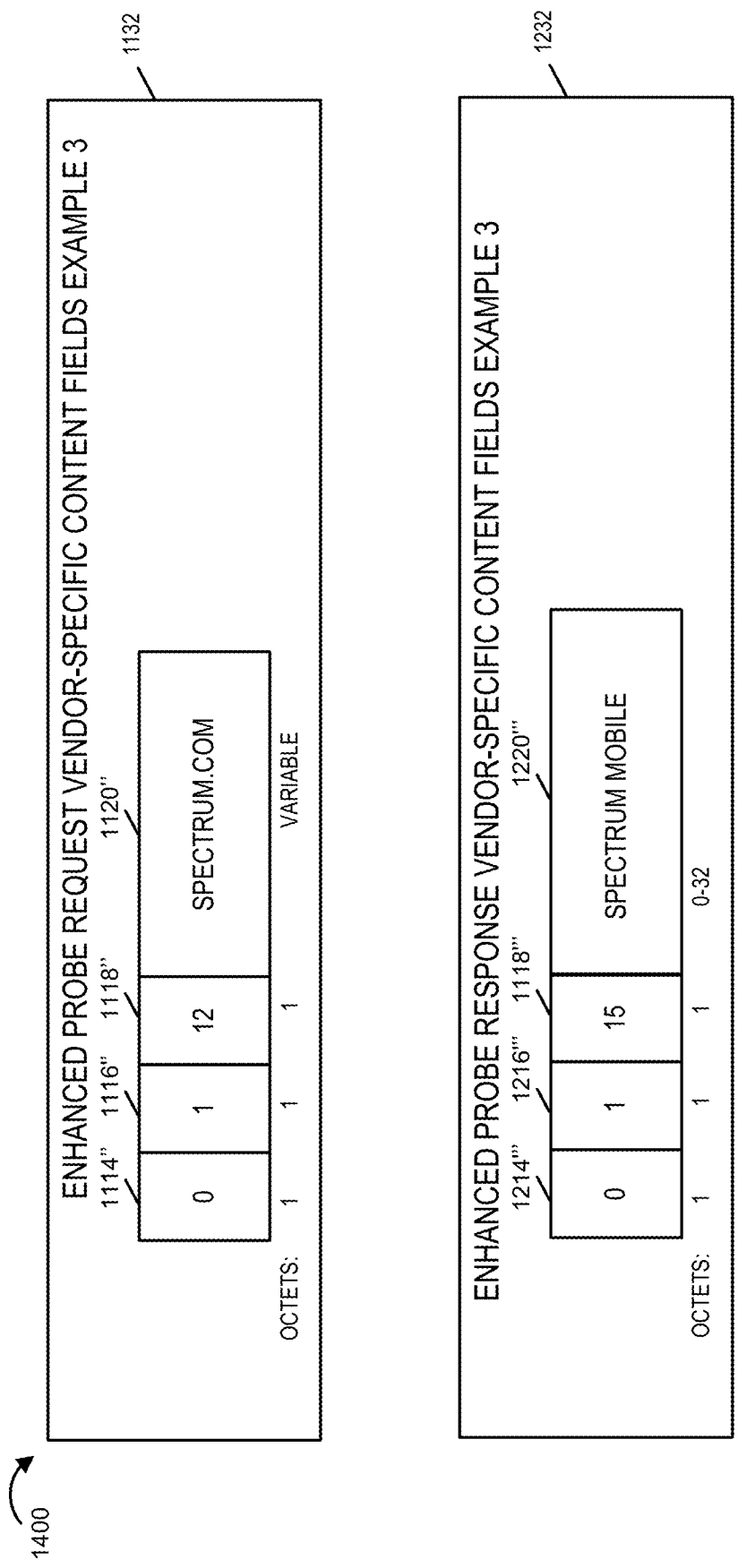
FIG. 14 illustrates another example of populated enhanced probe request vendor-specific content fields and another example of populated enhanced probe response vendor-specific content fields in accordance with an embodiment of the present invention.

In sub-step 10A, the UE generates an enhanced Probe Request. The enhanced Probe Request includes a SSID query requesting the Access Point to reveal the SSID hidden name of the network advertised by the beacon frames from the Access Point specifically to the requesting device, e.g., via a unicast enhanced Probe Response message. FIG. 11 illustrates an exemplary Enhanced Probe Request vendor specific element 1104 wherein the vendor-specific content 1112 portion or field of the probe request vendor specific element has been enhanced as shown in diagram 1113. The enhanced vendor-specific content fields include fields for SSID name queries based on NAI realm names. Diagram 1132 of FIG. 14 illustrates an example of vendor-specific content enhanced probe request fields populated in accordance with an embodiment of the present invention using the parameters of this example, e.g., NAI realm name being SPECTRUM. COM. The query type field 1114" is set to 0; the number of NAI realms 1116" is set to 1; the NAI realm length for the 1st NAI realm 1118" is set to 12 which is the length of the 1st NAI realm name SPECTRUM. COM, and the 1st NAI realm name field 1120" is set to SPECTRUM-.COM the name of the NAI realm of the network with the hidden SSID.

In sub-step 10B, the UE transmits the enhanced Probe Request with SSID name query to the Access Point.

In sub-step 10C, the Access Point receives the enhanced probe request including the SSID name query from the UE.

In sub-step 10D, the Access Point extracts the SSID name query, matches the network information provided in the query which are the criterion or set of criteria provided to the corresponding network SSID name. In this example, the network information provided in the SSID name query is the NAI realm name, SPECTRUM.COM, and the corresponding SSID name is SPECTRUM MOBILE.

In sub-step 10E, the Access Point generates an enhanced Probe Response with the SSID name requested in the query which is SPECTRUM MOBILEe. FIG. 12 illustrates an exemplary Enhanced Probe Response vendor specific element 1204 wherein the vendor-specific content 1212 portion or field of the enhanced probe response vendor specific element has been enhanced as shown in diagram 1213 to include various fields which can provide a response to the SSID name query. Diagram 1232 of FIG. 14 illustrates an example of the vendor-specific content enhanced probe response fields in accordance with an embodiment of the present invention using the parameters of this example, e.g., SSID name being SPECTRUM MOBILE. The response type field 1214' is set to 0; the number of SSID names 1216''' is set to 1; the SSID name length for the 1st SSID name 1118''' is set to 15, and the SSID #1 name field 1120''' is set to SPECTRUM MOBILE which is the SSID name matching the NAI realm of the network SPECTRUM.COM which has the hidden SSID.

In sub-step 10F, the Access Point transmits the enhanced Probe Response with the SSID query response to the UE, e.g., as a unicast message sent specifically to the UE which sent the enhanced Probe Request.

In sub-step 10G, the UE receives the enhanced Probe Response from the Access Point.

In sub-step 10H, the UE determines the SSID name of the hidden SSID from and/or based on information contained in the enhanced Probe Response. For example in embodiments that utilize the enhanced vendor specific content fields of FIG. 12 from the vendor specific content field in which the SSID name corresponding to the requested NAI realm name is contained. In this example, that is SSID name field 1220''' shown in the diagram 1232 of FIG. 14.

It should be understood that the specific format of the vendor specific content fields is only exemplary and other formats and fields may be, and in some embodiments are, used to convey the SSID query and SSID name responding to the query.

Operation proceeds from step 10 to step 11. In step 11, the UE performs the conventional 802.11 open system authentication. The UE having been provisioned with the credentials for authentication in connection with SPECTRUM-.COM network. Operation proceeds from step 11 to step 12

In step 12, the UE associates with the SPECTRUM MOBILE network via the Access Point using the SSID name discovered through the enhanced Active Scanning procedure of step 10. For example, the UE performs the 802.11 association procedures using the SSID name SPECTRUM MOBILE discovered through the enhanced Active Scanning procedure. Operation proceeds from step 12 to step 13.

In step 13, once the UE receives the Association response from the Access Point indicating successful association, the UE then commences the actual authentication using Extensible Authentication Protocol (EAP) followed by a 4-way exchange for encryption keys being performed. Upon successful authentication and key exchange operation proceeds from step 13 to step 14.

In step 14, the UE is allowed access to the Internet, e.g., via the Access Point and SPECTRUM MOBILE network, e.g., WLAN network. In some embodiments as illustrated in FIG. 1 the access to the Internet is obtained through a path such as the UE 1 108 to Access Point 1 102 over wireless link, Access Point 1 102 to Wireless Gateway 116 over network link 130, Wireless Access Gateway connecting and/or coupling the network to the network to the Internet. The procedure is repeated when the UE needs to connect to another network with an Access Point with hidden SSID functionality enabled.

In an alternative embodiment, steps 3, 9 and 10 are replaced with the following alternative step 3, alternative step 9, and alternative step 10.

In alternative step 3, the user equipment device, e.g., a mobile device, is pre-provisioned with the credentials required to connect to the network with SSID name SPECTRUM MOBILE and be provided internet access services. In addition, the user equipment device in addition to being provisioned with Network Address Identifier/realm, the user equipment device is also provisioned with the SSID name of the network that corresponds to the Network Address Identifier/realm name of the WLAN network which is SPECTRUM.COM. Pre-provisioned referring to being provisioned prior to the start of the procedure. Unlike in the prior embodiment, the UE now has both the NAI/realm name and the corresponding SSID for the network.

In alternative step 9, the UE determines from the GAS/ANQP query response frame that it has NAI realm credentials for the network with the hidden SSID name for which the Access Point is providing services, e.g., SPECTRUM.COM, and also determines that it has been pre-provisioned with the corresponding SSID name which is SPECTRUM MOBILE.

In this alternative step 10, the device connection manager of the UE identifies the corresponding SSID name based on the credentials match found as the UE was pre-provisioned with credentials (e.g., NAI realm name, authentication credentials) and corresponding SSID. In this way, the UE obtains the SSID name via a lookup.

In another embodiment, the UE gets the supported service provider subscription identifiers using GAS/ANQP prior to associating with the hidden SSID network. For example, the service provider subscription identifiers which are received from the Access Point are the NAI realm names: SERVICEPROVIDER1.COM, SERVICEPROVIDER2.NET, SERVICEPROVIDER3.COM. The UE checks the supported service provider list received from the Access Point, with the credentials pre-provisioned by respective service providers. In this example, the UE has been pre-provisioned with Service Provider 2 Credentials (for NAI: SERVICEPROVIDER2.NET). In various embodiments, a plurality of different Service Provider (NAI realm names) and SSID names have been pre-provisioned on the UE. If the device finds credentials matching a service provider on the list received from the Access Point, then the UE generates a Probe Request including the SSID name derived from the NAI realm name received from the Access Point. In this case, the UE identifies a match in that it has been pre-provisioned with the credentials including the NAI realm for SERVICEPROVIDER2.NET as well as the SSID name which is SP2-SSID. The UE after identifying the SSID name SP2-SSID corresponds to SERVICEPROVIDER2.NET generates and sends a regular or unenhanced Probe Request to the Access Point with SSID name set to SP2-SSID.

FIG. 16 illustrates an exemplary table 1600 including NAI realm names with corresponding credentials and SSID name. In some embodiments, the NAI realm name is a sub-field of credentials and is used as the matching criteria for determining the hidden SSID name when the UE receives the NAI realm name from the Access Point. Table 1600 of FIG. 16 illustrates a table with the rows 1608, 1610, 1612, 1614, 1616 of the table being a record containing a NAI realm name, credentials (e.g., authentication credentials) and a corresponding SSID name. The information in each row being for a specific network. The first row 1606 of the table 1600 includes labels identifying the information contained in the each of the columns. The entry (column 1602, row 1606) NAI name indicates that the entries in column 1602 includes NAI realm names for networks supported by the Access Point. The entry (column 1604, row 1606) credentials indicates that entries in column 1604 are UE credentials for the network. The entry (column 1604, row 1606) SSID name indicates that the entries in column 1605 are SSID names. The rows 1608, 1610, 1612, 1614, 1616 are records with the information in the row corresponding to a particular network. Row 1608 includes information for a first network, e.g., a first WLAN having a NAI realm name "SERVICEPROVIDER1.COM" (col. 1602, row 1608 entry), credential for SERVICEPROVIDERr1.COM (col. 1604, row 1608 entry) and a SSID name of "SP1-SSID" (col. 1605, row 1608 entry). Row 1610 includes information for a second network, e.g., a second WLAN having a NAI realm name "SERVICEPROVIDER2.NET" (col. 1602, row 1610 entry), credentials for SERVICEPROVIDER.NET (col. 1604, row 1610) and a SSID name of "SP2-SSID" (col. 1605, row 1610 entry). Row 1612 includes information for a third network, e.g., a third WLAN having a NAI realm name "SERVICEPROVIDER3.COM" (col. 1602, row 1612 entry), credentials for SERVICEPROVIDER2.NET (col. 1604, row 1612 entry) and a SSID name of "SP3-SSID" (col. 1605, row 1612 entry). Row 1616 includes information for a Nth network, e.g., a Nth WLAN having a NAI realm name "SERVICEPROVIDERN.M (col. 1602, row 1616 entry), credentials for the Nth network, i.e., credentials for SERVICEPROVIDERN.M and a SSID name of "SPN-SSID" (col. 1605, row 1616 entry). The " . . . " in the entries of row 1614 represent additional entries the specifics of which are not illustrated. In various embodiments, table 1600 or an equivalent table of records and/or data structures is included in the memory of the first User Equipment device and/or in the Access Point with the credentials being credentials for authentication procedures with respect to the network. With the records being for the networks that the Access Point is supported. Additional information, e.g., additional credential information, is typically kept with respect to each of the networks supported by the Access Point, e.g., Hotspot 2.0 parameters, PLMN ID's, data rates, SSID hidden enabled, etc. Table 1600 in some embodiments is generated by the user equipment device with information in columns 1602 and 1604 being provisioned on the user equipment device and the information in column 1605 being added as discovered by the user equipment device if not pre-provisioned, e.g., during manufacturer, initialization and/or upgrades or updates of the user equipment device.

Figure 2A:
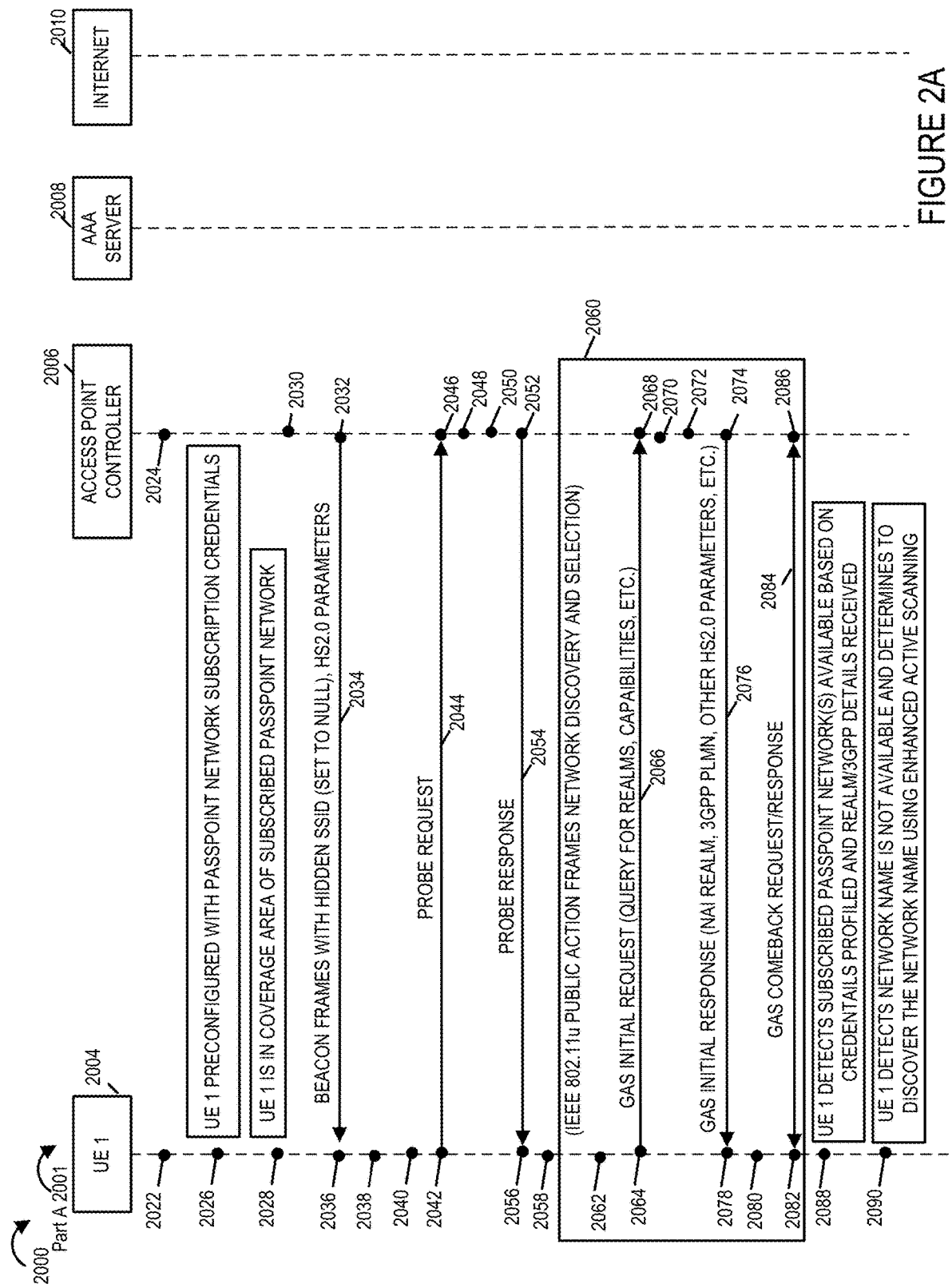
FIG. 2A is the first part of a signaling diagram which illustrates the steps and signaling of an exemplary method in accordance with an embodiment of the present invention.
Figure 2B:
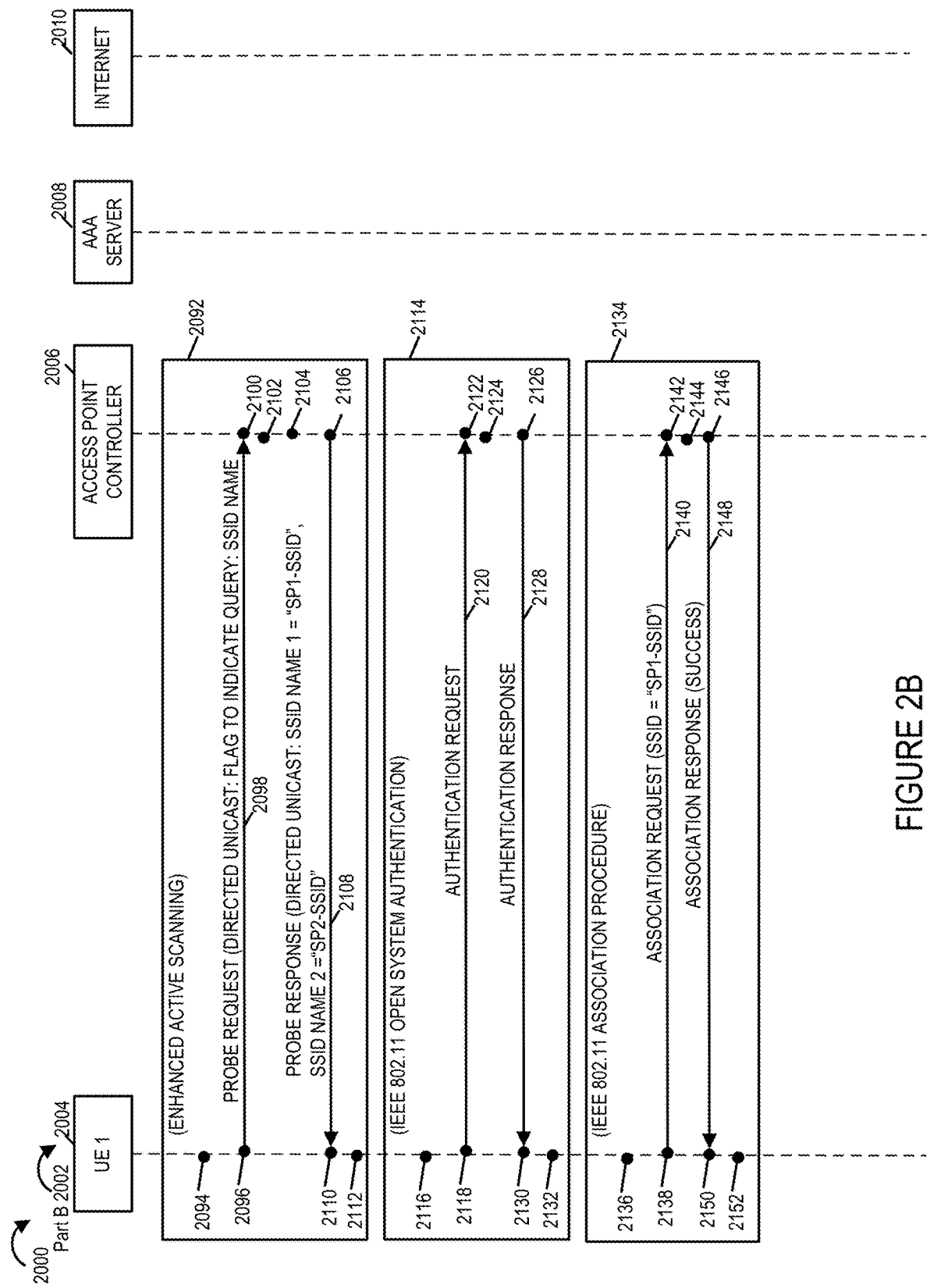
FIG. 2B is the second part of a signaling diagram which illustrates the steps and signaling of an exemplary method in accordance with an embodiment of the present invention.

FIG. 2 comprises FIG. 2A, FIG. 2B, and FIG. 2C. FIG. 2A is the first part (Part A 2001) of a signaling diagram which illustrates the steps and signaling of an exemplary method 2000 in accordance with an embodiment of the present invention. FIG. 2B is the second part (Part B 2002) of a signaling diagram which illustrates the steps and signaling of an exemplary method 2000 in accordance with an embodiment of the present invention. FIG. 2C is the third part (Part C 2003) of a signaling diagram which illustrates the steps and signaling of an exemplary method 2000 in accordance with an embodiment of the present invention. While it will be readily understood that additional steps and signaling are performed in connection with communicating information, messages, and packets between devices, the method 2000 focuses on and discusses the steps and signaling for understanding the invention. Elements or steps with the same reference numbers used in different figures are the same or similar and those elements or steps will not be described in detail again. The signaling diagram/method 2000 is implemented by a system coupled to the Internet 2010 including a first UE 1 2004, an Access Point/Controller 2006, and AAA server 2008. The Access Point/Controller 2006 is an Access Point including WLAN controller capabilities. The UE 1 2004 is a wireless device, e.g., a mobile device such as by way of example a mobile phone, smart phone, laptop, tablet. In various embodiments, the UE 1 2004 is implemented in accordance with UE 500 shown in FIG. 5. The AAA server is an Authentication, Authorization and Accounting server which may be implemented in accordance with the network equipment device 600 shown in FIG. 6. The Access Point/Controller 2006 may be implemented in accordance with the Access Point shown in FIG. 4. While not shown the UE 1 2004 typically connects to the Internet via a Wireless Access Gateway which couples the UE 1 2004 to the Internet.

The signaling diagram/method 2000 may be, and in some embodiments is, implemented using exemplary system 100 of FIG. 1. In such embodiments, the UE 1 2004 is UE 1 108 of system 100. The Access Point 2006 is Access Point 102 of system 100 combined with WLAN controller 114, e.g., the functionality of both devices being present in Access Point 102. In other embodiments, various messages, e.g., probe requests, public action frames, queries, received by the Access Point 102 are forwarded from the Access Point 102 to the WLAN controller 114 which sends back messages, e.g., probe responses, public action frame responses, query responses, to the Access Point 102 for delivery to the UE devices. The AAA server 2008 is AAA server 118 which may include database 120. The Internet 2010 is Internet 122 in FIG. 1. The UE 1 108 of system 100 attains access to the Internet 122 via Access Point 102 over communications link 130 to WAG 116 which is coupled to the Internet 122. However, it should be understood that the method 2000 is not limited to the exemplary system 100 and may be, and is used, on other systems and system configurations. The signaling diagram/method 2000 illustrates the signaling and steps for a user equipment device, e.g., a mobile device, to connect to a network with a hidden Passpoint SSID using an enhanced Probe Request for obtaining access to the Internet.

The method 2000 starts in start step 2022 shown on FIG. 2A. Operation proceeds from start step 2022 and proceeds to steps 2024 and 2026.

The Access Point/Controller 2006 is a Passpoint Hotspot (HS) 2.0 Access Point also referred to herein as a Passpoint Access Point, Hotspot 2.0 Access Point, or just Access Point which is enabled and/or configured to implement the IEEE 802.11u protocol standard. Passpoint which as previously discussed is also known as Hotspot 2.0 being an IEEE 820.11u standard based protocol to enable network discovery, seamless connectivity and roaming between WLAN/Wi-Fi and cellular networks. It provides cellular network like connectivity to a WLAN automatically with no manual intervention required, and offloads the traffic to a Wi-Fi network. In this example, the Access Point 2006 has been implemented to respond to SSID name queries from user equipment devices as discussed in further detail below.

In step 2024, Access Point/Controller 2006, also referred to herein as Access Point 2006 or AP 2006 is configured to support and/or provide services for a plurality of networks, e.g., Wireless Local Area Networks (WLANs), including a first network, a second network, . . . , Nth network. The Access Point 2006 includes a dual-band radio or multi-band radio, with multiple SSID's per radio supported. Each radio supporting a different radio access technology (RAT). In various embodiments, the Access Point 2006 includes a different wireless interface for each Radio Access Technology supported and a different SSID for each corresponding wireless interface. The Access Point is configured with Hotspot 2.0 Passpoint set for hidden enabled (e.g., as an SSID=NULL). In IEEE 802.11 beacon frames, e.g., beacon announcement frames, the SSID is set to NULL or "hidden" by the SSID length field in the beacon frame being set to zero. In this example, each of the networks supported and/or for which the Access Point 2006 provides services is a hidden network with the SSID set to NULL in the beacon frames it broadcasts.

The first network e.g., a first WLAN, is operated and/or owned by a first service provider, i.e., service provider 1. The second network, e.g., a second WLAN, is operated and/or owned by a second service provider, i.e., service provider 2; . . . , the Nth network, e.g., Nth WLAN, is operated and/or owned by a third service provider, i.e., service provider N. The Network Address Identifier/Realm Name, hereinafter Network Address Identifier realm name or NAI realm name for the first network being SERVICEPROVIDER1.COM. The NAI for the first network being SERVICEPROVIDER1 and the realm being COM. The period in SERVICEPROVIDER1.COM separating the NAI from the realm. The NAI realm name for the second network being SERVICEPROVIDER2.NET. The NAI for the second network being SERVICEPROVIDERr2 and the realm being NET. The period in SERVICEPROVIDER2.COM separating the NAI from the realm. The NAI realm name for the Nth network being SERVICEPROVIDERN.M where N is an integer greater than 2 representing the network number and M represents the realm. In various embodiments, two or more of the networks supported by the Access Point 2006 may be owned and/or operated by the same service provider. FIG. 15 illustrates a table 1500 which includes profile information for a plurality of networks. Each of rows 1508, 1510, 1512, 1514 and 1516 representing records for a different network with column 1502 entry including NAI realm name for the network and column 1504 including credentials, e.g., authentication credentials for the network. In some embodiments, the NAI realm name is considered part of the credentials and is a sub-record of the credentials record or an index to the credentials record.

In step 2026, the UE 1 2004 is provisioned or configured with Passpoint Network subscription credentials for one or more networks, e.g., at the time of manufacturer, initialization or update. The provisioning may be, and in some embodiment is, done using one or more Subscriber Mobile Identity cards inserted into the UE 1. For example, each of the SIM cards in some embodiments contain Passpoint Network subscription credentials for a different service providers network(s). In this example, the UE 1 2004 is provisioned with Passpoint Network subscription credentials for the first network which is operated and/or owned by service provider 1 so UE 1 2004 can connect to the first network and obtain Internet access. Furthermore, the UE 1 2004 is also provisioned with Passpoint Network subscription credentials for the second network which is operated and/or owned by service provider 2 so the UE 1 2004 can connect to the second network and obtain Internet access.

Operation proceeds from step 2026 to step 2028. In step 2028, UE 1 2004 enters the coverage area of one or more subscribed passpoint network(s), e.g., the first network, the second network or the first and second network. Operation proceeds from step 2028 to step 2030.

In step 2030, the Access Point 2006 generates one or more beacon frames 2034 with hidden SSIDs and HS2.0 parameters advertising network services. The beacon frames being generated so that the SSIDs are set to NULL, e.g., the SSID length of the beacon frame being set to zero. Operation proceeds from step 2030 to step 2032.

In step 2032, the Access Point 2006 broadcast, e.g., transmits over the air, the generated one or more beacon frames 2034 with hidden SSIDs. That is the beacon frames broadcast have the SSID set to NULL. Operation proceeds from step 2032 to step 2036. Steps 2030 and 2032 which include the generation of beacon frames are repeated, e.g., on a periodic basis by the Access Point 2006, so as to continuously advertise and/or announce the Access Point's presence and indicate that network services are available.

In step 2036, UE 1 2004 performs passive scanning. During the passive scanning UE 1 2004 receives from the Access Point 2006, the beacon frames 2034 broadcast by the Access Point 2006. Operation proceeds from step 2036 to step 2038.

In step 2038, UE 1 2004 processes the one or more received beacon frames 2034 and determines that the SSID names are hidden. Operation proceeds from step 2038 to step 2040.

In step 2040, in response to receiving the beacon frames 2034 and determining that the SSID names are hidden, the UE 1 2004 generates probe request 2044 requesting network information from the Access Point 2006. Operation proceeds from step 2040 to step 2042.

In step 2042, UE 1 2004 transmits the probe request 2044 over the air to the Access Point 2006. Operation proceeds from step 2042 to step 2046.

In step 2046, Access Point 2006 receives the probe request 2044. Operation proceeds from step 2046 to step 2048.

In step 2048, the Access Point 2006 processes the probe request 2044 and determines that the UE 2004 is requesting network information for the networks, network service providers, and/or services it is supporting. In some embodiments, the probe request 2044 has an SSID set to zero or wild card as the UE 1 2004 does not have the SSID name for the network corresponding to the beacon frames.

In step 2050, the Access Point 2006 generates Probe Response 2054 in response to the Probe Request 2044. The Probe Response 2054 does not include an SSID name in the response as the Access Point 2006 is enabled as SSID hidden. The Probe Response includes information about the networks, network service providers, and/or services it is supporting. Operation proceeds from step 2050 to step 2052.

In step 2052, the Access Point 2006 transmits over the air or wirelessly the Probe Response 2054 to the UE 1 2004. Operation proceeds from step 2052 to step 2056.

In step 2056, the UE 1 2004 receives the Probe Response 2054 from the Access Point 2006. Operation proceeds from step 2056 to step 2058.

In step 2058, UE 1 2004 processes the Probe Response 2054 and determines based on the Probe Response 2054 and/or information from one or more of the Beacon Frames 2036 to implement a public action frames network discovery and selection procedure 2060, e.g., IEEE 802.11u Public Action Frames network Discovery and Selection Procedure.

In some embodiments, UE 1 2004 in 2038 makes the determination to implement a public action frames network discovery and selection procedure e.g., IEEE 802.11u Public Action Frames network Discovery and Selection Procedure, 2060 based on information contained in one or more of the received Beacon Frames 2034. In some embodiments, the steps 2040, 2042, 2046, 2048, 2052, 2056, and 2058 are bypassed and not performed by the UE 1 2004 or the Access Point 2006 and instead operation proceeds from step 2038 to step 2060. In some embodiments, steps 2040 to step 2058 are performed in an attempt to identify Access Points and/or networks within wireless coverage range of the UE 1 2004 regardless of whether or not the UE has received beacon frames.

In step 2060, UE 1 2004 performs network discovery and selection procedures (e.g. using the IEEE 802.11u protocol) after determining that one or more HS2.0 networks are available through receipt of the beacon frames 2034 and/or through the probe response 2054 and that the HS 2.0 network Access Point 2006 from which it is receiving signals is implemented so that the SSID names are set to NULL, i.e., the Access Point 2006 has been configured to have a hidden SSIDs. These procedures are performed using Access Network Query Protocol (ANQP)/Generic Advertisement Service (GAS). Step 2060 includes one or more sub-steps 2062, 2064, 2068, 2070, 2072, 2074, 2078, 2080, 2082, and 2086. Operation proceeds from step 2060 to step 2088.

In sub-step 2062, UE 1 generates a Generic Advertisement Service (GAS) initial request 2066. The GAS initial request 2066 is a query request for information about the realms, capabilities, services of the Access Point 2006. Operation proceeds from sub-step 2062 to sub-step 2064.

In sub-step 2064, the UE 1 2004 transmits the GAS initial request 2066 to the Access Point 2006. Operation proceeds from sub-step 2064 to sub-step 2068.

In sub-step 2068, the Access Point 2006 receives the GAS initial request 2066. Operation proceeds from sub-step 2068 to sub-step 2070.

In sub-step 2070, Access Point 2006 processes the GAS initial request 2066 and obtains and/or determines information, e.g., NAI realms, 3GPP PLM, other HS 2.0 parameters for responding to the query included in the GAS initial request 2066. Operation proceeds from sub-step 2070 to sub-step 2072.

In sub-step 2072, the Access Point 2006, generates GAS initial response message 2076. The Generic Advertisement Service (GAS) initial response message 2076 includes information requested in the GAS initial request 2066, e.g., NAI realm names of supported networks, 3GPP Public Land Mobile Network information, e.g., PLMN code, and other HS 2.0 parameters. Operation proceeds from sub-step 2072 to sub-step 2074.

In sub-step 2074, the Access Point 2006 transmits the GAS initial response message 2076 to the UE 1 2004 in response to the GAS initial request message 2066. Operation proceeds from sub-step 2074 to sub-step 2078.

In sub-step 2078, UE 1 2004 receives the GAS initial response message 2076 from the Access Point 2006. Operation proceeds from sub-step 2078 to sub-step 2080.

In sub-step 2080, UE 1 2004 processes the GAS initial response message 2076. Operation proceeds from sub-step 2080 to sub-steps 2082 and 2086. In sub-steps 2082 and 2086 additional GAS request and GAS response messages referred to as GAS comeback request/response messages 2084 are generated and exchanged between UE 1 2004 and Access Point 2006. Further in sub-steps 2082 and 2086, UE 1 2004 and Access Point 2006 process the exchanged messages each receives. This exchange of messages allows UE 1 2004 to gain additional information from the Access Point 2006 for use in determining whether the Access Point 2006 provides services and/or supports a passpoint network to which UE 1 2004 has been provisioned with credentials. Operation proceeds from sub-step 2060 to step 2088.

In step 2088, UE 1 2004 detects and/or determines that subscribed Passpoint Network, e.g., a network for which it has been provisioned with credentials, is available based on information received during the network and discovery selection procession, e.g., NAI/REALM/3GPP network information received in response to the GAS/ANQP query. Operation proceeds from step 2088 to step 2090.

In step 2090, UE 1 detects and/or determines that the network name is not available and determines to discover the network name using Enhanced Active Scanning. Operation proceeds from step 2090 to step 2092 shown on FIG. 2B.

In step 2092, an enhanced Active Scanning procedure is implemented in which the UE 2004 obtains and/or discovers the SSID name or SSID names of networks for which it is credentialed and which are supported by the Access Point 2006 but which have a hidden SSID. The enhanced Active Scanning procedure includes UE 1 2004 generating and transmitting an enhanced Probe Request with an SSID query including one or more criteria to the Access Point 2006 and the Access Point 2006 in response to receiving the enhanced Probe Request with an SSID query including one or more criteria responding by generating and sending an Enhanced Probe Response to the UE 1 2004 including the SSID name or names of networks which it is supporting and match the one or more criteria. Diagram 1104 of FIG. 11 illustrates an exemplary enhanced Probe Request vendor specific content element enhanced to include the SSID query and criteria. In the example of diagram 1113 of FIG. 11 the SSID name query is a query for a plurality of 1 to N SSID names with the matching criteria being the NAI realm name. Diagram 1204 of FIG. 12 illustrates an exemplary enhanced Probe Request vendor specific content element enhanced to include the response to the SSID query, i.e., the SSID names of networks which it is supported and/or providing services that match the criteria included in the SSID query, e.g., in this example the NAI realm names provided in the SSID query. At the conclusion of step 2092, the UE 1 2004 has obtained and/or discovered the SSID name of one or more hidden SSID networks for which the UE 1 2004 has credentials and which are supported by the Access Point 2006. This assumes that one or more of the networks supported by the Access Point 2006 match the criteria supplied in the SSID query otherwise the SSID names remain hidden as the UE 1 2004 is not provisioned to have the credentials to access and/or connect and/or utilize the networks supported by the Access Point 2006. In some embodiments, step 2092 includes one or more sub-steps 2094, 2096, 2100, 2102, 2104, 2106, 2110, and 2112. Operation proceeds from step 2092 to step 2114.

In sub-step 2094, the UE 1 2004 generates enhanced probe request 2098 including SSID query. For example, the SSID query illustrated in diagram 1128 including two NAI realm names as the matching criteria for a first network and a second network. The first NAI realm name is SERVICEPROVIDER1.COM. The second NAI realm name is SERVICEPROVIDER2.NET. The UE 1 2004 having been provisioned with credentials for both of these networks. In some embodiments, the enhanced probe request is a directed unicast message with a flag indicating that it includes an SSID name query. Operation proceeds from sub-step 2094 to sub-step 2096.

In sub-step 2096, UE 1 2004 transmits the enhanced probe request 2098 to the Access Point 2006. Operation proceeds from sub-step 2096 to sub-step 2100.

In sub-step 2100, the Access Point 2006 receives the enhanced probe request 2098. Operation proceeds from sub-step 2100 to sub-step 2102.

In sub-step 2102, the Access Point 2006 processes the received enhanced probe request 2098 by extracting the criteria for each SSID name query and determining if the Access Point 2006 supports a network with matching criteria. In this example, the criteria for the first network is the NAI realm name SERVICEPROVIDERr1.COM and the criteria for the second network is the NAI realm name SERVICEPROVIDER2.NET. In this example, the Access Point 2006 finds a match for each of the realm names. The NAI realm name SERVICEPROVIDER1.COM has a SSID name of SP1-SSID. The SERVICEPROVIDER2.NET has a SSID name of SP2-SSID. In various embodiments, the Access Point 2006 makes the determination that the criteria for a network in an SSID query is matched to a supported network by comparing the criteria to information stored at the Access Point 2006 for networks supported by the Access Point 2006. Operation proceeds from sub-step 2102 to sub-step 2104.

In sub-step 2104, the Access Point 2006 generates enhanced probe response message 2108. The enhanced probe response message being unicast message directed specifically to UE 1 2004 and including the response to the SSID name query included in the enhanced probe request 2098. Diagram 1228 illustrates an exemplary enhanced probe response vendor specific content fields populated with a response to the SSID name query. The enhanced probe response 2108 includes the SSID name "SP1-SSID" in response to the query with NAI realm name "SERVICEPROVIDER1.COM" and SSID name "SP2-SSID" in response to the query with NAI realm name "SERVICEPROVIDER2.NET". Operation proceeds from sub-step 2104 to sub-step 2106.

In sub-step 2106, the Access Point 2006 transmits the enhanced probe response 2108 to the UE 1 2004 in response to the enhanced probe request 2098. Operation proceeds from sub-step 2106 to sub-step 2110.

In sub-step 2110, UE 1 2004 receives the enhanced probe response from Access Point 2006. Operation proceeds from sub-step 2110 to sub-step 2112.

In sub-step 2112, UE 1 2004 processes the received enhanced probe response 2108. Processing the received enhanced probe response 2108 including extracting the response to the SSID name query including the SSID name SP1-SSID corresponding to the first network with the NAI realm name SERVICEPROVIDER1.COM and also extracting the SSID name SP2-SSID corresponding to the second network with the NAI realm name SERVICEPROVIDER2.NET. As the Access Point 2006 supports two different networks for which the UE 1 2004 has been provisioned with credentials, the UE 1 2004 makes a determination as to which of the first network or the second network it wishes to utilize for accessing the Internet. This determination may be, and in some embodiments is, based on information about the two networks obtained in the public action frames network discovery and selection procedure 2060 (e.g., data rates, spectrum/frequencies utilized, quality of service parameters). In this example, UE 1 2004 selects the first network with the SSID name: SP1-SSID.

In some embodiments, a selection is made in step 2060 and separate enhanced probe requests including an SSID name query for a specific network are sent for each network in order of preference. This however requires multiple queries in the event that not all of the preferred networks are supported by the Access Point.

Operation proceeds from step 2092 to step 2114.

In step 2114, open system authentication procedures, e.g., IEEE 802.11 Open System Authentication procedures, are implemented by UE 1 2004 and Access Point 2006. In some embodiments, step 2114 includes one or more sub-steps 2116, 2118, 2122, 2124, 2126, 2130 and 2132. Operation proceeds from step 2114 to step 2134.

In sub-step 2116, UE 1 2004 generates authentication request message 2120, e.g., an open system authentication request message. Operation proceeds from sub-step 2116 to sub-step 2118.

In sub-step 2118, UE 1 2004 transmits the authentication request message 2120 to Access Point 2006. Operation proceeds from sub-step 2118 to sub-step 2122.

In sub-step 2122, the Access Point 2006 receives the authentication request message 2120. Operation proceeds from sub-step 2122 to sub-step 2124. In sub-step 2124, the Access Point 2006 processes the authentication request message 2120 and in response generates authentication response message 2128 accepting the authorization request. Operation proceeds from sub-step 2124 to sub-step 2126.

In sub-step 2126, the Access Point 2006 transmits authentication response message 2128 to UE 1 2004 in response to the received authentication request message 2120. Operation proceeds from sub-step 2126 to sub-step 2130.

In sub-step 2130, UE 1 2004 receives the authentication response message 2128. Operation proceeds from sub-step 2130 to sub-step 2132.

In sub-step 2132, UE 1 2004 processes authentication response message 2128 and determines that authentication with Access Point 2006 has been successful. Operation proceeds from step 2114 to step 2134.

In step 2134, UE 1 2004 associates with the selected network supported by the Access Point 2006 using the SSID name corresponding to the selected network provided by the Access Point 2006 in response to the SSID query. In various embodiments, the UE 1 2004 utilizes and/or implements the IEEE 802.11 Association Procedure using the discovered SSID name when associating with the network via the Access Point 2006. In some embodiments, step 2134 includes one or more sub-steps 2136, 2138, 2142, 2144, 2146, 2150, and 2152. Operation proceeds from step 2134 to step 2154 shown on FIG. 3C.

In sub-step 2136, UE 1 2004 generates association request message 2140. The association request message 2140 includes the SSID name of the selected network. The SSID name having been discovered and/or obtained from the Access Point 2006 through enhanced active scanning as described in connection with step 2092. Operation proceeds from sub-step 2136 to sub-step 2138.

In sub-step 2138, UE 1 2004 transmits the Association Request message 2140 to Access Point 2006. Operation proceeds from sub-step 2138 to sub-step 2142.

In sub-step 2142, Access Point 2006 receives the Association Request message 2140. Operation proceeds from sub-step 2142 to sub-step 2144.

In sub-step 2144, the Access Point 2006 processes the Association Request message 2140. Processing the Association Request message 2140 including extracting the SSID from the Association Request message and any information, e.g., credential information, required for associating the UE 1 2004 with the network having the SSID extracted from the Association Request message 2140. Processing the Association Request message 2140 further including associating UE 1 2004 with the network having the SSID extracted from the Association Request message 2140 and generating an Association Response message 2148 indicating successful association when the association between UE 1 2004 and the network having the SSID extracted from the message has been completed. Operation proceeds from sub-step 2144 to sub-step 2146.

In sub-step 2146, Access Point 2006 transmits the Association Response message 2148 to UE 1 2004. The Association Response message 2148 including information indicating that UE 1 2004 has been successfully associated with the network with the SSID included in the Association Request message 2140. Operation proceeds from sub-step 2146 to sub-step 2150.

In sub-step 2150, UE 1 2004 receives the Association Response message 2140. Operation proceeds from sub-step 2150 to sub-step 2152.

In sub-step 2152, UE 1 2004 processes the received Association Response message 2148 and determines that UE 1 2004 has been successfully associated with Access Point 2006 and the network having the SSID included in the Association Request message 2140. Operation proceeds from step 2134 to step 2154.

In step 2154, UE 1 2004 is authenticated by the selected network, e.g., by using the provisioned credentials to implement an authentication procedure such as IEEE 802.11X Extensible Authentication Protocol (EAP) Authentication Procedure. In some embodiments, step 2154 includes one or more sub-steps 2156, 2158, 2162, 2166, 2168, 2172, and 2174. Operation proceeds from step 2154 to step 2176.

In sub-step 2156, UE 1 2004 generates an EAP authentication message which is included in the Authentication messages 2160. Operation proceeds from sub-step 2156 to sub-step 2158.

Sub-steps 2158, 2162, and 2166, illustrates the exchange of EAP authentication messages 2160 between UE 1 2004 and Access Point 2006 and the relaying/exchange of EAP authentication messages 2164 between Access Point 2006 and AAA Server 2008. EAP Authentication messages 2160 represent EAP Authentication messages transmitted from UE 1 2004 to Access Point 2006 which receives them and relays the messages to AAA server 2008 as EAP Authentication messages 2164. The EAP Authentication messages 2164 also represent the response EAP Authentication messages generated and transmitted from the AAA server to Access Point 2006 which relays these messages to UE 1 2004. The EAP Authentication messages 2160 include the relayed response messages. Sub-step 2158 being the processing performed by the UE 1 during the EAP authentication procedure. Sub-step 2162 being the processing performed by Access Point 2006 during the EAP authentication procedure. Sub-step 2166 being the processing performed by the AAA server 2008 during EAP Authentication. Upon successful EAP authentication, operation proceeds from sub-steps 2158, 2162, 2166 to sub-steps 2168 and 2172 which is a 4-way exchange of encryption keys between UE 1 2004 and Access Point 2006. Sub-step 2168 being the processing performed by UE 1 2004 for the 4-way handshake encryption key exchange. Sub-step 2172 being the processing performed by Access Point 2006 for the 4-way handshake encryption key exchange. Messages 2170 being the 4-way handshake message generated and transmitted by the UE 1 2004 and Access Point 2006 for the 4-way handshake encryption key exchange. These messages include the encryption keys being exchanged. Operation proceeds from sub-steps 2168 and 2172 to sub-step 2174. In sub-step 2174, UE 1 2004 determines that it has successfully completed EAP Authentication procedure and can now access the Internet via Access Point 2006 and the network with which UE 1 2004 associated with in step 2134 having the SSID name which was originally hidden but was learned/obtained in step 2092. Operation proceeds from step 2154 to step 2176.

In step 2176, the UE 1 2004 obtains Internet access via Access Point 2006 using the selected network with which it has associated itself. In some embodiments, step 2176 includes one or more sub-steps 2178, 2180, 2184, 2188, 2190 and 2192.

In sub-step 2178, UE 1 2004 determines that it wants to access the Internet. Operation proceeds from sub-step 2178 to sub-step 2180, 2184, and 2188 which illustrate the exchange of messages including data wherein the UE 1 2004 obtains internet access via Access Point 2006 and the network with which UE 1 is now associated. Sub-step 2180 includes the processing performed by UE 1 2004 in exchanging encrypted messages with Access Point 2006 including the generation, encryption, and transmission of messages sent to Access Point 2006 and the reception and decryption of messages received from Access Point 2006. Messages 2182 are the encrypted messages exchanged between UE 1 2004 and Access Point 2006 when UE 1 2004 obtains and utilizes internet access via Access Point 2006. The encryption keys exchanged during the EAP authentication being used for encrypting the messages 2182. Sub-step 2184 includes the processing performed by Access Point 2006 in exchanging encrypted messages with UE 1 2004 and sending and receiving unencrypted messages 2186 over the Internet 2010. The Access Point 2006 receives encrypted messages from UE 1 2004 decrypts the messages and transmits them over the network with which UE 1 2004 is associated out onto the Internet typically through a Wireless Access Gateway through which the Access Point 2006 is connected and/or coupled to the Internet. The Access Point 2006 also receives unencrypted messages from the Internet and encrypts and relays the messages to the UE 1 2004. Messages 2182 exchanged between UE 1 2004 and Access Point 2006 are sent wirelessly over the air while unencrypted messages 2186 which are exchanged between the Access Point 2006 and the Internet are sent over a cable, wired, or optical network link or connection.

Operation proceeds from sub-steps 2180, 2184, 2188 to sub-steps 2190 and 2192. In sub-steps 2190 and 2192, the Internet Access is terminated. In step 2190, UE 1 2004 terminates the Internet access. In step 2192, Access Point 2006 terminates the Internet access, e.g., in response to UE 1 2004 terminating Internet access or its connection with Access Point 2006.

The process is repeated from step 2036 when the mobile changes position and beacon frames with hidden SSID are received from another Access Point (e.g., Passpoint HS 2.0 Access Point).

While the method 2000 illustrated in FIG. 2, has been explained with respect to a single UE device and a single Access Point the method may be, and typically is implemented for a plurality of UE devices, e.g., mobile devices, which each are pre-provisioned, e.g., at time of purchase or initialization, and which receive beacon frames from a plurality of different Access Points as the UE devices enter and exit coverage areas for the different Access Points.

The steps of another exemplary call flow procedure in accordance with another exemplary embodiment of the present invention will now be discussed. This exemplary embodiment utilizes an Enhanced Public Action Frames procedure to discover and/or obtain the SSID name or SSID names of hidden networks in which the SSID name is not included in beacon frames transmitted from Access Points supporting the network. In this embodiment, an enhanced Public Action Frame request is generated and sent by a user equipment device, e.g., mobile device, to a Passpoint Hotspot 2.0 Access Point. The enhanced Public Access Frame request includes an SSID query which may be, and in some embodiments is, included in a vendor specific content field of the enhanced Public Action Frame request. The Passpoint Hotspot 2.0 Access Point responds to the enhanced Public Action Frame request with an enhanced Public Action Frame response which is sent from the Access Point to the user equipment device. The enhanced Public Action Frame response includes the SSID name of the network which matches the query criterion specified in the enhanced Public Action Frame request. The SSID name is included in some embodiments in a vendor specific content field of the enhanced Public Action Frame response. The user equipment device upon receiving the SSID name from the Access Point uses it to associate with the Access Point and then connect to the Internet.

In some embodiments, the enhanced Public Action Frame request is a Generic Advertisement Service Frame with Access Network Query element or field. In some embodiments, the ANQP element of the request includes a vendor specific-content field. The vendor specific content field in most embodiments is variable in length. The SSID query may be, and in some embodiments is, included in the vendor specific content field.

In some embodiments, the enhanced Public Action Frame response is a Generic Advertisement Service Frame with an Access Network Query element or field. In some embodiments, the ANQP element or field of the response includes a vendor specific element. The vendor specific element includes a vendor-specific-content field. The vendor-specific content field in most embodiments is variable in length. The SSID name provided by the Access Point in response to the query in some embodiments is included by the Access Point in the vendor specific content field of the ANQP element or field.

In step 1, a Passpoint Hotspot 2.0 Access Point includes a dual-band or multi-band radio interfaces with multiple SSIDs. One SSID for each radio interface supported. Operation proceeds from step 1 to step 2.

In step 2, the Access Point is configured with HS 2.0 Passpoint SSID, e.g., SPECTRUM MOBILE. The SSID is hidden enabled, e.g., SSID or SSID length is set to NULL. Operation proceeds from step 2 to step 3

In step 3, a user equipment device, e.g., a mobile device, is pre-provisioned with the credentials required to connect to the network with SSID name SPECTRUM MOBILE and be provided internet access services. However, in this embodiment, the user equipment device is not pre-provisioned with the SSID name of the network. Instead, it has been pre-provisioned with the Network Address Identifier/realm name of the WLAN network which is SPECTRUM.COM. Pre-provisioned referring to being provisioned prior to the start of the procedure.

In step 4, the user equipment device enters the coverage area of the Access Point serving the WLAN network with SSID: SPECTRUM MOBILE. In this example, SPECTRUM MOBILE is the SSID. It should be understood that SPECTRUM MOBILE is only an exemplary SSID which has been used for illustrative purposes.

In step 5, the user equipment device performs passive scanning and determines and/or realizes there is a Hotspot 2.0 network available from the Beacon frames received from the Access Point. The user equipment device also determines from the Beacon frames it receives from the Access Point that the SSID name is set to NULL due to the fact that the network has been configured as hidden on the Access Point. The Beacon frames broadcast from the Access Point have the SSID set to NULL, e.g., the SSID length field is set to NULL or zero length. While multiple beacon frames have been described as being received by the UE a single beacon frame is sufficient in at least some embodiments. Operation proceeds from step 5 to step 6.

In step 6, the UE performs network discovery procedures using the IEEE 802.11u protocol. These procedures are performed using ANQP (Access Network Query Protocol)/GAS (Generic Advertisement Service) query also sometimes referred to as a GAS/ANQP query. Generic Advertisement Protocol (GAS), provides Layer 2 transport of advertisement protocol frames between a user equipment device (e.g., mobile device) and an Access Point prior to device authentication. The Access Network Query Protocol (ANQP) is a query and response protocol used by a mobile device to discover network information such as for example hotspot operator's domain name, 3GPP details, roaming consortium, credential type and Extensible Authentication Protocol (EAP) method supported for authentication; Internet Protocol address type availability and other details useful for a user equipment device (e.g., mobile device) network selection process, e.g., determining which network of a plurality of networks to associate and/or connect to. The UE generates and sends a GAS/ANQP query to the Access Point from which it received the beacon frames. Operation proceeds from step 6 to step 7.

In step 7, the Access Point receives the GAS/ANQP query from the UE and sends a GAS/ANQP query response to the UE with network information including the information described above in step 6. The GAS/ANQP query response however does not send the SSID name for the network or networks it is supporting. Operation proceeds from step 7 to step 8.

In step 8, the UE receives the GAS/ANQP query response from the Access Point. Operation proceeds from step 8 to step 9.

In step 9, the UE processes the received GAS/ANQP query response and based on GAS/ANQP query response, e.g., network information contained in the GAS/ANQP query response, makes a decision to associate, if the UE finds and/or determines that credentials in its profile match with the Network Address Identifier/realms or PLMN (Public Lan Mobile Network), etc. The profile with one or more sets of network credentials having been stored or included in the UE during provisioning. In this example, the NAI/realm SPECTRUM.COM is included in the GAS/ANQP query response. The UE determines that it has credentials for the NAI/realm SPECTRUM.COM and makes the decision to associate with the network supported by the Access Point. However, the UE at this point does not have the SSID name for the network which is required for association and/or authentication with the network via the Access Point. Operation proceeds from step 9 to step 10.

In step 10, before attempting to perform the conventional 802.11 open system authentication procedure, the following Enhanced Public Action Frames Procedure is performed to learn and/or obtain the SSID name of the network. Step 10 includes sub-step 10A, 10B, 10C, 10D, 10E, 10F, 10G and 10H.

Figure 18:
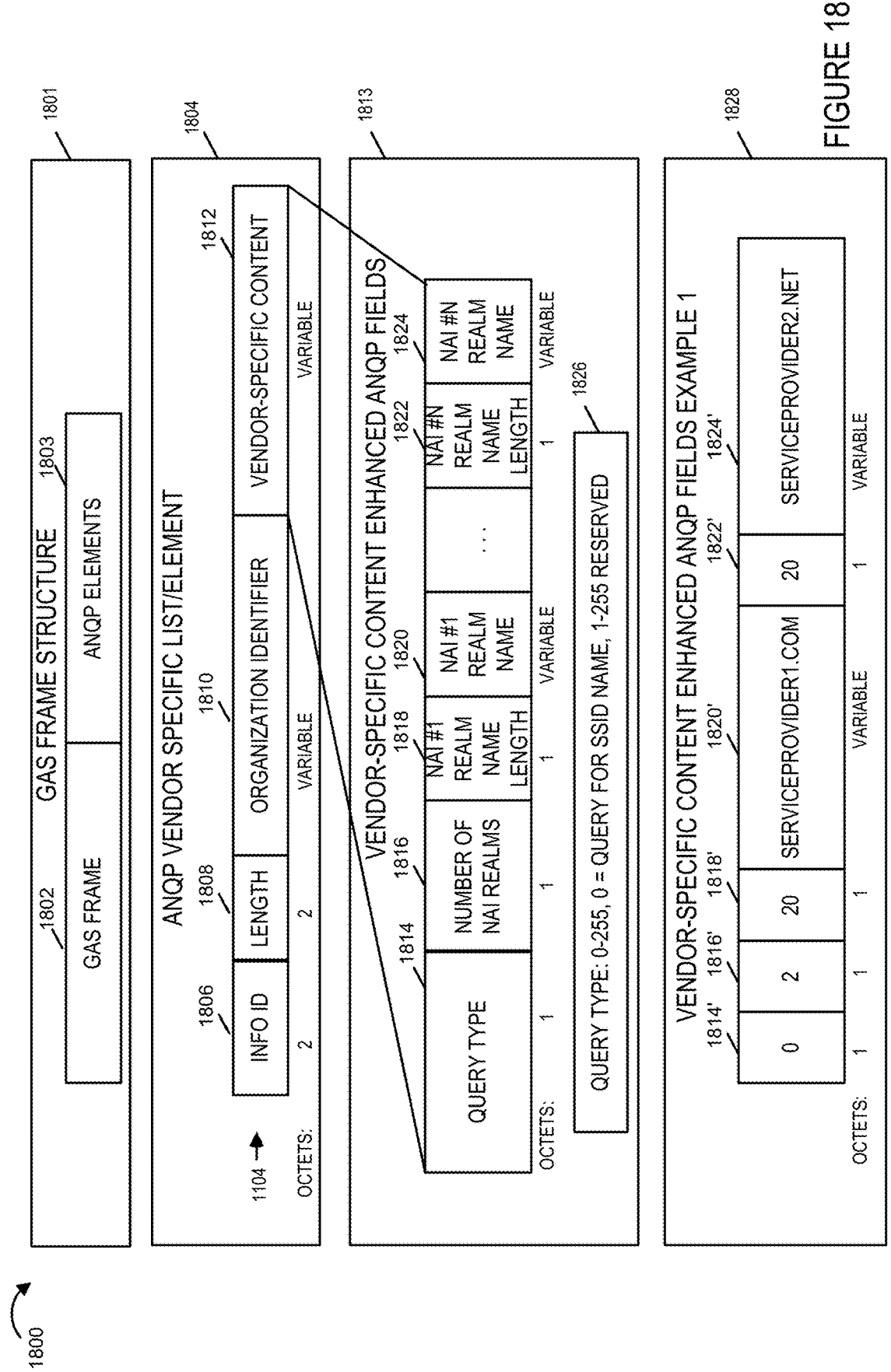
FIG. 18 illustrates exemplary enhanced vendor specific content fields of an enhanced public action frame request in accordance with an embodiment of the present invention.
Figure 21:
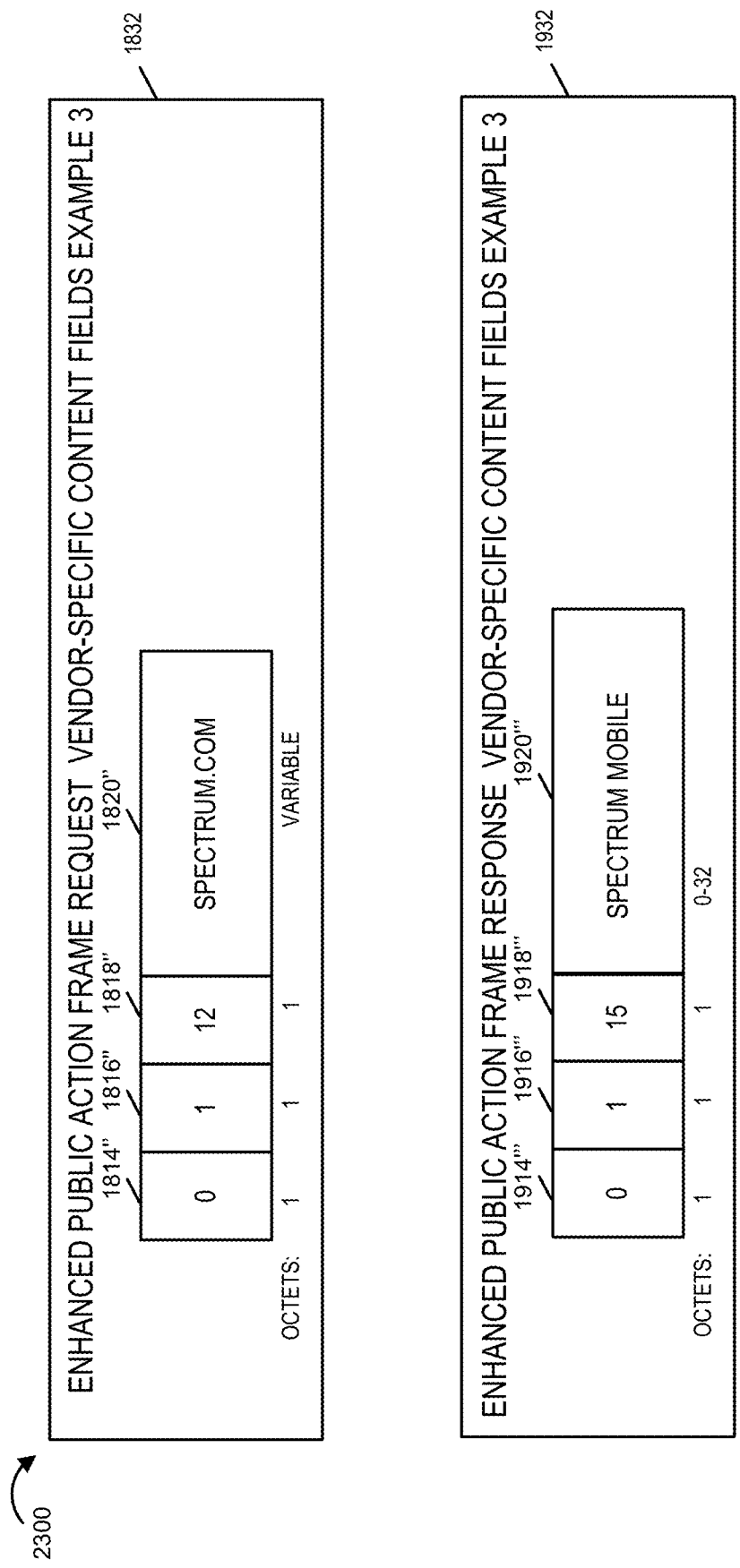
FIG. 21 illustrates another example of populated enhanced public action frame request vendor-specific content fields and another example of populated enhanced public action frame response vendor-specific content fields in accordance with an embodiment of the present invention.

In sub-step 10A, the UE generates an enhanced Public Action Frame request. The enhanced Public Action Frame request includes a SSID query requesting the Access Point to reveal the SSID hidden name of the network advertised by the beacon frames from the Access Point specifically to the requesting device, e.g., via a unicast enhanced Public Action Frame response message. Diagram 1800 of FIG. 18 illustrates an exemplary Public Acton Frame request having a GAS frame structure with ANQP elements. The enhanced GAS request contains a vendor-specific content portion 1812 of the ANQP vendor specific list/element which has been enhanced as shown in diagram 1813 to include a plurality of fields or sub-fields with SSID name queries in which NAI realm names are the specified criteria. Diagram 1832 of FIG. 21 illustrates an example of the enhanced public action frame request ANQP vendor-specific content fields in accordance with an embodiment of the present invention using the parameters of this example, e.g., NAI realm name being SPECTRUM.COM. The query type field 1814" is set to 0; the number of NAI realms 1816" is set to 1; the NAI realm length for the NAI #1 realm 1818" is set to 12 which is the length of the NAI #1 realm name SPECTRUM.COM, and the NAI #1 realm name field 1820" is set to SPECTRUM.COM the name of the NAI realm of the network with the hidden SSID.

In sub-step 10B, the UE transmits the enhanced Public Action Frame Request with SSID name query to the Access Point.

In sub-step 10C, the Access Point receives the enhanced Public Action Frame request including the SSID name query from the UE.

In sub-step 10D, the Access Point extracts the SSID name query, matches the network information provided in the query to the corresponding network SSID name. In this example, the network information provided in the SSID name query is the NAI realm name: SPECTRUM.COM and the corresponding SSID name is: SPECTRUM MOBILE.

Figure 19:
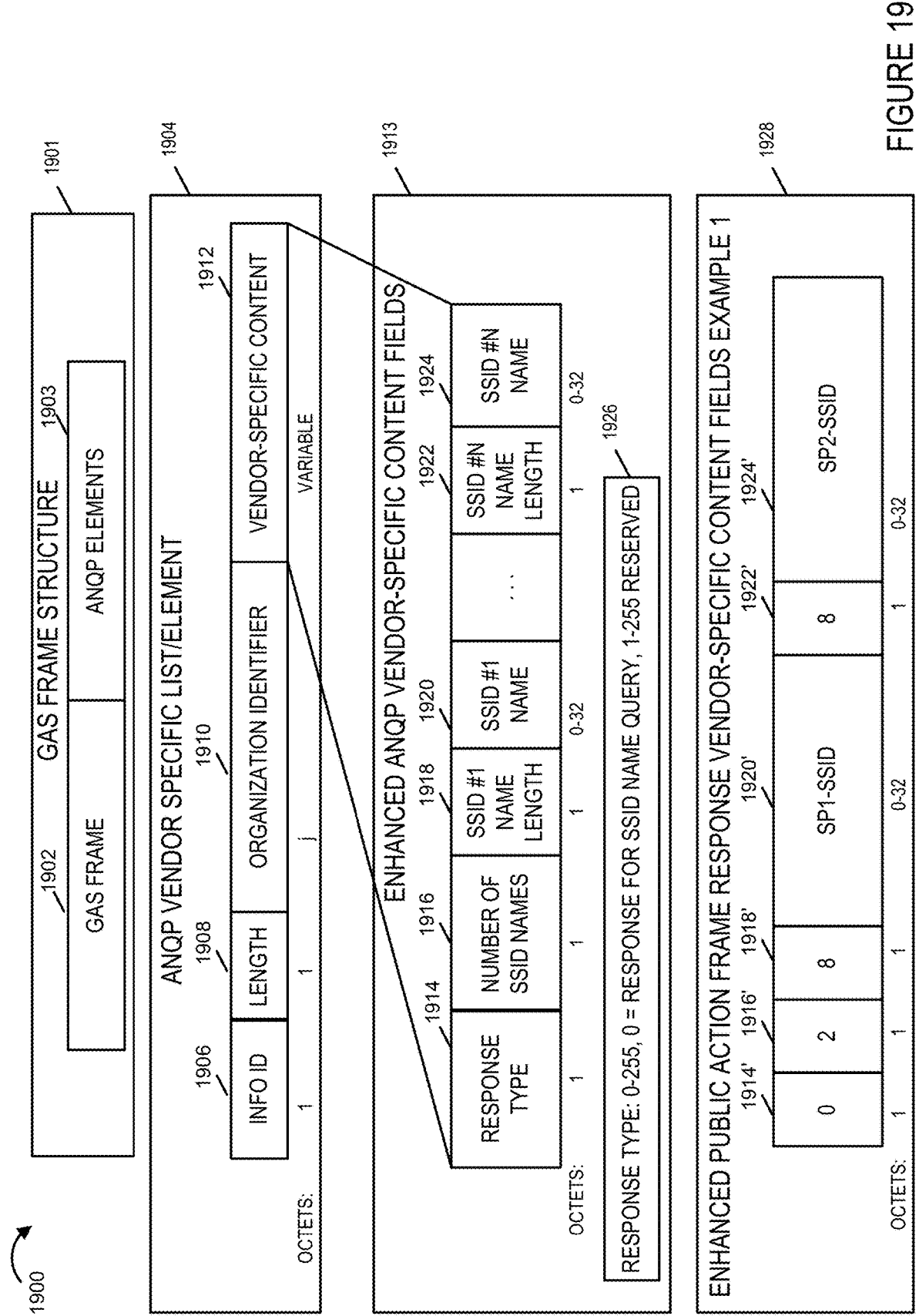
FIG. 19 illustrates exemplary enhanced vendor specific content fields of an enhanced public action frame response in accordance with an embodiment of the present invention.

In sub-step 10E, the Access Point generates an enhanced Public Action Frame Response with the SSID name requested in the query which is Spectrum Mobile. Diagram 1904 of FIG. 19 illustrates an exemplary Enhanced Public Action Frame Response ANQP vendor-specific list/element having a vendor-specific content portion or field that has been enhanced as shown in diagram 1913. The enhancements include SSID names which are included in the fields in response to the SSID query. Diagram 1932 of FIG. 21 illustrates an example of the vendor-specific content enhanced Public Action Frame response fields in accordance with an embodiment of the present invention using the parameters of this example, e.g., SSID name being SPECTRUM MOBILE. The response type field 1914''' is set to 0; the number of SSID names field 1916''' is set to 1; the SSID name length field for the SSID #1 name 1918' is set to 15, and the SSID #1 name field 1920''' is set to SPECTRUM MOBILE which is the SSID name matching the NAI realm name of the network SPECTRUM.COM which has the hidden SSID.

In sub-step 10F, the Access Point transmits the enhanced Public Action Frame Response with the SSID query response to the UE, e.g., as a unicast message sent specifically to the UE which sent the enhanced Public Action Frame Request.

In sub-step 10G, the UE receives the enhanced Public Action Frame Response from the Access Point.

In sub-step 10H, the UE determines the SSID name of the hidden SSID from and/or based on information contained in the enhanced Public Action Frame Response. For example, in embodiments that utilize the enhanced vendor specific content fields of FIG. 19, the SSID name is determined from the ANQP vendor specific content field in which the SSID name corresponding to the requested NAI realm name is contained. In this example, that is SSID #1 name field 1920' shown in the diagram 1932 of FIG. 21.

It should be understand that the specific format of the vendor specific content fields is only exemplary and other formats and fields may be and in some embodiments are used to convey the SSID query and SSID name responding to the query.

Operation proceeds from step 10 to step 11. In step 11, the UE performs the conventional 802.11 open system authentication. The UE having been provisioned with the credentials for authentication in connection with SPECTRUM-.COM network. Operation proceeds from step 11 to step 12

In step 12, the UE associates the SPECTRUM MOBILEe network via the Access Point using the SSID name discovered through the enhanced Public Action Frames procedure of step 10. For example, the UE performs the 802.11 association procedures using the SSID name SPECTRUM MOBILE discovered through the enhanced Public Action Frames procedure. Operation proceeds from step 12 to step 13.

In step 13, once the UE receives the Association response from the Access Point indicating successful association, the UE then commences the actual authentication using Extensible Authentication Protocol (EAP) followed by a 4-way exchange for encryption keys being performed. Upon successful authentication and key exchange operation proceeds from step 13 to step 14.

In step 14, the UE is allowed access to the Internet, e.g., via the Access Point and SPECTRUM MOBILE network, e.g., WLAN network. In some embodiments as illustrated in FIG. 1 the access to the Internet is obtained through a path such as the UE 1 108 to Access Point 1 102 over wireless link, Access Point 1 102 to Wireless Gateway 116 over network link 130, Wireless Access Gateway connecting and/or coupling the network to the network to the Internet. The procedure is repeated when the UE needs to connect to another network with an Access Point with hidden SSID functionality enabled.

In another embodiment, the UE gets the supported service provider subscription identifiers using GAS/ANQP prior to associating with the hidden SSID network. For example, the service provider subscription identifiers which are received from the Access Point are the NAI realm names: SERVICEPROVIDER1.COM, SERVICEPROVIDER2.NET, SERVICEPROVIDER3.COM. The UE checks the supported service provider list received from the Access Point, with the credentials pre-provisioned by respective service providers. In this example, the UE has been pre-provisioned with Service Provider 2 Credentials (for NAI: SERVICEPROVIDER2.NET). In various embodiments, a plurality of different Service Provider (NAI realm names) and SSID names have been pre-provisioned on the UE.

Figure 3A:
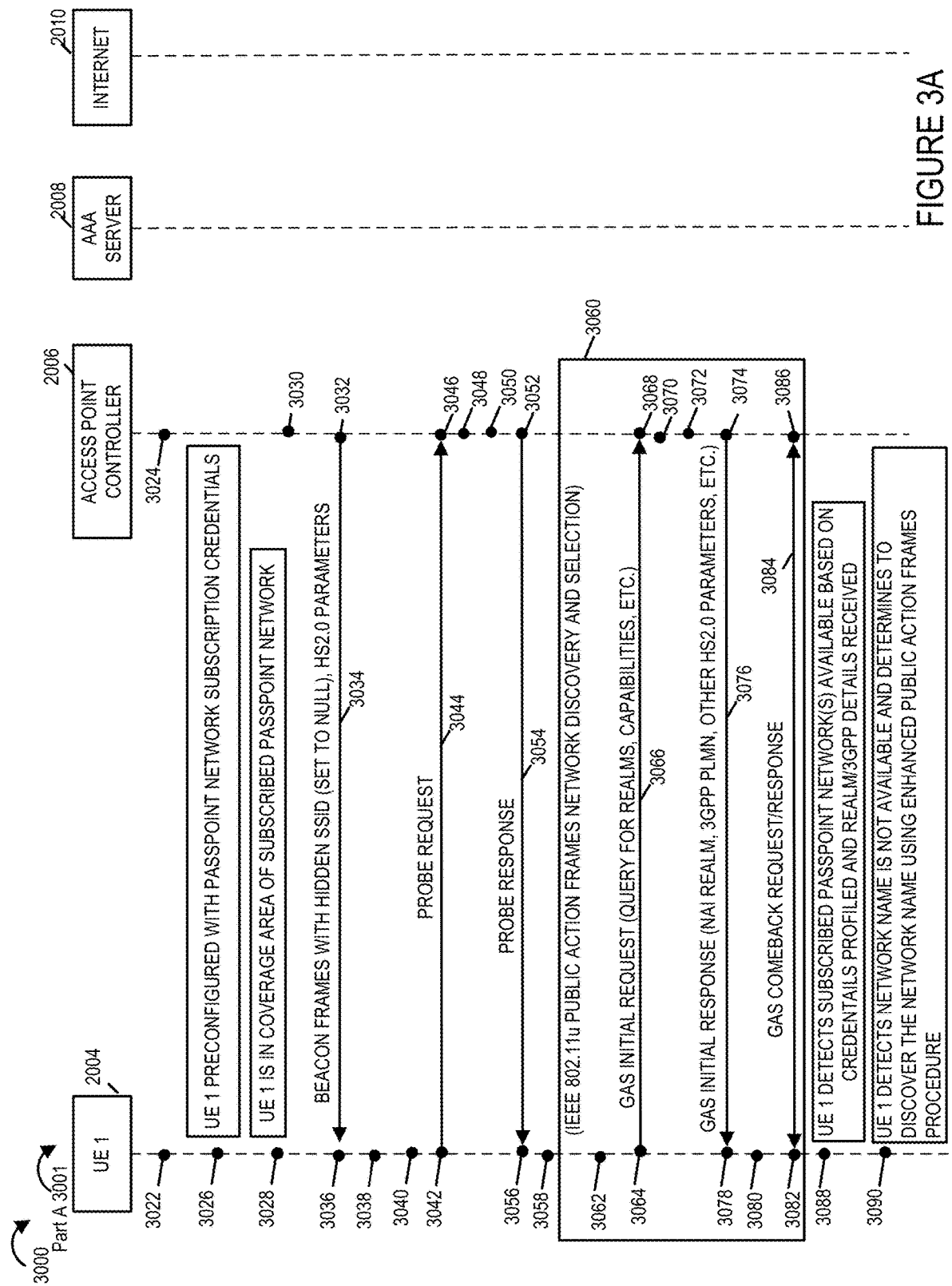
FIG. 3A is the first part of a signaling diagram which illustrates the steps and signaling of an exemplary method in accordance with an embodiment of the present invention.
Figure 3B:
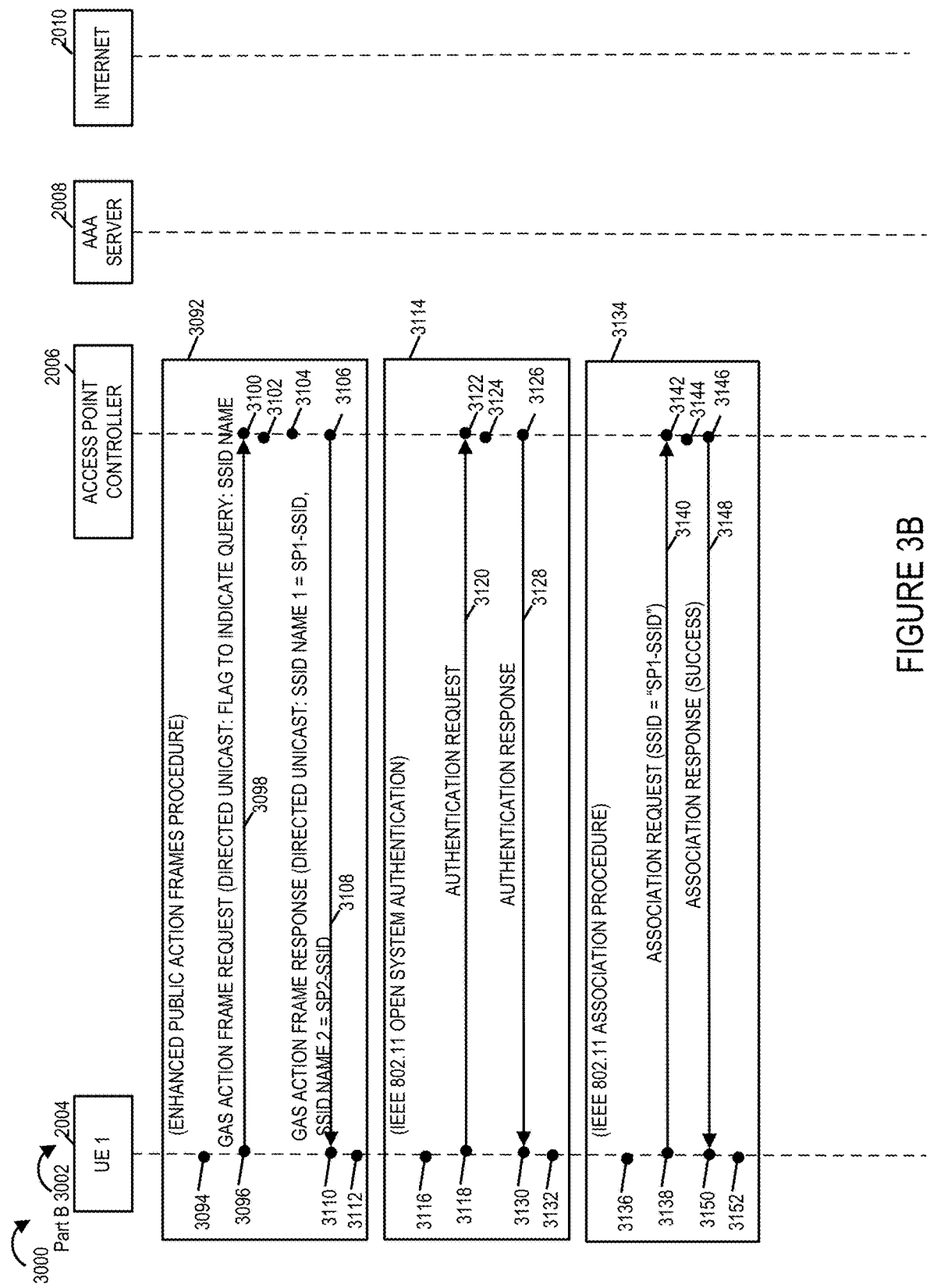
FIG. 3B is the second part of a signaling diagram which illustrates the steps and signaling of an exemplary method in accordance with an embodiment of the present invention.

FIG. 3 comprises FIG. 3A, FIG. 3B, and FIG. 3C. FIG. 3A is the first part (Part A 3001) of a signaling diagram which illustrates the steps and signaling of an exemplary method 3000 in accordance with an embodiment of the present invention. FIG. 3B is the second part (Part B 3002) of a signaling diagram which illustrates the steps and signaling of an exemplary method 3000 in accordance with an embodiment of the present invention. FIG. 3C is the third part (Part C 3003) of a signaling diagram which illustrates the steps and signaling of an exemplary method 3000 in accordance with an embodiment of the present invention. While it will be readily understood that additional steps and signaling are performed in connection with communicating information, messages, and packets between devices, the method 3000 focuses on and discusses the steps and signaling for understanding the invention. Elements or steps with the same reference numbers used in different figures are the same or similar and those elements or steps will not be described in detail again. The signaling diagram/method 3000 is implemented by a system coupled to the Internet 2010 including a first UE 1 2004, an Access Point/Controller 2006, and AAA server 2008. The Access Point/Controller 2006 is an Access Point including WLAN controller capabilities. The UE 1 2004 is a wireless device, e.g., a mobile device such as by way of example a mobile phone, smart phone, laptop, tablet. In various embodiments, the UE 1 2004 is implemented in accordance with UE 500 shown in FIG. 5. The AAA server is an Authentication, Authorization and Accounting server which may be implemented in accordance with the network equipment device 600 shown in FIG. 6. The Access Point/Controller 2006 may be implemented in accordance with the Access Point shown in FIG. 4. While not shown the UE 1 2004 typically connects to the Internet via a Wireless Access Gateway which couples the UE 1 2004 to the Internet 2010.

The signaling diagram/method 3000 may be, and in some embodiments is, implemented using exemplary system 100 of FIG. 1. In such embodiments, the UE 1 2004 is UE 1 108 of system 100. The Access Point 2006 is Access Point 102 of system 100 combined with WLAN controller 114, e.g., the functionality of both devices being present in Access Point 102. In other embodiments, various messages, e.g., probe requests, public action frames, queries, received by the Access Point 102 are forwarded from the Access Point 102 to the WLAN controller 114 which sends back messages, e.g., probe responses, public action frame responses, query responses, to the Access Point 102 for delivery to the UE devices. The AAA server 2008 is AAA server 118 which may include database 120. The Internet 2010 is Internet 122 in FIG. 1. The UE 1 108 of system 100 attains access to the Internet 122 via Access Point 102 over communications link 130 to WAG 116 which is coupled to the Internet 122. However, it should be understood that the method 3000 is not limited to the exemplary system 100 and may be, and is used, on other systems and system configurations. The signaling diagram/method 3000 illustrates the signaling and steps for a user equipment device, e.g., a mobile device, to connect to a network with a hidden Passpoint SSID using enhanced Public Action Frames for obtaining access to the Internet.

The method 3000 starts in start step 3022 shown on FIG. 3A. Operation proceeds from start step 3022 and proceeds to steps 3024 and 3026.

The Access Point/Controller 2006 is a Passpoint Hotspot (HS) 2.0 Access Point also referred to herein as a Passpoint Access Point, Hotspot 2.0 Access Point, or just Access Point which is enabled or implement the IEEE 802.11u protocol standard. Passpoint which as previously discussed is also known as Hotspot 2.0 being an IEEE 820.11u standard based protocol to enable network discovery, seamless connectivity and roaming between WLAN/Wi-Fi and cellular networks. It provides cellular network like connectivity to a WLAN automatically with no manual intervention required, and offloads the traffic to a Wi-Fi network. In this example, the Access Point 2006 has been implemented to respond to SSID name queries from user equipment devices as discussed in further detail below.

In step 3024, Access Point/Controller 2006, also referred to herein as Access Point 2006 or AP 2006 is configured to support and/or provide services for a plurality of networks, e.g., Wireless Local Area Networks (WLANs), including a first network, a second network, . . . , Nth network. The Access Point 2006 includes a dual-band radio or multi-band radio, with multiple SSID's per radio supported. Each radio supporting a different radio access technology (RAT). In various embodiments, the Access Point 2006 includes a different wireless interface for each Radio Access Technology supported and a different SSID for each corresponding wireless interface. The Access Point is configured with Hotspot 2.0 Passpoint set for hidden enabled (e.g., as an SSID=NULL). In IEEE 802.11 beacon frames, e.g., beacon announcement frames, the SSID is set to NULL or "hidden" by the SSID length field in the beacon frame being set to zero. In this example, each of the networks supported and/or for which the Access Point 2006 provides services is a hidden network with the SSID set to NULL in the beacon frames it broadcasts.

The first network e.g., a first WLAN, is operated and/or owned by a first service provider, i.e., service provider 1. The second network, e.g., a second WLAN, is operated and/or owned by a second service provider, i.e., service provider 2; . . . , the Nth network, e.g., Nth WLAN, is operated and/or owned by a third service provider, i.e., service provider N. The Network Address Identifier/Realm Name, hereinafter Network Address Identifier realm name or NAI realm name for the first network being SERVICEPROVIDER1.COM. The NAI for the first network being SERVICEPROVIDER1 and the realm being COM. The period in SERVICEPROVIDER1.COM separating the NAI from the realm. The NAI realm name for the second network being SERVICEPROVIDER2.NET. The NAI for the second network being SERVICEPROVIDER2 and the realm being NET. The period in SERVICEPROVIDER2.COM separating the NAI from the realm. The NAI realm name for the Nth network being SERVICEPROVIDERN.M where N is an integer greater than 2 representing the network number and M represents the realm. In various embodiments, two or more of the networks supported by the Access Point 2006 may be owned and/or operated by the same service provider.

In step 3026, the UE 1 2004 is provisioned or configured with Passpoint Network subscription credentials for one or more networks, e.g., at the time of manufacturer, initialization or update. The provisioning may be, and in some embodiment is, done using one or more Subscriber Mobile Identity cards inserted into the UE 1. For example, each of the SIM cards in some embodiments contain Passpoint Network subscription credentials for a different service provider's network(s). In this example, the UE 1 2004 is provisioned with Passpoint Network subscription credentials for the first network which is operated and/or owned by service provider 1 so UE 1 2004 can connect to the first network and obtain Internet access. Furthermore, the UE 1 2004 is also provisioned with Passpoint Network subscription credentials for the second network which is operated and/or owned by service provider 2 so the UE 1 2004 can connect to the second network and obtain Internet access.

Operation proceeds from step 3026 to step 3028. In step 3028, UE 1 2004 enters the coverage area of one or more subscribed passpoint network(s), e.g., the first network, the second network or the first and second network. Operation proceeds from step 3028 to step 3030.

In step 3030, the Access Point 2006 generates one or more beacon frames 3034 with hidden SSIDs and HS2.0 parameters advertising network services. The beacon frames being generated so that the SSIDs are set to NULL, e.g., the SSID length of the beacon frame being set to zero. Operation proceeds from step 3030 to step 3032.

In step 3032, the Access Point 2006 broadcast, e.g., transmits over the air, the generated one or more beacon frames 3034 with hidden SSIDs. That is the beacon frames broadcast have the SSID set to NULL. Operation proceeds from step 3032 to step 3036. Steps 3030 and 3032 which include the generation of beacon frames are repeated, e.g., on a periodic basis by the Access Point 2006, so as to continuously advertise and/or announce the Access Point's presence and indicate that network services are available.

In step 3036, UE 1 2004 performs passive scanning. During the passive scanning UE 1 2004 receives from the Access Point 2006, the beacon frames 3034 broadcast by the Access Point 2006. Operation proceeds from step 3036 to step 3038.

In step 3038, UE 1 2004 processes the one or more received beacon frames 3034 and determines that the SSID names are hidden. Operation proceeds from step 3038 to step 3040.

In step 3040, in response to receiving the beacon frames 3034 and determining that the SSID names are hidden, the UE 1 2004 generates probe request 3044 requesting network information from the Access Point 2006. Operation proceeds from step 3040 to step 3042.

In step 3042, UE 1 2004 transmits the probe request 3044 over the air to the Access Point 2006. Operation proceeds from step 3042 to step 3046.

In step 3046, Access Point 2006 receives the probe request 3044. Operation proceeds from step 3046 to step 3048.

In step 3048, the Access Point 2006 processes the probe request 3044 and determines that the UE 2004 is requesting network information for the networks, network service providers, and/or services it is supporting. In some embodiments, the probe request 3044 has an SSID set to zero or wild card as the UE 1 2004 does not have the SSID name for the network corresponding to the beacon frames.

In step 3050, the Access Point 2006 generates Probe Response 3054 in response to the Probe Request 3044. The Probe Response 3054 does not include an SSID name in the response as the Access Point 2006 is enabled as SSID hidden. The Probe Response includes information about the networks, network service providers, and/or services it is supporting. Operation proceeds from step 3050 to step 3052.

In step 3052, the Access Point 2006 transmits over the air or wirelessly the Probe Response 3054 to the UE 1 2004. Operation proceeds from step 3052 to step 3056.

In step 3056, the UE 1 2004 receives the Probe Response 3054 from the Access Point 2006. Operation proceeds from step 3056 to step 3058.

In step 3058, UE 1 2004 processes the Probe Response 3054 and determines based on the Probe Response 3054 and/or one or more of the Beacon Frames 3036 to implement a public action frames network discovery and selection procedure 3060, e.g., IEEE 802.11u Public Action Frames network Discovery and Selection Procedure.

In some embodiments, UE 1 2004 in step 3038 makes the determination to implement a public action frames network discovery and selection procedure e.g., IEEE 802.11u Public Action Frames network Discovery and Selection Procedure, 3060 based on information contained in one or more of the received Beacon Frames 3034. In some embodiments, the steps 3040, 3042, 3046, 3048, 3052, 3056, and 3058 are bypassed and not performed by the UE 1 2004 or the Access Point 2006 and instead operation proceeds from step 3038 to step 3060.

In step 3060, UE 1 2004 performs network discovery and selection procedures (e.g. using the IEEE 802.11u protocol) after determining that one or more HS2.0 networks are available through receipt of the beacon frames 3034 and/or through the probe response 3054 and that the HS 2.0 network Access Point 2006 from which it is receiving signals is implemented so that the SSID names are set to NULL, i.e., the Access Point 2006 has been configured to have a hidden SSIDs. These procedures are performed using Access Network Query Protocol (ANQP)/Generic Advertisement Service (GAS). Step 3060 includes one or more sub-steps 3062, 3064, 3068, 3070, 3072, 3074, 3078, 3080, 3082, and 3086. Operation proceeds from step 3060 to step 3088.

In sub-step 3062, UE 1 2004 generates a Generic Advertisement Service (GAS) initial request 3066. The GAS initial request 3066 is a query request for information about the realms, capabilities, services of the Access Point 2006. Operation proceeds from sub-step 3062 to sub-step 3064.

In sub-step 3064, the UE 1 2004 transmits the GAS initial request 3066 to the Access Point 2006. Operation proceeds from sub-step 3064 to sub-step 3068.

In sub-step 3068, the Access Point 2006 receives the GAS initial request 3066. Operation proceeds from sub-step 3068 to sub-step 3070.

In sub-step 3070, Access Point 2006 processes the GAS initial request 3066 and obtains and/or determines information, e.g., NAI realms, 3GPP PLMN, other HS 2.0 parameters for responding to the query included in the GAS initial request 3066. Operation proceeds from sub-step 3070 to sub-step 3072.

In sub-step 3072, the Access Point 2006, generates GAS initial response message 3076. The Generic Advertisement Service (GAS) initial response message 3076 includes information requested in the GAS initial request 2066, e.g., NAI realm names of supported networks, 3GPP Public Land Mobile Network information, e.g., PLMN ID and other HS 2.0 parameters. Operation proceeds from sub-step 3072 to sub-step 3074.

In sub-step 3074, the Access Point 2006 transmits the GAS initial response message 3076 to the UE 1 2004 in response to the GAS initial request message 3066. Operation proceeds from sub-step 3074 to sub-step 3078.

In sub-step 3078, UE 1 2004 receives the GAS initial response message 3076 from the Access Point 2006. Operation proceeds from sub-step 3078 to sub-step 3080.

In sub-step 3080, UE 1 2004 processes the GAS initial response message 3076. Operation proceeds from sub-step 3080 to sub-steps 3082 and 3086. In sub-steps 3082 and 3086 additional GAS request and GAS response messages referred to as GAS comeback request/response messages 3084 are generated and exchanged between UE 1 2004 and Access Point 2006. Further in sub-steps 3082 and 3086, UE 1 2004 and Access Point 2006 process the exchanged messages each receives. This exchange of messages allows UE 1 2004 to gain additional information from the Access Point 2006 for use in determining whether the Access Point 2006 provides services and/or supports a passpoint network to which UE 1 2004 has been provisioned with credentials. Operation proceeds from step 3060 to step 3088.

In step 3088, UE 1 2004 detects and/or determines that subscribed Passpoint Network, e.g., a network for which it has been provisioned with credentials, is available based on information received during the network and discovery selection procession, e.g., NAI/3GPP network information received in response to the GAS/ANQP query. Operation proceeds from step 3088 to step 3090.

In step 3090, UE 1 2004 detects and/or determines that the SSID network name is not available and determines to discover the SSID network name using an Enhanced Public Action Frames procedure. Operation proceeds from step 3090 to step 3092 shown on FIG. 3B.

In step 3092, an enhanced Public Action Frames procedure is implemented in which the UE 2004 obtains and/or discovers the SSID name or SSID names of networks for which it is credentialed and which are supported by the Access Point 2006 but which have a hidden SSID. The enhanced Public Action Frames procedure includes UE 1 2004 generating and transmitting an enhanced Public Action Frame Request with an SSID query including one or more criteria to the Access Point 2006 and the Access Point 2006 in response to receiving the enhanced Public Action Frames Request with an SSID query including one or more criteria responding by generating and sending an Enhanced Public Action Frames Response to the UE 1 2004 including the SSID name or names of networks which it is supporting and match the one or more criteria. Diagram 1802 of FIG. 18 illustrates an exemplary enhanced Public Action Frames Request vendor specific content element enhanced to include the SSID query and criteria. In the example of diagram 1813 of FIG. 18 the SSID name query is a query for a plurality of 1 to N SSID names with the matching criteria being the NAI realm name. Diagram 1913 of FIG. 19 illustrates an exemplary enhanced Public Action Frame Request vendor specific content list/element or field enhanced to include the response to the SSID query, i.e., the SSID names of networks which it is supported and/or providing services that match the criteria included in the SSID query, e.g., in this example the NAI realm names provided in the SSID query. At the conclusion of step 3092, the UE 1 2004 has obtained and/or discovered the SSID name of one or more hidden SSID networks for which the UE 1 2004 has credentials and which are supported by the Access Point 2006. This assumes that one or more of the networks supported by the Access Point 2006 match the criteria supplied in the SSID query otherwise the SSID names remain hidden as the UE 1 2004 is not provisioned to have the credentials to access and/or connect and/or utilize the networks supported by the Access Point 2006. In some embodiments, step 3092 includes one or more sub-steps 3094, 3096, 3100, 3102, 3104, 3106, 3110, and 3112. Operation proceeds from step 3092 to step 3114.

In sub-step 3094, the UE 1 2004 generates enhanced public action frame request 3098 including SSID query. For example, the SSID query illustrated in diagram 1828 includes two NAI realm names as the matching criteria for a first network and a second network. The first NAI realm name is Serviceprovider1.com. The second NAI realm name is SERVICEPROVIDER2.NET. The UE 1 2004 having been provisioned with credentials for both of these networks. In some embodiments, the enhanced public action frame request is a directed unicast message with a flag indicating that it includes an SSID name query. Operation proceeds from sub-step 3094 to sub-step 3096.

In sub-step 3096, UE 1 2004 transmits the enhanced public action frame request 3098 to the Access Point 2006. Operation proceeds from sub-step 3096 to sub-step 3100.

In sub-step 3100, the Access Point 2006 receives the enhanced public action frame request 3098. Operation proceeds from sub-step 3100 to sub-step 3102.

In sub-step 3102, the Access Point 2006 processes the received enhanced public action frame request 3098 by extracting the criteria for each SSID name query and determining if the Access Point 2006 supports a network with matching criteria. In this example, the criteria for the first network is the NAI realm name SERVICEPROVIDER1.COM and the criteria for the second network is the NAI realm name SERVICEPROVIDER2.NET. In this example, the Access Point 2006 finds a match for each of the realm names. The NAI realm name SERVICEPROVIDER1.COM has a SSID name of SP1-SSID. The SERVICEPROVIDER2.NET has a SSID name of SP2-SSID. In various embodiments, the Access Point 2006 makes the determination that the criteria for a network in an SSID query is matched to a supported network by comparing the criteria to information stored at the Access Point 2006 for networks supported by the Access Point 2006. Operation proceeds from sub-step 1102 to sub-step 3104.

In sub-step 3104, the Access Point 2006 generates enhanced public action frame response message 3108. The enhanced public action frame response message being unicast message directed specifically to UE 1 2004 and including the response to the SSID name query included in the enhanced probe request 3098. Diagram 1928 illustrates an exemplary enhanced pubic action frame response ANQP vendor specific content fields populated with a response to the SSID name query. The enhanced probe response 3108 includes the SSID name "SP1-SSID" in response to the query with NAI realm name "SERVICEPROVIDER1.COM" and SSID name "SP2-SSID" in response to the query with NAI realm name "SERVICEPROVIDER2.NET". Operation proceeds from sub-step 3104 to sub-step 3106.

In sub-step 3106, the Access Point 2006 transmits the enhanced public action frame response 3108 to the UE 1 2004 in response to the enhanced public action frame request 3098. Operation proceeds from sub-step 3106 to sub-step 3110.

In sub-step 3110, UE 1 2004 receives the enhanced public action frame response from Access Point 2006. Operation proceeds from sub-step 3110 to sub-step 3112.

In sub-step 3112, UE 1 2004 processes the received enhanced public action frame response 3108. Processing the received enhanced public action frame response 3108 including extracting the response to the SSID name query including the SSID name SP1-SSID corresponding to the first network with the NAI realm name SERVICEPROVIDER1.COM and also extracting the SSID name SP2-SSID corresponding to the second network with the NAI realm name SERVICEPROVIDER2.NET. As the Access Point 2006 supports two different networks for which the UE 1 2004 has been provisioned with credentials, the UE 1 2004 makes a determination as to which of the first network or the second network it wishes to utilize for accessing the Internet. This determination may be, and in some embodiments is, based on information about the two networks obtained in the public action frames network discovery and selection procedure 3060 (e.g., data rates, spectrum/frequencies utilized, quality of service parameters). In this example, UE 1 2004 selects the first network with the SSID name: SP1-SSID.

In some embodiments, a selection is made in step 3060 and separate enhanced public action frame requests including an SSID name query for a specific network are sent for each network in order of preference. This however requires multiple queries in the event that not all of the one or more preferred networks are supported by the Access Point.

Operation proceeds from step 3092 to step 3114.

In step 3114, open system authentication procedures, e.g., IEEE 802.11 Open System Authentication procedures, are implemented by UE 1 2004 and Access Point 2006. In some embodiments, step 3114 includes one or more sub-steps 3116, 3118, 3122, 3124, 3126, 3130 and 3132. Operation proceeds from step 2114 to step 2134.

In sub-step 3116, UE 1 2004 generates authentication request message 3120, e.g., an open system authentication request message. Operation proceeds from sub-step 3116 to sub-step 3118.

In sub-step 3118, UE 1 2004 transmits the authentication request message 3120 to Access Point 2006. Operation proceeds from sub-step 3118 to sub-step 3122.

In sub-step 3122, the Access Point 2006 receives the authentication request message 3120. Operation proceeds from sub-step 3122 to sub-step 3124. In sub-step 3124, the Access Point 2006 processes the authentication request message 3120 and in response generates authentication response message 3128 accepting the authorization request. Operation proceeds from sub-step 3124 to sub-step 3126.

In sub-step 3126, the Access Point 2006 transmits authentication response message 3128 to UE 1 2004 in response to the received authentication request message 3120. Operation proceeds from sub-step 3126 to sub-step 3130.

In sub-step 3130, UE 1 2004 receives the authentication response message 3128. Operation proceeds from sub-step 3130 to sub-step 3132.

In sub-step 3132, UE 1 2004 processes authentication response message 3128 and determines that authentication with Access Point 2006 has been successful. Operation proceeds from step 3114 to step 3134.

In step 3134, UE 1 2004 associates with the selected network supported by the Access Point 2006 using the SSID name corresponding to the selected network provided by the Access Point 2006 in response to the SSID query. In various embodiments, the UE 1 2004 utilizes and/or implements the IEEE 802.11 Association Procedure using the discovered SSID name when associating with the network via the Access Point 2006. In some embodiments, step 3134 includes one or more sub-steps 3136, 3138, 3142, 3144, 3146, 3150, and 3152. Operation proceeds from step 3134 to step 3154 shown on FIG. 3C.

In sub-step 3136, UE 1 2004 generates association request message 2140. The association request message 3140 includes the SSID name of the network obtained from the Access Point 2006 through enhanced public action frames procedure as described in connection with step 3092. Operation proceeds from sub-step 3136 to sub-step 3138.

In sub-step 3138, UE 1 2004 transmits the Association Request message 3140 to Access Point 2006. Operation proceeds from sub-step 3138 to sub-step 3142.

In sub-step 3142, Access Point 2006 receives the Association Request message 3140. Operation proceeds from sub-step 3142 to sub-step 3144.

In sub-step 3144, the Access Point 2006 processes the Association Request message 3140. Processing the Association Request message 3140 in some embodiments includes extracting the SSID from the Association Request message and any information, e.g., credential information, required for associating the UE 1 2004 with the network having the SSID extracted from the Association Request message 3140. Processing the Association Request message 3140 further includes in some embodiments associating UE 1 2004 with the network having the SSID extracted from the Association Request message 3140 and generating an Association Response message 3148 indicating successful association when the association between UE 1 2004 and the network having the SSID extracted from the message has been completed. Operation proceeds from sub-step 3144 to sub-step 3146.

In sub-step 3146, Access Point 2006 transmits the Association Response message 3148 to UE 1 2004. The Association Response message 3148 includes information indicating that UE 1 2004 has been successfully associated with network with the SSID included in the Association Request message 3140. Operation proceeds from sub-step 3146 to sub-step 3150.

In sub-step 3150, UE 1 2004 receives the Association Response message 3148. Operation proceeds from sub-step 3150 to sub-step 3152.

In sub-step 3152, UE 1 2004 processes the received Association Response message 3148 and determines that UE 1 2004 has been successfully associated with Access Point 2006 and the network having the SSID included in the Association Request message 3140. Operation proceeds from step 3134 to step 3154 shown on FIG. 3C.

In step 3154, UE 1 2004 is authenticated by the selected network, e.g., by using the provisioned credentials to implement an authentication procedure such as IEEE 802.11X Extensible Authentication Protocol (EAP) Authentication Procedure. In some embodiments, step 3154 includes one or more sub-steps 3156, 3158, 3162, 3166, 3168, 3172, and 3174. Operation proceeds from step 3154 to step 3176.

In sub-step 3156, UE 1 2004 generates an initial EAP authentication message included in the EAP Authentication messages 3160. Operation proceeds from sub-step 3156 to sub-step 3158.

Sub-steps 3158, 3162, and 3166, illustrates the exchange of EAP authentication messages 3160 between UE 1 2004 and Access Point 2006 and the relaying/exchange of those messages and/or exchange of EAP authentication messages 3164 between Access Point 2006 and AAA Server 2008. EAP Authentication messages 3160 represent EAP Authentication messages transmitted from UE 1 2004 to Access Point 2006 which receives them and relays the messages to AAA server 2008 as EAP Authentication messages 3164. The EAP Authentication messages 3164 also represent the response EAP Authentication messages generated and transmitted from the AAA server to Access Point 2006 which relays these messages to UE 1 2004. The EAP Authentication messages 3160 include the relayed response messages. Sub-step 3158 being the processing performed by the UE 1 during the EAP authentication procedure. Sub-step 3162 being the processing performed by Access Point 2006 during the EAP authentication procedure. Sub-step 3166 being the processing performed by the AAA server 2008 during EAP Authentication. Upon successful EAP authentication, operation proceeds from sub-steps 3158, 3162, 3166 to sub-steps 3168 and 3172 which is a 4-way exchange of encryption keys between UE 1 2004 and Access Point 2006. Sub-step 3168 being the processing performed by UE 1 2004 for the 4-way handshake encryption key exchange. Sub-step 3172 being the processing performed by Access Point 2006 for the 4-way handshake encryption key exchange. Messages 3170 being the 4-way handshake message generated and transmitted by the UE 1 2004 and Access Point 2006 for the 4-2ay handshake encryption key exchange. These messages include the encryption keys being exchanged. Operation proceeds from sub-steps 3168 and 3172 to sub-step 3174. In sub-step 3174, UE 1 2004 determines that it has successfully completed the EAP Authentication procedure and can now access the Internet via Access Point 2006 and the network with which UE 1 2004 associated with in step 3134 having the SSID name which was originally hidden but was learned/obtained in step 3092. Operation proceeds from step 3154 to step 3176.

In step 3176, the UE 1 2004 obtains Internet access via Access Point 2006 using the selected network with which it has formed an association. In some embodiments, step 3176 includes one or more sub-steps 3178, 3180, 3184, 3188, 3190 and 3192.

In sub-step 3178, UE 1 2004 determines that it wants to access the Internet. Operation proceeds from sub-step 3178 to sub-step 3180, 3184, and 3188 which illustrate the exchange of messages including data wherein the UE 1 2004 obtains internet access via Access Point 2006 and the network UE associated with in step 3134. Sub-step 3180 includes the processing performed by UE 1 2004 in exchanging encrypted messages with Access Point 2006 including the generation, encryption, and transmission of messages sent to Access Point 2006 and the reception and decryption of messages received from Access Point 2006. Messages 3182 are the encrypted messages exchanged between UE 1 2004 and Access Point 2006 when UE 1 2004 obtains and utilizes internet access via Access Point 2006. The encryption keys exchanged during the EAP authentication being used for encrypting the messages 3182. Sub-step 3184 includes the processing performed by Access Point 2006 in exchanging encrypted messages with UE 1 2004 and sending and receiving unencrypted messages 3186 over the Internet 2010. The Access Point 2006 receives encrypted messages from UE 1 2004 encrypts the messages and transmits them over the network with which UE 1 2004 is associated out onto the Internet typically through a Wireless Gateway through which the Access Point 2006 is connected and/or coupled to the Internet. The Access Point 2006 also receives unencrypted messages from the Internet and encrypts and relays the messages to the UE 1 2004. Encrypted messages 3182 exchanged between UE 1 2004 and Access Point 2006 are sent wirelessly over the air while unencrypted messages 2186 which are exchanged between the Access Point 2006 and the Internet are sent over a cable, wired, or optical network link or connection.

Operation proceeds from sub-steps 3180, 3184, 3188 to steps 3190 and 3192. In sub-steps 3190 and 3192, the Internet Access is terminated. In step 3190, UE 1 2004 terminates the Internet access. In step 3192, Access Point 2006 terminates the Internet access, e.g., in response UE 1 2004 terminating Internet access or its connection with Access Point 2006.

The process is repeated from step 3036 when the mobile changes position and beacon frames with hidden SSID are received from another Access Point (e.g., Passpoint HS 2.0 Access Point).

While the method 3000 illustrated in FIG. 3, has been explained with respect to a single UE device and a single Access Point the method may be, and typically is, implemented for a plurality of UE devices, e.g., mobile devices, which are pre-provisioned, e.g., at time of purchase or initialization, and which receive beacon frames from a plurality of different Access Points as the UE devices enter and exit coverage areas for the different Access Points.

Figure 4:
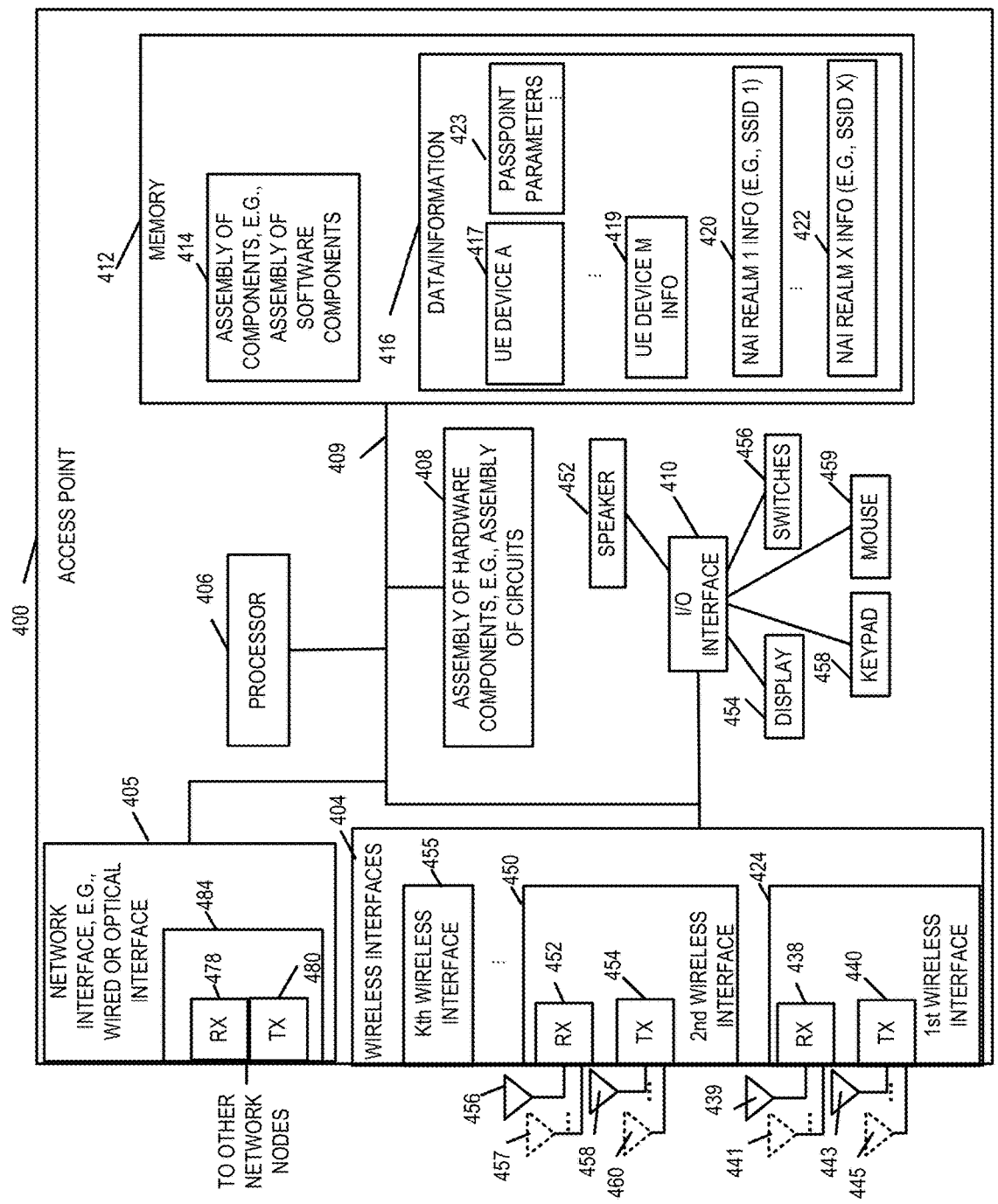
FIG. 4 illustrates details of an exemplary Access Point in accordance with one embodiment of the present invention.

FIG. 4 is a drawing of an exemplary Access Point (AP) 400 (e.g., Passpoint AP, Hotspot IEEE 802.11u standard enabled AP), in accordance with an exemplary embodiment. The Access Point 400 supports IEEE 802.11u standard requirements and operations. Exemplary Access Point 400 includes wireless interfaces 404, a network interface 405, e.g., a wired or optical interface, a processor 406, e.g., a CPU, an assembly of hardware components 408, e.g., an assembly of circuits, and I/O interface 410 and memory 412 coupled together via a bus 409 over which the various elements may interchange data and information. Access Point 400 further includes an optional speaker 452, an optional display 454, optional switches 456, an optional keypad 458 and an optional mouse 459 coupled to I/O interface 410, via which the various I/O devices (452, 454, 456, 458, 459) may communicate with other elements (404, 405, 406, 408, 412) of the Access Point 400. Network interface 405 includes a receiver 478 and a transmitter 480. In some embodiments, receiver 478 and transmitter 480 are part of a transceiver 484. Wireless interfaces 404 include a plurality of wireless interfaces including first wireless interface 424, second wireless interface 450, . . . , Kth wireless interface 455. The wireless interfaces are used to communicate with the other wireless devices, e.g., user equipment devices such as mobile devices, mobile phones, smartphones, tablets, laptops. The first wireless interface 424 is used for example to communicate with a user equipment device 1 108 using Wi-Fi. The second wireless interface can be used to communicate with wireless devices such as user equipment devices using a second wireless communications protocol, e.g., 5G NR or cellular. The first wireless interface 424 includes wireless receiver 438 and a wireless transmitter 440. In some embodiments, receiver 438 and transmitter 440 are part of a transceiver. In various embodiments, the first wireless interface 424 includes a plurality of wireless receivers and a plurality of wireless transmitters. Wireless receiver 438 is coupled to a plurality of receive antennas (receive antenna 1 439, . . . , receive antenna M 441), via which Access Point 400 can receive wireless signals from other wireless communications devices such as user equipment devices. Wireless transmitter 440 is coupled to a plurality of wireless transmit antennas (transmit antenna 1 443, . . . , transmit antenna N 445) via which the Access Point 400 can transmit signals to other wireless communications devices including a second wireless communications device, e.g., user equipment device 1.

The second wireless interface 450 includes wireless receiver 452 and a wireless transmitter 454. In some embodiments, receiver 452 and transmitter 454 are part of a transceiver. In various embodiments, the second wireless interface 450 includes a plurality of wireless receivers and a plurality of wireless transmitters. Wireless receiver 452 is coupled to one or more receive antennas (receive antenna 1 456, . . . , receive antenna M 457), via which Access Point 400 can receive wireless signals from other wireless communications devices including a second wireless communications device, e.g., user equipment device 1, using a different wireless protocol than the first wireless interface. Wireless transmitter 454 is coupled to one or more wireless transmit antennas (transmit antenna 1 458, . . . , transmit antenna N 460) via which the Access Point 400 can transmit signals to other wireless communications devices including a second wireless communications device. The network interface 405 may be coupled to a Wireless Gateway, WLAN controller, and/or other networks, e.g., internet, or other Access Points. Wireless interfaces 424, 450, . . . , 450 are in various embodiments the different radios used for communicating using different Radio Access Technology. In some embodiments, the first wireless interface 424 is a 2.4 GHz radio while the second wireless interface is a 5 GHz radio.

Memory 412 includes an assembly of components 414, e.g., an assembly of software components, and data/information 416. Data/information 416 includes UE device information corresponding to a plurality of user equipment devices (UE device A information 417, . . . , UE device M information 419 where A to M are the UE devices being serviced by the Access Point such as for example UE 1 108 of system 100 or UE 1 204 of the system illustrated in FIG. 2. NAI Realm 1 information 420, . . . , NAI Realm X information 422 including information about service provider networks with their NAI realm names and corresponding information such as for example corresponding SSID name. Hotspot 2.0 Passpoint parameters 423 which includes passpoint parameters for operating as Passpoint Access Point. While the details of the first and second wireless interfaces are shown, the other wireless interfaces of the Access Point 400, e.g., wireless interface K where K is an integer greater than 2 also include multiple receivers and transmitters so that the Access Point 400 can provide wireless services to for example hundreds or thousands of user equipment devices. In some embodiments, one or more of the Access Points discussed and/or shown in the Figures and/or in connection with the methods discussed herein including Access Point 102, 104, 106, 2006 are implemented in accordance with the Access Point 400.

Figure 5:
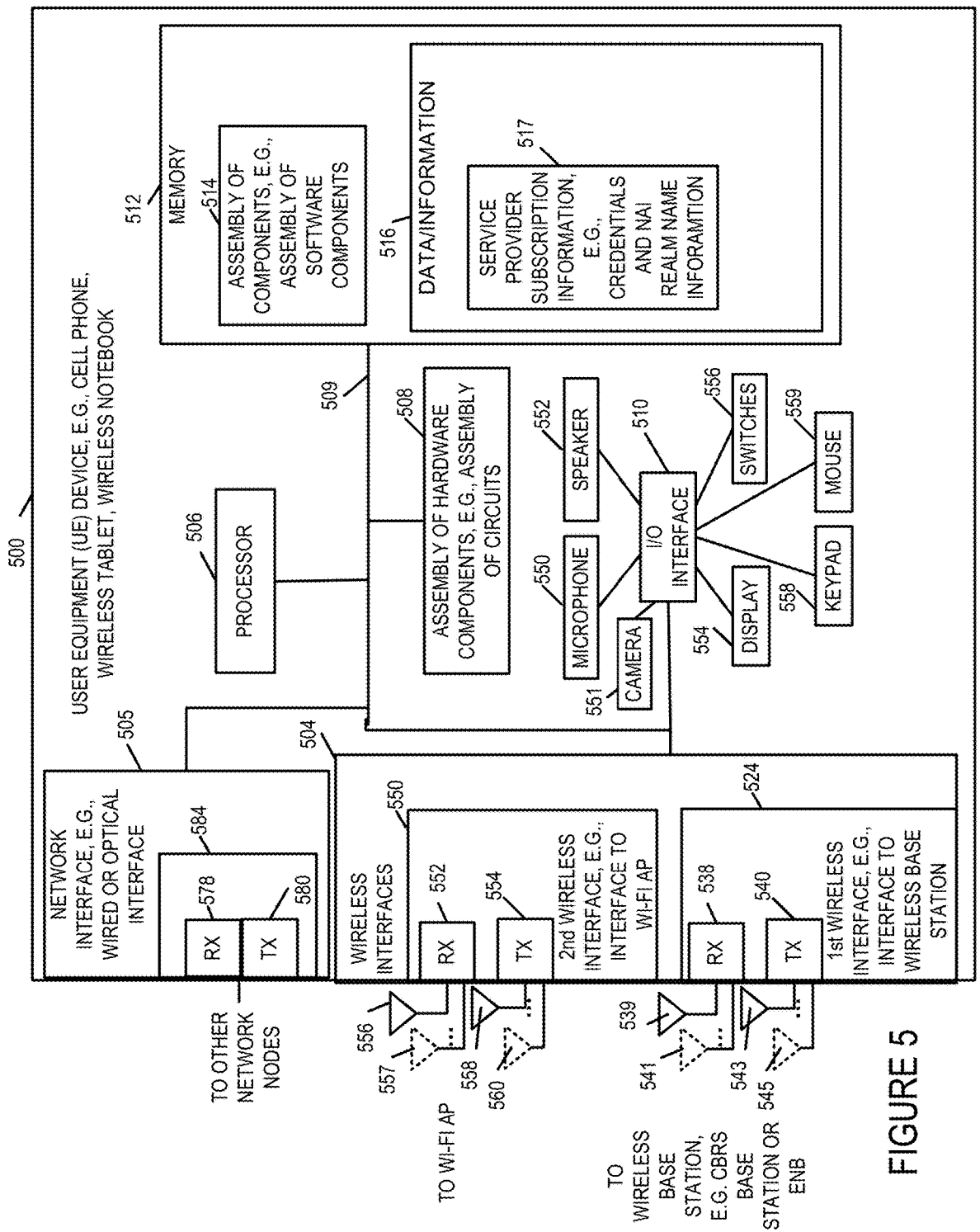
FIG. 5 illustrates details of an exemplary User Equipment (UE) device, e.g., a mobile device, cell phone, smartphone, wireless tablet, laptop, wireless notebook, in accordance with one embodiment of the present invention.

FIG. 5 is a drawing of an exemplary user equipment (UE) device 500 in accordance with an exemplary embodiment. UE device 500 is, e.g., a mobile device such as a cell phone, a smart phone, wireless tablet or wireless notebook, WiFi device. UE device 500 includes WiFi device capabilities. UE device 500 in addition to having Wi-Fi device capabilities is also enabled to communicate using at least one other wireless protocol, e.g., 5G wireless protocol, CBRS wireless protocol or cellular wireless protocol. The UE device 500 in some embodiments is a user equipment device operating at the 4G, 5G, and in the 2.4 GHz band and/or 5 GHz band which also has Wi-Fi capabilities and can be operated to work in dual mode operation. Exemplary UE device 500 includes wireless interfaces 504, a network interface 505, a processor 506, e.g., a CPU, an assembly of hardware components 508, e.g., an assembly of circuits, and I/O interface 510 and memory 512 coupled together via a bus 509 over which the various elements may interchange data and information. UE device 500 further includes a microphone 550, camera 551, speaker 552, a display 554, e.g., a touch screen display, switches 556, keypad 558 and mouse 559 coupled to I/O interface 510, via which the various I/O devices (550, 551, 552, 554, 556, 558, 559) may communicate with other elements (504, 505, 506, 508, 512) of the UE device. Network interface 505 includes a receiver 578 and a transmitter 580. The network interface 505 can be coupled to routers within a home or customer premises or to wired (e.g., cable) or optical (e.g., fiber-optic) networks. In some embodiments, receiver 578 and transmitter 580 are part of a transceiver 584. In some embodiments network interface 505 is a USB interface for connecting to a computer.

Wireless interfaces 504 include a plurality of wireless interfaces including first wireless interface 524 and a second wireless interface 550. The first wireless interface 524 is used to communicate with a wireless base station, e.g., a cellular base station. The second wireless interface is used to communicate with a Wi-Fi Access Point, e.g., Access Point 102 or 2006. The first wireless interface 524 includes wireless receiver 538 and a wireless transmitter 540. In some embodiments, receiver 538 and transmitter 540 are part of a transceiver. In various embodiments, the first wireless interface 524 includes a plurality of wireless receivers and a plurality of wireless transmitters. Wireless receiver 538 is coupled to a plurality of receive antennas (receive antenna 1 539, . . . , receive antenna M 541), via which user equipment device 500 can receive wireless signals from other wireless communications devices including a wireless base station. Wireless transmitter 540 is coupled to a plurality of wireless transmit antennas (transmit antenna 1 543, . . . , transmit antenna N 545) via which the user equipment device 500 can transmit signals to other wireless communications devices including a second wireless communications device, e.g., wireless base station. The antennas 539, . . . , 541 and 543, . . . , 545 are typically mounted inside the housing of the wireless device but in some embodiments are located outside the user equipment device housing. In some embodiments the various antennas form an antenna array with the antennas pointing in different directions. In some embodiments, one or more of the antennas are included inside the housing of the user equipment device and the user equipment device includes one or more connections to which exterior antennas may be connected.

The second wireless interface 550 includes wireless receiver 552 and a wireless transmitter 554. In some embodiments, receiver 552 and transmitter 554 are part of a transceiver. In various embodiments, the second wireless interface 550 includes a plurality of wireless receivers and a plurality of wireless transmitters. Wireless receiver 552 is coupled to one or more receive antennas (receive antenna 1 556, . . . , receive antenna M 557), via which user device 500 can receive wireless signals from other wireless communications devices including a second wireless communications device, e.g., a Wi-Fi Access Point using Wi-Fi protocol. Wireless transmitter 554 is coupled to one or more wireless transmit antennas (transmit antenna 1 558, . . . , transmit antenna N 560) via which the user equipment device 500 can transmit signals to other wireless communications devices including a second wireless communications device. The user equipment device network interface 505 may be coupled to LAN or WAN networks or routers so that the user equipment device can also obtain services via a hardwired connection in addition to through the wireless interfaces. In the exemplary embodiment the second wireless interface is a Wi-Fi wireless interface.

Memory 512 includes an assembly of components 514, e.g., an assembly of software components, and data/information 516. Service Provider subscription information 517, e.g., credential information and NAI realm information, included when the user equipment device 500 is provisioned.

In some embodiments, one or more of the user equipment devices shown in the figures or discussed herein for example in connection with the methods described including for example UE devices UE 1 108, UE 2 110, . . . , UE N 112 of system 100 and UE 1 2004 shown in the system illustrated in FIGS. 2 and 3 are implemented in accordance with exemplary user equipment device 500. While the UE device 500 has been illustrated as a dual mode device that has two wireless interfaces 550 and 524, the UE device 500 may, and in some embodiments, can include additional wireless interfaces. The first wireless interface 524 may be, and in some embodiments is used to communication with a wireless base station using a first wireless protocol, e.g., a 5G protocol, 4G protocol, LTE protocol or CBRS wireless protocol and the second wireless interface 550 which is a Wi-Fi interface is enabled to communicate with a Wi-Fi Access Point. User equipment device 500 is enabled to communicate using the 802.11 protocol suite and in particular the 802.11u protocol.

Figure 6:
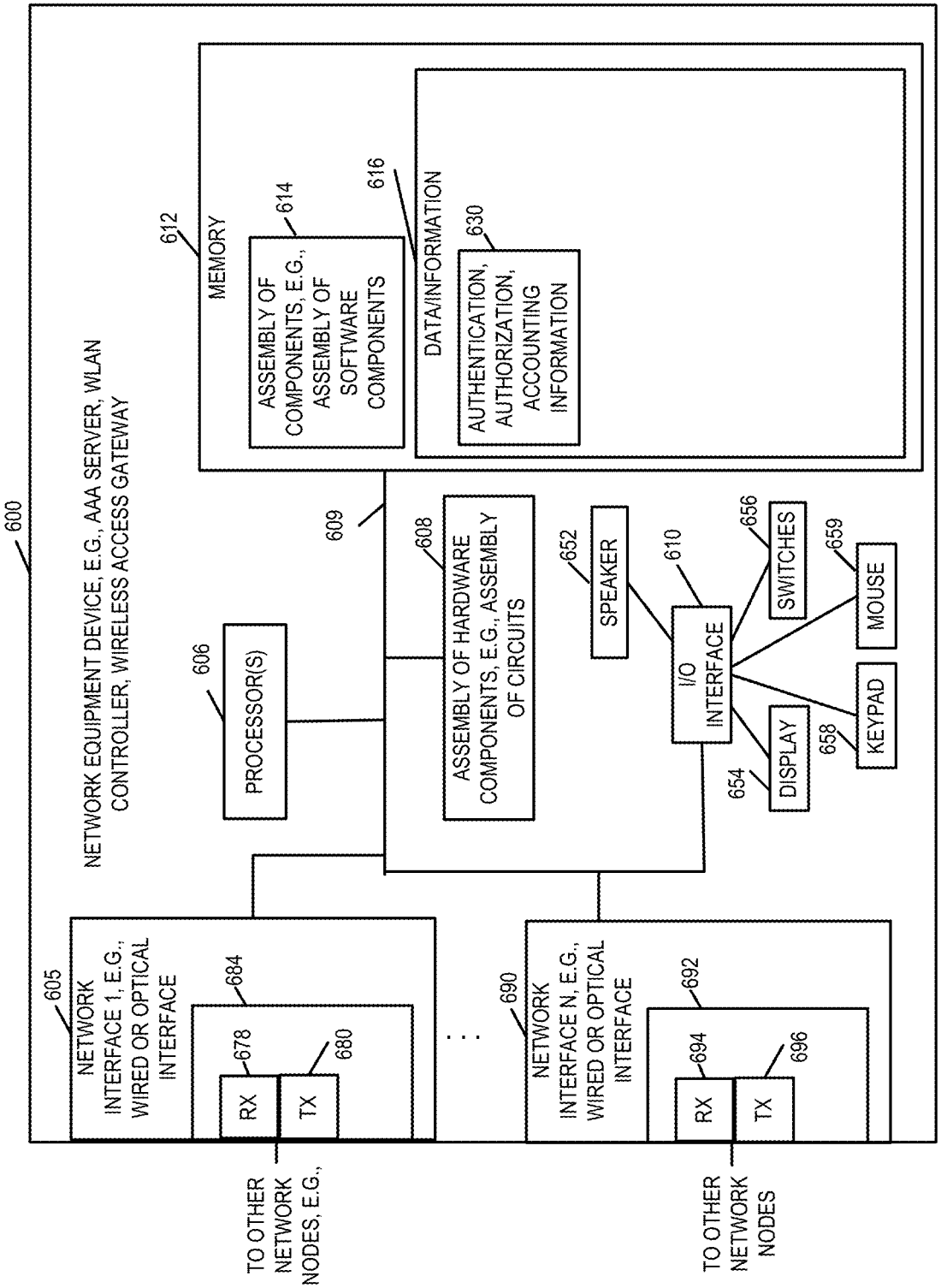
FIG. 6 illustrates details of an exemplary network equipment device, e.g., Authentication, Authorization, and Accounting (AAA) server system, a WLAN controller, a Wireless Access Gateway (WAG), in accordance with one embodiment of the present invention.

FIG. 6 is a drawing of an exemplary network equipment device, e.g., AAA server, Wireless Gateway, WLAN controller in accordance with an exemplary embodiment. The network device 600 includes a plurality of network interfaces 605, . . . , 690, e.g., a wired or optical interface, a processor(s) 606 (e.g., one or more processors), e.g., a CPU, an assembly of hardware components 608, e.g., an assembly of circuits, and I/O interface 610 and memory 612 coupled together via a bus 609 over which the various elements may interchange data and information. The computing device 600 further includes a speaker 652, a display 654, switches 656, keypad 658 and mouse 659 coupled to I/O interface 610, via which the various I/O devices (652, 654, 656, 658, 659) may communicate with other elements (605, . . . , 690, 606, 608, 612) of the network equipment device 600. Network interface 605 includes a receiver 678 and a transmitter 680. The network interface 605 is typically used to communicate with other devices, e.g., Access Point, AAA Server, database system WLAN controller, Wireless Gateway, or other devices in the network core. In some embodiments, receiver 678 and transmitter 680 are part of a transceiver 684. Memory 612 includes an assembly of component 614, e.g., an assembly of software components, and data/information 616. Data/information 616 includes Authentication, Authorization and Accounting Information when the network equipment device 600 is an AAA server. In some embodiments, network equipment devices disclosed in the figures and/or discussed in connection with the various embodiments of the invention are implemented in accordance with network equipment device 600. For example, WLAN controllers 1, . . . , 114', WAG 116, AAA servers 118 . . . , 118' of system 100 of FIG. 1 are implemented in accordance with network equipment device 600.

Figure 7:
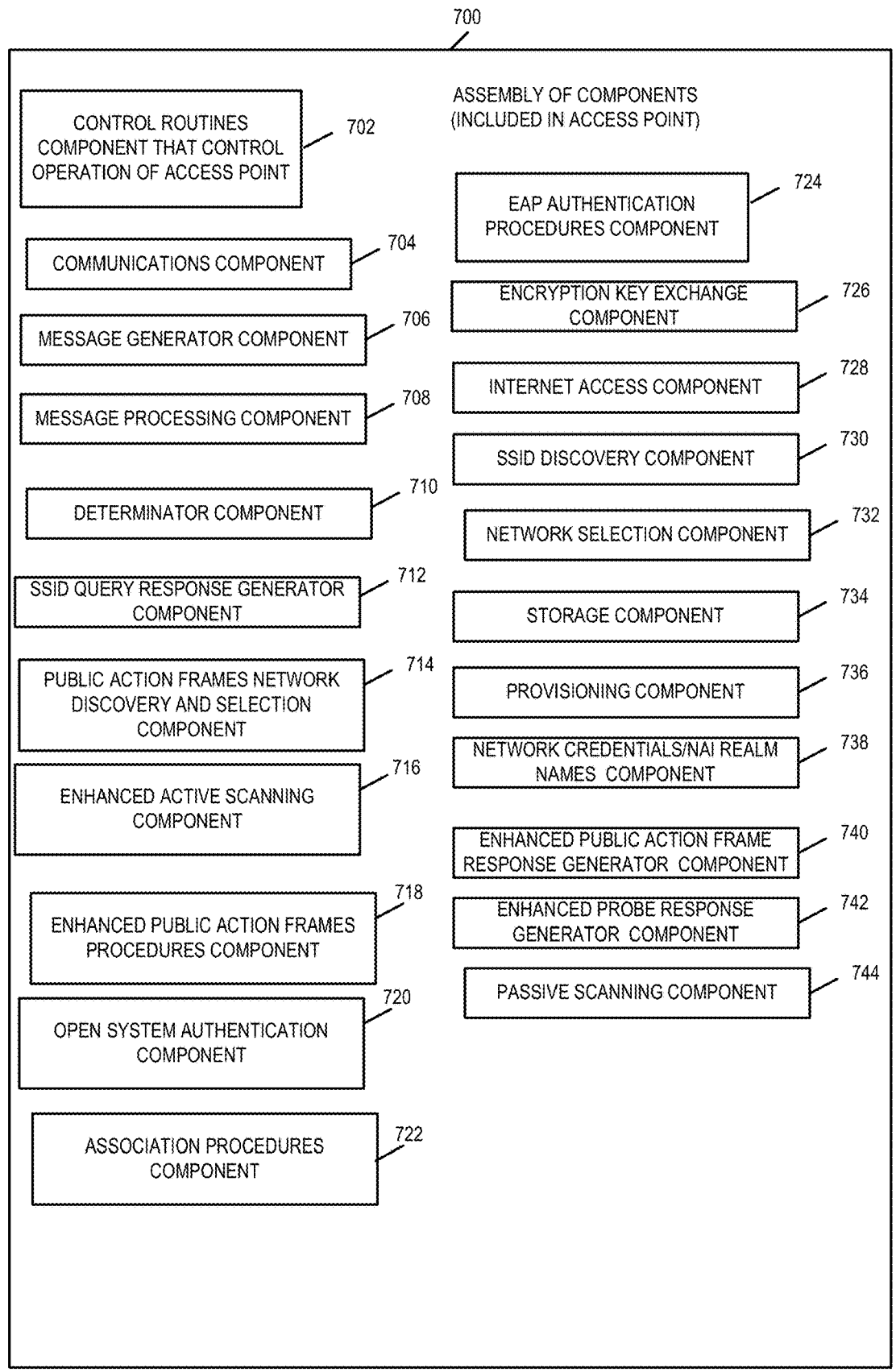
FIG. 7 illustrates an exemplary assembly of components for a Access Point (e.g., Passpoint Access Point) in accordance with an embodiment of the present invention.

FIG. 7 is a drawing of an exemplary assembly of components 700 which may be included in an exemplary Access Point (e.g., exemplary Access Point 400 of FIG. 4), in accordance with an exemplary embodiment. The components in the assembly of components 700 can, and in some embodiments are, implemented fully in hardware within a processor, e.g., processor 406, e.g., as individual circuits. The components in the assembly of components 700 can, and in some embodiments are, implemented fully in hardware within the assembly of hardware components 408, e.g., as individual circuits corresponding to the different components. In other embodiments some of the components are implemented, e.g., as circuits, within processor 406 with other components being implemented, e.g., as circuits within assembly of components 408, external to and coupled to the processor 406. As should be appreciated the level of integration of components on the processor and/or with some components being external to the processor may be one of design choice. Alternatively, rather than being implemented as circuits, all or some of the components may be implemented in software and stored in the memory 412 of the Access Point 400, with the components controlling operation of Access Point 400 to implement the functions corresponding to the components when the components are executed by a processor e.g., processor 406. In some such embodiments, the assembly of components 700 is included in the memory 412 as assembly of software components 414. In still other embodiments, various components in assembly of components 700 are implemented as a combination of hardware and software, e.g., with another circuit external to the processor providing input to the processor which then under software control operates to perform a portion of a component's function.

When implemented in software the components include code, which when executed by a processor, e.g., processor 406, configure the processor to implement the function corresponding to the component. In embodiments where the assembly of components 700 is stored in the memory 412, the memory 412 is a computer program product comprising a computer readable medium comprising code, e.g., individual code for each component, for causing at least one computer, e.g., processor 406, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 7 control and/or configure the wireless base station 400 or elements therein such as the processor 406, to perform the functions of corresponding steps illustrated and/or described in the method of one or more of the flowcharts, signaling diagrams and/or described with respect to any of the Figures. Thus the assembly of components 700 includes various components that perform functions of corresponding one or more described and/or illustrated steps of an exemplary method.

Assembly of components 700 includes a control routines component 702, a communications component 704, a message generator component 706, a message processing component 708, a determinator component 710, a SSID query response generator component 712, a public action frames network discovery and selection component 714, an enhanced active scanning component 716, an enhanced public action frames procedures component 718, an open system authentication component 720, an association procedures component 722, an EAP authentication procedures component 724, an encryption key exchange component 726, an Internet access component 728, a SSID discovery component 730, a network selection component 732, a storage component 734, a provisioning component 736, a network credentials/NAI Realm names component 738, an enhanced public action frame response generator component 740, an enhanced probe response generator component 742, and a passive scanning component 744.

The control routines component 702 is configured to control operation of the Access Point. The communication component 704 is configured to handle communications, e.g., transmission and reception of messages, and protocol signaling for the Access Point. The message generator component 706 is configured to generate messages for transmission to other devices, e.g., enhanced probe requests, enhanced Public Action Frame requests, GAS/ANQP frame messages and reception and in some embodiments processing of messages. The message processing component 708 is configured to process messages received from other devices, e.g., messages from user equipment devices, messages from WLAN controller, messages from the AAA server, Wireless Access Gateway.

The determinator component 710 is configured to make determinations and decisions for the Access Point including for example: is SSID to be hidden in beacon frames and/or probe responses, determination of whether or not to include an SSID name in an enhanced probe response message, determination of whether criterion or criteria included with an SSID query matches a network supported by the Access Point, determination of whether a NAI realm name supplied with the SSID query matches a NAI realm name of a network supported by the Access Point, determination of the SSID which matches a NAI realm name, determination of whether or not to include an SSID name in an enhanced public action frame response message.

The SSID query response generator component 710 is configured to implement all aspects related to generation of an SSID query response including the matching of one or more criteria, e.g., NAI realm name, to a corresponding SSID name. In some embodiments, SSID query response generator component 712 is a sub-component of communications component 704 and/or message generator component 706.

The public action frames network discovery and selection component 714 performs operations in support of UE discovery and network selection activities. In some embodiments, the public action frames network discovery and selection component 714 is a sub-component of one or more of the following: communications component 704, the message generator component 706, the message processing component 708, the SSID query response component 712, and the SSID discovery response component 728.

The enhanced active scanning component 716 performs operations to implement and/or support enhanced active scanning procedures including reception and processing of enhanced probe requests; and generation and transmission of enhanced probe responses. In some embodiments, the enhanced active scanning component 716 is a sub-component of one or more of the following: communications component 704, the message generator component 706, the message processing component 708, the SSID query response component 712, and the SSID discovery component 728.

The enhanced public action frames procedures component 718 performs operations for implementing enhanced public action frames including reception and processing of enhanced public action frame requests, and generation and transmission of public action frame responses. In some embodiments, the enhanced public action frames component 718 is a sub-component of one or more of the following: communications component 704, the message generator component 806, the message processing component 708, the SSID query component 712, and the SSID discovery component 728.

The open system authentication component 720 performs open system authentication operations.

The association procedures component 722 performs operations for associating a UE with a network and/or the network Access Point.

The EAP authentication procedures component 724 performs EAP authentication operations and procedures.

The encryption key exchange component 726 performs encryption key exchange procedures with an user equipment device, e.g., mobile device.

The Internet access component 728, performs operations to provide Internet access to a UE.

The SSID discovery component 730 performs operations to support discovery of hidden SSID names by user equipment devices provisioned with credentials for hidden SSID network.

The network selection component 732 performs the operation of selecting a network corresponding to criteria, e.g., network credentials and/or NAI realm names included with or as part of an SSID query.

The storage component 734 performs storage and retrieval operations in connection with on-board and external memory including record creation, updating and deletion, e.g., records containing network subscriber credential and NAI realm information, SSID names. The storage component 734 is also configured to manage the storage, and retrieval of data and/or instructions to/and from memory, databases and/or storage device coupled and/or connected to the Access Point.

The provisioning component 736 implements provisioning operations when network subscriber and credential information is provisioned and/or included on the Access Point, e.g., during initialization and or update procedures. The provisioning operations in some embodiments include storage and security operations and/or procedures for securing the subscriber and credential information, SSID names, NAI realm names, PLMN information.

The network credentials/NAI Realm names component 738 stores and maintains network credential information with corresponding NAI realm names and SSID names as well as processes requests, e.g., SSID query requests, relating to network credentials/NAI Realm names.

The enhanced public action frame response generator component 740 generates enhanced public action frame responses with SSID query responses. In some embodiments, the enhanced probe response generator component 740 is a sub-component of communications component 704 and/or the message generator component 708.

The enhanced probe response generator component 742 generates enhanced probe responses with SSID query responses. In some embodiments, the enhanced probe response generator component 742 is a sub-component of communications component 704 and/or the message generator component 708.

The passive scanning component 744 performs passive scanning operations including transmitting at intervals beacon frames advertising presence of a network. In some embodiments, the passive scanning component 744 is a sub-component of the communications component 704 and/or the message generator component 708.

Figure 8:
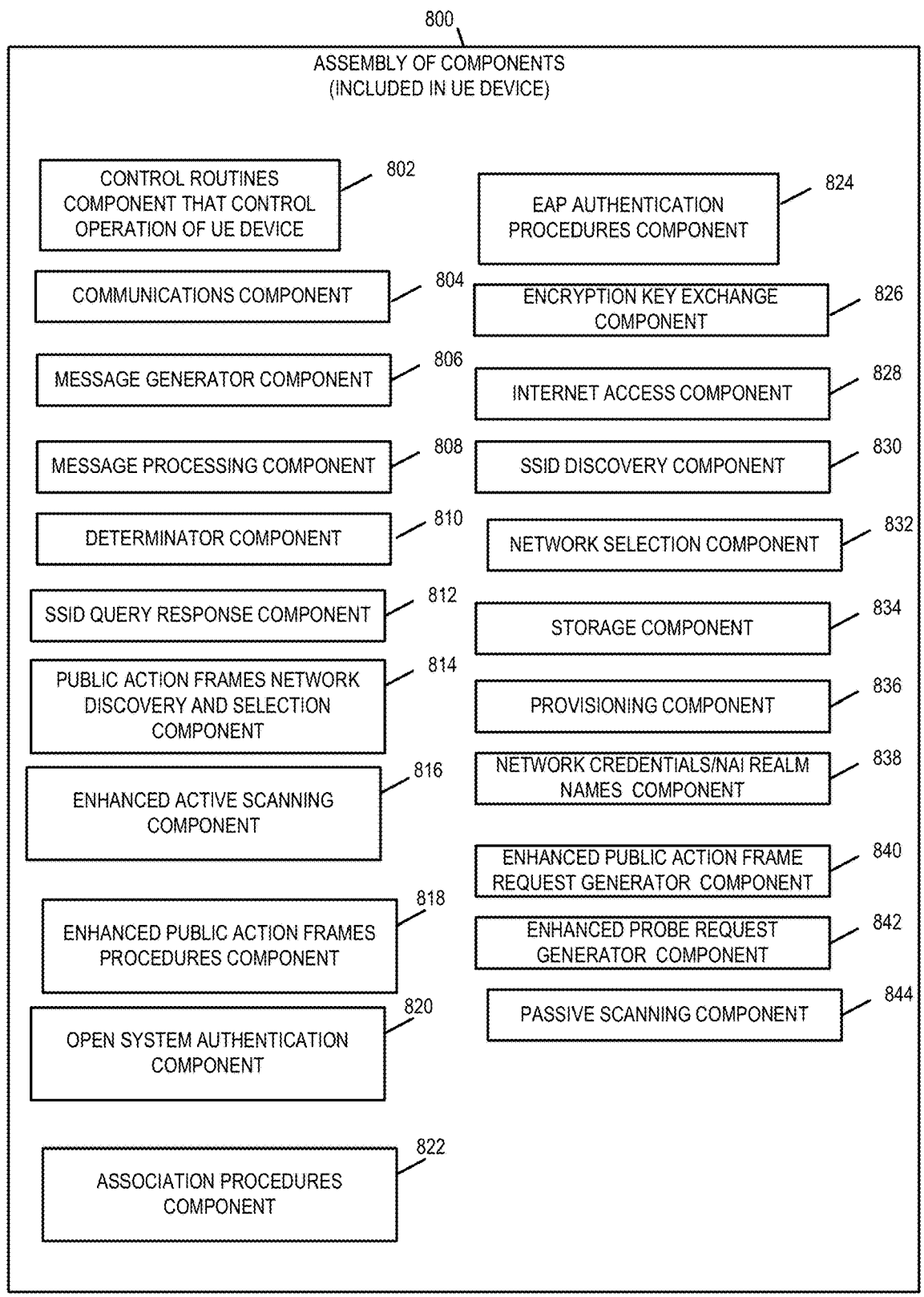
FIG. 8 illustrates an exemplary assembly of components for a user equipment device in accordance with an embodiment of the present invention.

FIG. 8 is a drawing of an exemplary assembly of components 800 which may be included in an exemplary user equipment (UE) device, e.g., UE device 500 of FIG. 5, in accordance with an exemplary embodiment. The components in the assembly of components 800 can, and in some embodiments are, implemented fully in hardware within a processor, e.g., processor 506, e.g., as individual circuits. The components in the assembly of components 800 can, and in some embodiments are, implemented fully in hardware within the assembly of hardware components 508, e.g., as individual circuits corresponding to the different components. In other embodiments some of the components are implemented, e.g., as circuits, within processor 506 with other components being implemented, e.g., as circuits within assembly of components 508, external to and coupled to the processor 506. As should be appreciated the level of integration of components on the processor and/or with some components being external to the processor may be one of design choice. Alternatively, rather than being implemented as circuits, all or some of the components may be implemented in software and stored in the memory 512 of the UE device 500, with the components controlling operation of UE device 500 to implement the functions corresponding to the components when the components are executed by a processor e.g., processor 506. In some such embodiments, the assembly of components 800 is included in the memory 512 as assembly of software components 514. In still other embodiments, various components in assembly of components 800 are implemented as a combination of hardware and software, e.g., with another circuit external to the processor providing input to the processor which then under software control operates to perform a portion of a component's function. When implemented in software the components include code, which when executed by a processor, e.g., processor 506, configure the processor to implement the function corresponding to the component. In embodiments where the assembly of components 800 is stored in the memory 512, the memory 512 is a computer program product comprising a computer readable medium comprising code, e.g., individual code for each component, for causing at least one computer, e.g., processor 506, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 8 control and/or configure the UE device 500 or elements therein such as the processor 506, to perform the functions of corresponding steps illustrated and/or described in the method of one or more of the flowcharts, signaling diagrams and/or described with respect to any of the Figures. Thus the assembly of components 800 includes various components that perform functions of corresponding one or more described and/or illustrated steps of an exemplary method.

Assembly of components 800 includes a control routines component 802, a communications component 804, a message generator component 806, a message processing component 808, a determinator component 810, a SSID query component 812, a public action frames network discovery and selection component 814, an enhanced active scanning component 816, an enhanced public action frames procedures component 818, an open system authentication component 820, an association procedures component 822, an EAP authentication procedures component 824, an encryption key exchange component 826, an Internet access component 828, a SSID discovery component 830, a network selection component 832, a storage component 834, a provisioning component 836, a network credentials/NAI Realm names component 838, an enhanced public action frame request generator component 840, an enhanced probe request generator component 842, and a passive scanning component 844.

The control routines component 802 is configured to control operation of the UE. The communication component 804 is configured to handle communications, e.g., receipt and transmission of signals and provide protocol signal processing for one or more protocols for the UE. The message generator component 806 is configured to generate messages for transmission to other devices, such as the Access Point or wireless base station with which the UE is communicating. Messages including probe messages, public action frame messages, requests, query messages, GAS/ANQP messages, data messages, encrypted data messages, Authentication messages (Authentication requests, EAP Authentication messages), Key Exchange message, Association message (e.g., Association request messages). In some embodiments, the message generator component 806 is a sub-component of the communications component 804.

The message processing component 808 processes received messages, e.g., EAP Authentication response, 4-way handshake encryption key exchange messages, probe response messages, public action frame response messages, authentication response messages, GAS/ANQP messages, encrypted data messages. In some embodiments, the message processing component is a sub-component of the communications component 804.

The determinator component 810, makes determinations for the user equipment device including for example determining what network to select for association, determining whether a beacon frame has a hidden SSID, determining whether the UE has been provisioned for a network advertised by a beacon frame with hidden SSID, determining whether to generate an SSID query, determining the criteria or set of criteria to include in an SSID query, determining an NAI realm name, determining an SSID name corresponding to an NAI realm name from records stored in memory during provisioning; determining whether to utilize enhanced active scanning procedures to determine and/or discover SSID name corresponding to a network with SSID hiding enabled, determining whether to utilize enhanced public action frames to determine and/or discover SSID name corresponding to a network with SSID hiding enabled, and determining values of vendor specific content fields for an SSID query.

The SSID query component 812 performs operations to generator and transmit SSID query and receive and process SSID query responses. In some embodiments, the SSID query component 812 component is a sub-component of one or more of the following: communications component 804, the message generator component 806, the message processing component 808, the SSID query component 812, and the SSID discovery component 828.

The public action frames network discovery and selection component 814 performs operations to discover and select a network using public action frames. In some embodiments, the public action frames network discovery and selection component 814 is a sub-component of one or more of the following: communications component 804, the message generator component 806, the message processing component 808, the SSID query component 812, and the SSID discovery component 828.

The enhanced active scanning component 816 performs operations to implement enhanced active scanning including generation and transmission of enhanced probe requests, and reception and processing of enhanced probe frame responses. In some embodiments, the enhanced active scanning component 816 is a sub-component of one or more of the following: communications component 804, the message generator component 806, the message processing component 808, the SSID query component 812, and the SSID discovery component 828.

The enhanced public action frames procedures component 818 performs operations for implementing enhanced public action frames including generation and transmission of public action frame requests, and reception and processing of enhanced public action frame responses. In some embodiments, the enhanced public action frames component 818 is a sub-component of one or more of the following: communications component 804, the message generator component 806, the message processing component 808, the SSID query component 812, and the SSID discovery component 828.

The open system authentication component 820 performs open system authentication operations.

The association procedures component 822 performs operations to become associated with a network and/or a network Access Point.

The EAP authentication procedures component 824 performs EAP authentication operations and procedures.

The encryption key exchange component 826 performs encryption key exchange procedures with an Access Point.

The Internet access component 828, performs operations to obtain Internet access.

The SSID discovery component 830 performs operations to discover SSID names of network with hidden SSID name enabled on network Access Points.

The network selection component 832 performs the operation of selecting a network to associate with based on network credentials and/or NAI realm names with credentials provisioned on the user equipment device as well as parameters of available networks for which the user equipment device has been provisioned.

The storage component 834 performs storage and retrieval operations in connection with on-board and external memory including record creation, updating and deletion, e.g., records containing network subscriber credential and NAI realm information.

The provisioning component 836 implements provisioning operations when network subscriber and credential information is provisioned on the user equipment device. The provisioning operations in some embodiments include storage and security operations and/or procedures for securing the subscriber and credential information.

The network credentials/NAI Realm names component 838, The network credentials/NAI Realm names component 838 stores and maintains network credential information with corresponding NAI realm names and in some embodiments SSID names as well as generates and processes messages utilizing network credential information/NAI Realm name information, e.g., SSID query requests, SSID query responses, etc.

The enhanced public action frame request generator component 840 generates enhanced public action frame requests with SSID queries. In some embodiments, the enhanced probe request generator component 840 is a sub-component of communications component 804 and/or the message generator component 808.

The enhanced probe request generator component 842 generates enhanced probe requests with SSID queries. In some embodiments, the enhanced probe request generator component 842 is a sub-component of communications component 804 and/or the message generator component 808.

The passive scanning component 844 performs passive scanning operations including performing a one-by-one channel scan of each of a plurality of different channels listening to the beacons on each of the plurality of different channels. In some embodiments, the passive scanning component 844 is a sub-component of the communications component 804 and/or the message processing component 808.

Figure 9:
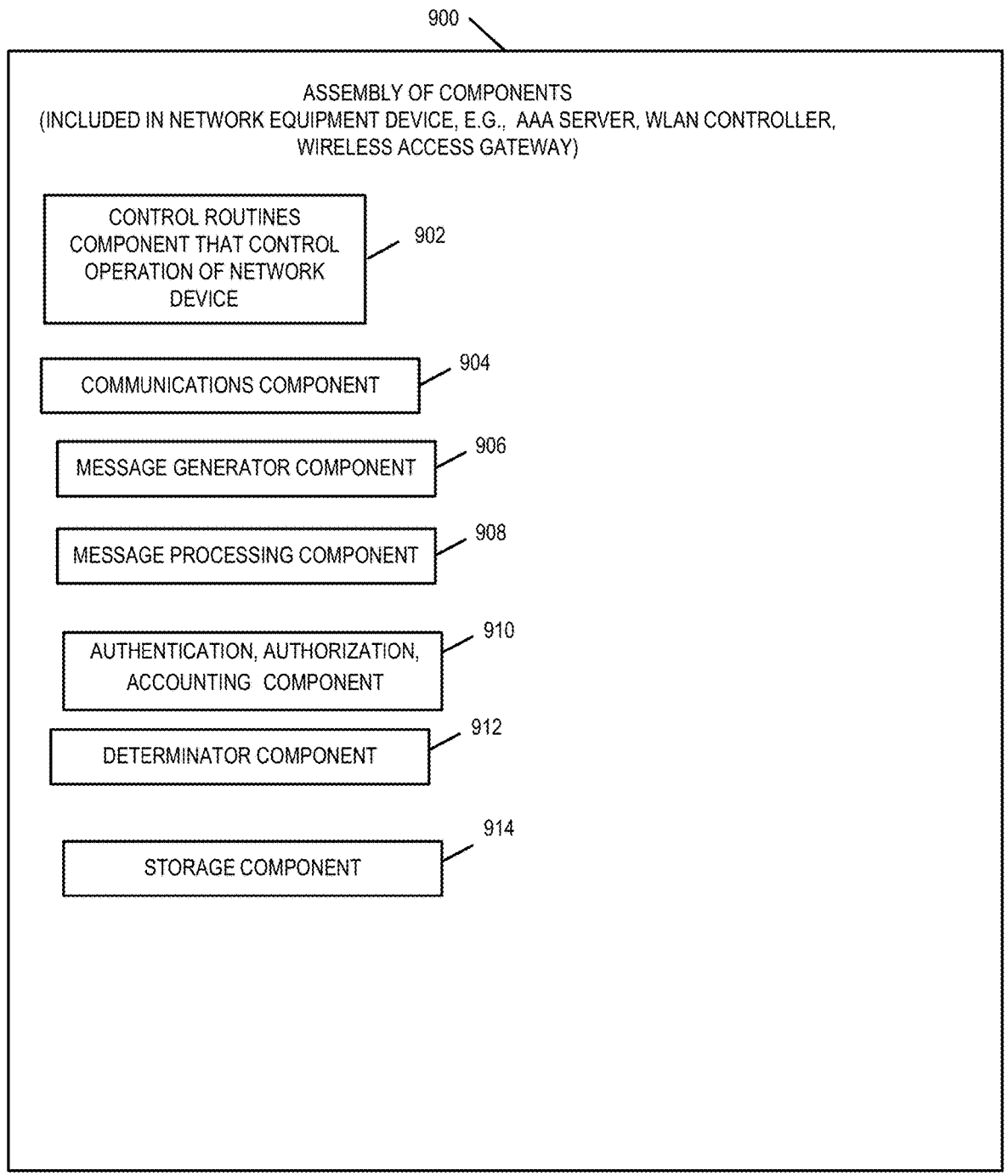
FIG. 9 illustrates an exemplary assembly of components for a network equipment device in accordance with an embodiment of the present invention.

FIG. 9 is a drawing of an exemplary assembly of components 900 which may be included in a network equipment device, e.g., network equipment device 600 of FIG. 6, in accordance with an exemplary embodiment. The components in the assembly of components 900 can, and in some embodiments are, implemented fully in hardware within a processor or one or more processors, e.g., processor(s) 606, e.g., as individual circuits. The components in the assembly of components 900 can, and in some embodiments are, implemented fully in hardware within the assembly of hardware components 608, e.g., as individual circuits corresponding to the different components. In other embodiments some of the components are implemented, e.g., as circuits, within processor(s) 606 with other components being implemented, e.g., as circuits within assembly of components 608, external to and coupled to the processor(s) 606. As should be appreciated the level of integration of components on the processor and/or with some components being external to the processor may be one of design choice. Alternatively, rather than being implemented as circuits, all or some of the components may be implemented in software and stored in the memory 612 of the cable modem termination system 600, with the components controlling operation of the cable modem termination system 600 to implement the functions corresponding to the components when the components are executed by a processor e.g., processor 606. In some such embodiments, the assembly of components 900 is included in the memory 612 as assembly of software components 614. In still other embodiments, various components in assembly of components 900 are implemented as a combination of hardware and software, e.g., with another circuit external to the processor providing input to the processor which then under software control operates to perform a portion of a component's function.

When implemented in software the components include code, which when executed by a processor or one or more processors, e.g., processor(s) 606, configure the processor(s) to implement the function corresponding to the component. In embodiments where the assembly of components 900 is stored in the memory 612, the memory 612 is a computer program product comprising a computer readable medium comprising code, e.g., individual code for each component, for causing at least one computer, e.g., processor 606, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 9 control and/or configure the cable modem termination system 600 or elements therein such as the processor(s) 606, to perform the functions of corresponding steps illustrated and/or described in the method of one or more of the flowcharts, signaling diagrams and/or described with respect to any of the Figures. Thus the assembly of components 900 includes various components that perform functions of corresponding one or more described and/or illustrated steps of an exemplary method.

Assembly of components 900 includes a control routines component 902, a communications component 904, a message generator component 906, a message processing component 908, an authentication, authorization, accounting component 910, a determinator component 912, a storage component 914. Not all components are included in or utilized with each network equipment device. For example, when the network equipment device implemented is an AAA server it will include an utilize authentication, authorization, accounting component 910 but this component is typically not included or not utilized when the network device that is implemented is a WLAN controller.

The control routines component 902 is configured to control operation of the network equipment device. The communication component 904 is configured to handle communications, e.g., transmission and reception of messages, and protocol signaling for the network equipment device. The message generator component 906 is configured to generate messages for transmission to other devices. The message processing component 908 is configured to process messages received from other devices, e.g., messages from Access Point, WLAN controller, Wireless Gateway, AAA server, messages from core network, and messages from Internet.

The authentication, authorization, accounting component 910 performs processing for authentication, authorization and accounting procedures.

The determinator component 912 is configured to make determinations and decisions for the network equipment device including for example: determining whether to accept an EAP authorization request received from a user equipment device.

The storage component 914 is configured to manage the storage, and retrieval of data and/or instructions to/and from memory, buffers in memory, hardware buffers and/or storage device, e.g., databases, coupled and/or connected to the network equipment device.

Figure 10A:
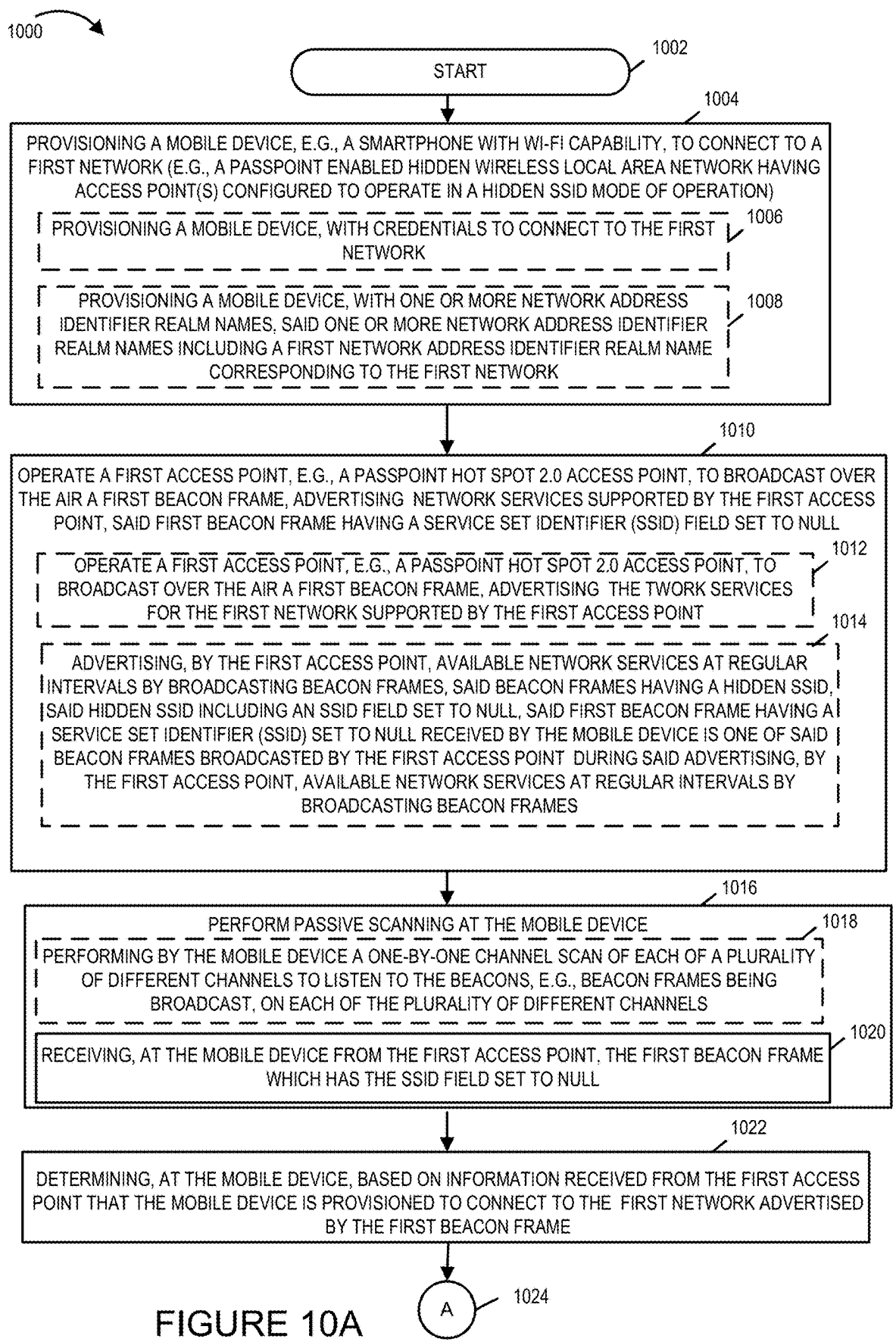
FIG. 10A illustrates the steps of the first part of an exemplary method in accordance with an embodiment of the present invention.
Figure 10B:
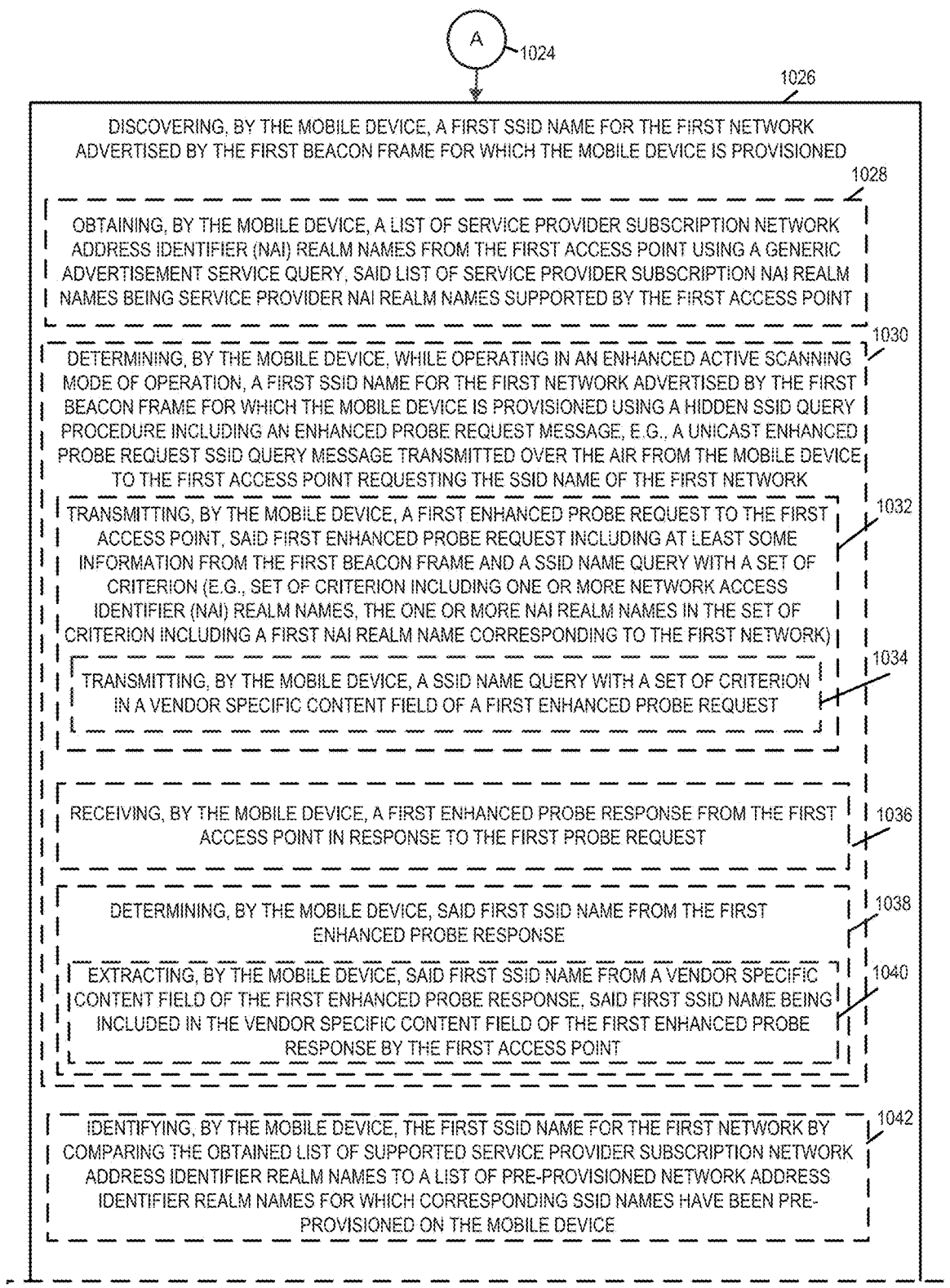
FIG. 10B illustrates the steps of the second part of an exemplary method in accordance with an embodiment of the present invention.
Figures 10, 10A, 10B, 10C, 10D:
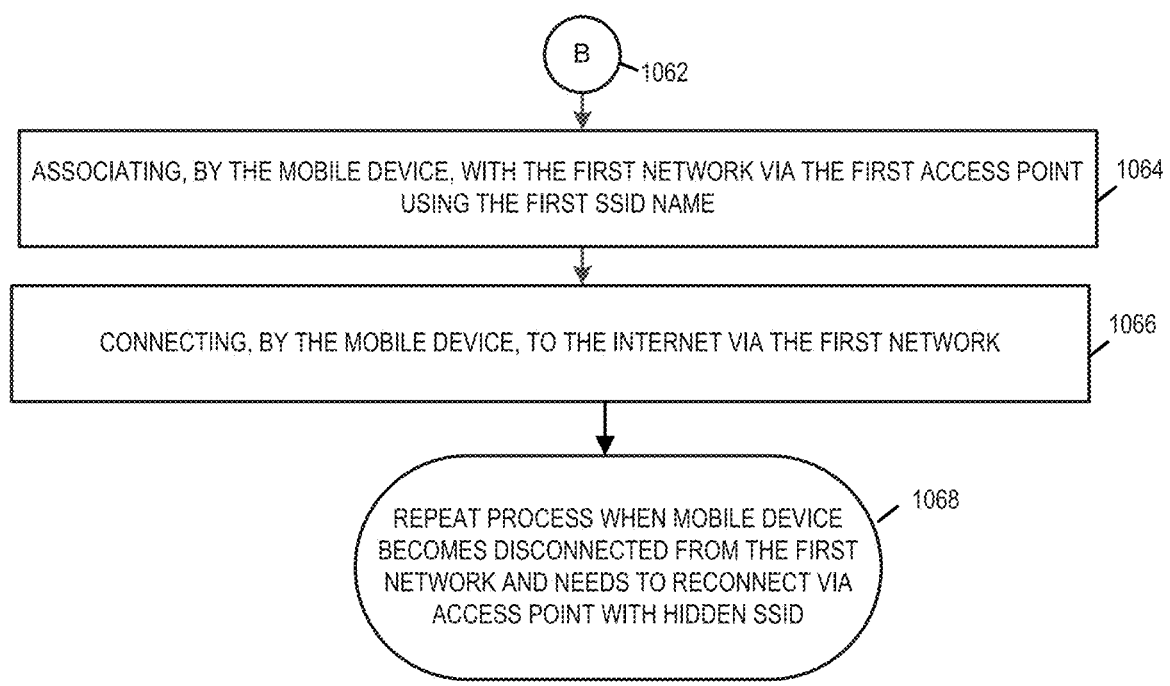
FIG. 10 illustrates the combination of FIGS. 10A, 10B, 10C, and 10D.
FIG. 10C illustrates the steps of the third part of an exemplary method in accordance with an embodiment of the present
FIG. 10D illustrates the steps of the fourth part of an exemplary method in accordance with an embodiment of the present invention.

FIG. 10 illustrates the steps of a flowchart of a method 1000 which illustrates another exemplary method embodiment for achieving seamless connectivity of Wi-Fi devices to Passpoint enabled hidden Wireless Local Area Networks. FIG. 10 illustrates the combination of FIGS. 10A, 10B, 10C, and 10D. FIG. 10A illustrates the steps of the first part of an exemplary method in accordance with an embodiment of the present invention. FIG. 10B illustrates the steps of the second part of an exemplary method in accordance with one embodiment of the present invention. FIG. 10C illustrates the steps of the third part of an exemplary method in accordance with an embodiment of the present invention. FIG. 10D illustrates the steps of the fourth part of an exemplary method in accordance with an embodiment of the present invention.

For explanatory purposes the exemplary method 1000 will be explained in connection with the exemplary communications system 100 illustrated in FIG. 1. However, it should be understood that the method may be implemented using other systems as well as other system configurations then those illustrated in FIG. 1. While it will be readily understood that additional steps and signaling are performed in connection with communicating information, messages, and packets between devices, the method 1000 focuses on and discusses the steps and signaling for understanding the invention.

The method 1000 shown in FIG. 10 will now be discussed in detail. The method starts in start step 1002 shown on FIG. 10A. Operation proceeds from start step 1002 to step 1004.

In step 1004, a mobile device with Wi-Fi capability, e.g., UE 1 108 of system 100, is provisioned to connect to a first network, e.g., a Passpoint enabled hidden Wireless Local Area Network having Access Points (e.g., AP 102, 104, 106 of system 100) configured to operate in a hidden SSID mode of operation). In most embodiments, the mobile device supports one or more different Radio Access Technologies in addition to the Wi-Fi capability such as for example 4G LTE wireless capability, 5G New Radio capability, etc. Access Points operating in a hidden SSID mode of operation broadcast beacon frames with the SSID set to NULL. In some embodiments, step 1004 includes one or more sub-steps 1006 and 1008.

In sub-step 1006, a mobile device, e.g., UE 1 108 of system 100, is provisioned with credentials to connect to the first network, e.g., a first WLAN network.

In sub-step 1008, a mobile device, e.g., UE 1 108 of system 100, is provisioned with one or more Network Address Identifier (NAI) realm names. The said one or more NAI realm names including a first NAI realm name corresponding to the first network. The mobile device also being provisioned with credentials, e.g., authorization and/or authentication credentials to connect to the first network.

FIG. 15 illustrates a table 1500 including a set of records stored in the non-volatile memory of mobile device 108. The records including credential information for the mobile device. The credential information including credentials for accessing and/or connecting to one or more networks, e.g., WLAN networks. In some embodiments, the one or more of records are stored on one or more SIM cards included in the mobile device. Each SIM card including credentials to access and/or connect to one or more networks, e.g., wireless networks such as WLAN networks, owned and/or operated by a wireless network service provider. The records in table 1500 do not include the SSID name of the network for which credentials have been provisioned in the mobile. Table 1600 shown in FIG. 16 includes a set of records in which the provisioned information also includes the SSID name of the network. Such pre-provisioned mobile devices can use this information to access and connect to hidden WLAN networks as will be explained in greater detail below.

Provisioning may, and sometimes does, occur during factory programming. In some embodiments, the mobile device is provisioned to include the credentials for a new network when a SIM card with the new network information is installed. In some embodiments, the mobile device is provisioned when the mobile device is configured to operate with a network, e.g., a first WLAN network.

Operation proceeds from step 1004 to step 1010. In step 1010, a first Access Point, e.g., Access Point 102 of system 100, is operated to broadcast over the air a first beacon frame, advertising network services supported by the first Access Point. The first beacon frame has a Service Set Identifier (SSID) field set to NULL. The first beacon frame in various embodiments has a format in compliance with the IEEE 802.11 standard and announces the presence of a WLAN network. The first beacon frame includes a 802.11 MAC header, a body, and a frame check sequence. The first beacon frame as previously stated includes a SSID field set to NULL. In various embodiments, the first Access Point, e.g., Access Point 102 of system 100, is a passpoint hotspot 2.0 Access Point. The Access Point supports access to one or more WLAN networks. The one or more WLAN networks include the first network. In some embodiments, step 1010 includes one or more sub-step 1012 and 1014.

In sub-step 1012, a first Access Point, e.g., Access Point 102 of system 100, is operated to broadcast over the air a first beacon frame, advertising the network services for the first network supported by the first Access Point, e.g., access to the first network and capabilities of the first Access Point, e.g., data rates, etc.

In sub-step 1014, the first Access Point advertises available network services at regular intervals by broadcasting beacon frames. The beacon frames have a hidden SSID, i.e., the beacon frames include an SSID field set to NULL. The first beacon frame having a SSID set to NULL received by the mobile device is one of the beacon frames broadcasted by the first Access Point during the advertising, by the first Access Point, available network services at regular intervals by broadcasting beacon frames. Operation proceeds from step 1010 to step 1016.

In step 1016, passive scanning is performed at the mobile device. In some embodiments, step 1016 includes one or more sub-steps 1018 and 1020.

In sub-step 1018, the mobile device performs one-by-one channel scanning of each of a plurality of different channels to listen to the beacons, i.e., the beacon frames being broadcast, on each of the plurality of different channels.

In sub-step 1020, the mobile device receives the first beacon frame which has the SSID field set to NULL while performing passive scanning.

Operation proceeds from step 1016 to step 1022. In step 1022, the mobile device determines based on information received from the first Access Point that the mobile device is provisioned or has been pre-provisioned to connect to the first network advertised by the first beacon frame. Operation proceeds from step 1022 via connection node A 1024 to step 1026 shown on FIG. 10B.

In step 1026, the mobile device discovers and/or obtains a first SSID name for the first network advertised by the first beacon frame. The first network being a network for which the mobile device has been provisioned. In some embodiments, step 1026 includes one or more sub-steps 1028, 1030, 1042, 1044 (shown on FIG. 10C).

In sub-step 1028, the mobile device obtains a list of service provider subscription Network Address Identifier (NAI) realm names from the first Access Point using a Generic Advertisement Service Query, e.g., GAS/ANQP query. The list of service provider subscription NAI realm names being service provider NAI realm names supported by the first Access Point.

In sub-step 1030, the mobile device while operating in an enhanced active scanning mode of operation determines a first SSID name for the first network advertised by the first beacon frame for which the mobile device is provisioned using a hidden SSID query procedure. In some embodiments, sub-step 1030 includes one or more sub-steps 1032, 1036, 1038, and 1040.

In sub-step 1032, the mobile device transmits a first enhanced Probe Request to the first Access Point. The first enhanced Probe Request including at least some information from the first beacon frame and a SSID name query with a set of criterion, e.g., the set of criterion may, and in some embodiments does, include one or more NAI realm names. The one or more NAI realm names in the set of criterion including a first NAI realm name corresponding to the first network. In some embodiments, sub-step 1032 includes sub-step 1034. In sub-step 1034, the mobile device transmits a SSID name query with a set of criterion included in a vendor specific content field of the first enhanced probe request. Prior to transmitting the first enhanced probe request, the mobile device generates the first enhanced probe request by including the SSID name query with the set of criterion in the vendor specific content field of a first enhanced probe request. The SSID name query with the set of criterion is based on credential information provisioned in the mobile device and/or on information received from the first Access Point, e.g., information received in the first beacon frame.

Diagram 1102 shown in FIG. 11 illustrates an exemplary enhanced probe request vendor specific element 1104 implemented in accordance with an embodiment of the present invention. The enhanced probe request vendor specific element 1104 has been modified to include enhanced vendor-specific content fields with SSID name query fields as shown in diagram 1113. The enhanced probe request vendor-specific element includes the following fields: element ID field 1106, length field 1108, organization identifier field 1110, vendor-specific content field 1112. The vendor-specific content field 1112 has been enhanced as shown in diagram 1113 to include the following fields: query type field 1114, number of NAI realms field 1116 (where in this example N is the positive integer number NAI realms), NAI #1 realm name length field 1118, NAI #1 realm name field 1120, . . . , NAI #N realm name length field 1122, and NAI #N realm name field 1124, where N is a positive integer greater than 1. The octets for each of the fields has also been shown below the fields in the diagrams 1104, 1113, 1128. As shown in legend 1126, the query type can have a value of 0-255 with 0 indicating a query for SSID name, and in this example, values 1-255 being reserved for future use.

Diagram 1128 of FIG. 11 illustrates an exemplary enhanced probe request vendor-specific content wherein the query type field is set to 0 (1114'), the number of NAI realms field is set to 2 (1116'), the NAI #1 realm name length field is set to 20 (1118'), the NAI #1 realm name field is set to "SERVICEPROVIDER1.COM" (1120'), the NAI #2 realm name length field is set to 20 (1122') and the NAI #2 realm name is set to "SERVICEPROVIDER2.NET" (1124'). The first NAI name realm having a NAI which is "SERVICEPROVIDER1" and the realm is "COM". The second NAI name realm having an NAI which is "SERVICEPROVIDER2" and the realm is "NET". In this example, the NAI #1 realm name and NAI #2 realm name have been provisioned in the mobile device, e.g., as described in step 1004.

In sub-step 1036, the mobile device receives a first enhanced probe response from the first Access Point in response to the first enhanced probe request. Prior to sub-step 1036, the first Access Point, upon receiving the first enhanced Probe Request, extracts and processed the SSID name query with the set of criterion from the first enhanced Probe Request. The first Access Point uses the set of criterion, e.g., the NAI realms to identify the corresponding SSID names for each of the networks. In this example, the set of criterion is the NAI realm name for the first network, e.g., SERVICEPROVIDER1.COM. In some embodiments, the first Access Point compares the set of criterion for each SSID name query to information contained in a set of records it maintains in memory for WLAN networks it is providing services for. The records include the SSID name of the network and the corresponding set of criterion. Table 1700 of FIG. 17 illustrates a table with the rows 1708, 1710, 1712, 1714, 1716 of the table being a record containing a NAI realm name and corresponding SSID name. The first row of the table 1706 to table 1700 includes labels identifying the information contained in the each of the columns. The entry (column 1702, row 1706) NAI name indicates that the entries in column 1702 includes NAI realm names for networks supported by the Access Point. The entry (column 1704, row 1706) SSID name indicates that the entries in column 1702 are SSID names. The rows 1708, 1710, 1712, 1714, 1716 are records with the information in the row corresponding to a particular network. Row 1708 includes information for a first network, e.g., a first WLAN having a NAI realm name "SERVICEPROVIDER1.COM" (col. 1702, row 1708 entry) and a SSID name of "SP1-SSID" (col. 1704, row 1708 entry). Row 1710 includes information for a second network, e.g., a second WLAN having a NAI realm name "SERVICEPROVIDER2.NET" (col. 1702, row 1710 entry) and a SSID name of "SP2-SSID" (col. 1704, row 1710 entry). Row 1712 includes information for a third network, e.g., a third WLAN having a NAI realm name "SERVICEPROVIDER3.COM" (col. 1702, row 1712 entry) and a SSID name of "SP3-SSID" (col. 1704, row 1712 entry). Row 1716 includes information for a Nth network, e.g., a Nth WLAN having a NAI realm name "SERVICEPROVIDERN.M (col. 1702, row 1716 entry) and a SSID name of "SPN-SSID" (col. 1704, row 1716 entry). The " . . . " in the entries of row 1714 represent additional entries the specifics of which are not illustrated. In various embodiments, table 1700 or an equivalent table of records and/or data structures is included in the memory of the first Access Point. With the records being for the networks that the Access Point is supported. Additional information, e.g., additional credential information, is typically kept with respect to each of the networks supported by the Access Point, e.g., Hotspot 2.0 parameters, PLMN code, data rates, SSID hidden enabled, etc.

When the first Access Point finds a record that includes the matching set of criterion, it then extracts the SSID name from the record with the matching criterion. For example, if the set of criterion is the NAI realm name "SERVICEPROVIDER1.COM", the first Access Point identifies the record which includes the NAI realm name "SERVICEPROVIDER1.COM" and extracts the SSID name, e.g., SP1-SSID, from the record wherein SP1-SSID is the SSID name for the WLAN network with the NAI realm name "SERVICEPROVIDER1.COM". As discussed above, FIG. 17 illustrates a table 1700 which includes a set of records for NAI realm names and their corresponding SSID names. Each of entries in rows 1708, 1710, 1712, . . . , 1716 being a single record. The row 1708 having a NAI realm name "SERVICEPROVIDER1.COM" (col. 1702, row 1708 entry) with a SSID name of SP1-SSID (col. 1704, row 1708 entry).

The first Access Point generates a first enhanced Probe Response which includes a response to the SSID name query. The SSID name determined for each of set of criterion provided in the first enhanced Probe Request is included in the first enhanced Probe Response. The first Access Point includes the SSID name in a vendor-specific content field of the first enhanced probe response. FIG. 12 illustrates an example of enhanced Probe Response vendor specific element in accordance with an embodiment of the present invention.

Diagram 1202 shown in FIG. 12 illustrates an exemplary enhanced probe response vendor specific element 1204 implemented in accordance with an embodiment of the present invention. The enhanced probe response vendor specific element 1204 has been modified to include enhanced vendor-specific content fields with SSID name query response fields as shown in diagram 1213. The enhanced probe request vendor-specific element includes the following fields: element ID field 1206, length field 1208, organization identifier field 1210, vendor-specific content field 1212. The vendor-specific content field 1212 has been enhanced as shown in diagram 1213 to include the following fields: response type field 1214, number of SSID names field 1216 (where in this example N is the positive integer number of SSID names), SSID #1 name length field 1218, SSID #1 name field 1220, . . . , SSID #N name length field 1222, and SSID #N name field 1224, where N is a positive integer greater than 1. The octets for each of the fields has also been shown below the fields in the diagrams 1204, 1213, 1228. As shown in legend 1226, the response type can have a value of 0-255 with 0 indicating a response to a SSID name query, and in this example, values 1-255 are reserved for future use.

Examples of how to fill in or populate the fields of the enhanced probe request vendor-specific content fields and enhanced probe response vendor-specific content fields will now be discussed in connection with three examples. The example 1 SSID name query is shown in diagram 1128 in FIG. 11. The example 1 SSID name query response is shown in diagram 1228 shown in FIG. 12. The example 2 SSID name query is shown in diagram 1130 in FIG. 13. The example 2 SSID name query response is shown in diagram 1230 shown in FIG. 13. The example 3 SSID name query is shown in diagram 1132 in FIG. 14. The example 3 SSID name query response is shown in diagram 1232 shown in FIG. 14. These different examples demonstrate how to populate the fields under different conditions. In example 1 there are two networks for which the user equipment device is provisioned with credentials and both are supported by the Access Point. In the second example, there are two networks for which the user equipment device is provisioned but only the second network is supported by the Access Point. In the third example, the SSID name query includes only criterion for a single network (e.g., the NAI realm name of SPECTRUM.COM) which is supported by the Access Point. The NAI realm name and SSID name being changed to illustrate the corresponding changes in the populated fields.

Diagram 1228 of FIG. 12 illustrates an exemplary enhanced probe response vendor-specific content entry that has been populated wherein the response type field is set to 0 (1214'), the number of SSID names is set to 2 (1216'), the SSID #1 name length field is set to 8 (1218'), the SSID #1 name field is set to "SP1-SSID" (1220'), the SSID #2 name length field is set to 8 (1222') and the SSID #2 name field is set to "SP2-SSID" (1224'). This exemplary enhanced probe response vendor specific content fields are a response to the enhanced probe request vendor specific content fields shown in diagram 1128 in FIG. 11. SSID #1 name corresponding to the NAI #1 realm name, SSID #2 name corresponding to the NAI #2 realm name. In this example, the NAI #1 realm name and NAI #2 realm name have been provisioned in the mobile device, e.g., as described in step 1004 and are both supported by the Access Point hence both are included in the SSID name query and the SSID name query response.

Diagram 1300 in FIG. 13 illustrates a second enhanced probe request vendor-specific content fields example 1130 and a second enhanced probe response vendor-specific content fields example 1230 which is a response to the request 1130. In this second example, the user equipment device or mobile device which sends the request with the SSID name query has credentials for two networks a first network with NAI realm name "SERVICEPROVIDER1.COM" and a second network with NAI realm name "SERVICEPROVIDER2.NET". The Access Point does not support the first network with NAI #1 realm name of "SERVICEPROVIDER1.COM" but does support the second network with NAI #2 realm name of "SERVICEPROVIDER2.NET". In the second example, the user equipment device or mobile device populates the enhanced probe request vendor-specific content fields as follows: query type set to 0 (1114'), Number of NAI realm names is set to 2 (1116'), NAI #1 Realm name length is set to 20 (1118'), NAI #1 realm name is set to "SERVICEPROVIDER1.COM" (1120'), NAI #2 realm name length is set to 20 (1122'), and NAI #2 realm name is set to "SERVICEPROVIDER2.NET". The Access Point which receives the request and determines there is no match for the NAI #1 realm name "SERVICEPROVIDER1.COM" and sets the NAI #1 realm name length field to a value of zero. The Access Point also determines there is a match for the NAI #2 realm name "SERVICEPROVIDER2.NET" and populates the NAI #2 realm name field with the SSID name "SP2-SSID" which is the SSID name for the second network with the NAI realm name "SERVICEPROVIDER2.NET". The enhanced probe response vendor specific content fields of example 2 are populated by the Access Point as follows: response type is set to 0 (1214"), number of SSID names is set to 2 (1216"), SSID #1 name length is set to 0 (1218"), SSID #2 name length is set to 8 (1222"), SSID #2 Name is set to "SP2-SSID" (1224"). The response keeps the SSID names in the same order as in the received SSID name query.

Diagram 1400 in FIG. 14 illustrates a third enhanced probe request vendor-specific content fields example 1132 and a third enhanced probe response vendor-specific content fields example 1232 which is a response to the request 1132. In this third example, the user equipment device or mobile device which sends the request with the SSID name query has credentials for a first network with NAI realm name "SPECTRUM.COM". The Access Point supports the first network with NAI #1 realm name of "SPECTRUM.COM". In this third example, the user equipment device or mobile device populates the enhanced probe request vendor-specific content fields as follows: query type set to 0 (1114"), Number of NAI realm names is set to 1 (1116"), NAI #1 Realm name length is set to 12 (1118"), NAI #1 realm name is set to "SPECTRUM.COM" (1120"). The Access Point after receiving the request determines there is a match for the NAI #1 realm name "SPECTRUM.COM" and populates the NAI #1 realm name field with the SSID name "SPECTRUM MOBILE" which is the SSID name for the first network with the NAI realm name "SPECTRUM.COM". The enhanced probe response vendor specific content fields of example 3 are populated by the Access Point as follows: response type is set to 0 (1214'''), number of SSID names is set to 1 (1216'''), SSID #1 name length is set to 15 (1218"), SSID #1 Name is set to "SPECTRUM.COM" (1220''').

In the diagrams 1128, 1228, 1130, 1230, 1132, and 1232, the number of octets of which a field is comprised is shown below field.

Returning now to the exemplary method 1000, in this exemplary method the SSID name query included a single NAI realm name, "SERVICEPROVIDER1.COM" which corresponds to a first network supported by the Access Point. In this example, the first SSID name corresponding to the first network which the Access Point included in the enhanced Probe Response is SP1-SSID.

The determined SSID name for the first network based on the criterion provided in the first enhanced Probe Request, e.g., the NAI realm name, is SP1-SSID and this is the SSID name included in the first enhanced Probe Response by the first Access Point. The first Access Point transmits the generated first enhanced Probe Response to the mobile device in response to the first enhanced Probe Request.

As previously discussed in sub-step 1036, the mobile device receives the first enhanced Probe Response from the first Access Point.

In sub-step 1038, the mobile device determines the first SSID name from the enhanced Probe Response received from the first Access Point. In various embodiments, the enhanced Probe Response includes a vendor specific content field. In some embodiments sub-step 1038 includes sub-step 1040. In sub-step 1040, the mobile device extracts the first SSID name from the vendor specific content field of the first enhanced Probe Response. The first SSID name corresponding to the first network being included in the vendor specific content field of the first enhanced Probe Response by the first Access Point.

In sub-step 1042, the mobile device identifies the first SSID name for the first network by comparing the obtained list of supported service providers subscription network address identifier realm names which was obtained in sub-step 1028 to a list of pre-provisioned network address identifier realm names for which corresponding SSID names have been pre-provisioned on the mobile device. FIG. 16 illustrates a table 1600 of records which includes provisioned NAI realm names, credentials and SSID names. Each of rows 1608, 1610, 1612, . . . , 1616 being a separate record including the NAI realm name, credential information and SSID name for a WLAN network.

Step 1026 continues onto FIG. 10C where the continuation of step 1026 is shown as 1026' which includes sub-step 1044.

In sub-step 1044, the mobile device while operating in an enhanced public action frame mode of operation determines, a first SSID name for the first network advertised by the first beacon frame for which the mobile device is provisioned using a hidden SSID query procedure. The hidden SSID query procedure utilizing an enhanced public action frame request, e.g., a unicast Generic Advertisement Service Public Action Frame Request, including an SSID query message transmitted over the air from the mobile device to the first Access Point requesting the SSID name of the first network. In some embodiments, sub-step 1044 includes one or more sub-steps 1046, 1048, 1050, 1054, and 1056.

In sub-step 1046, the mobile device obtains a list of service provider subscription Network Address Identifier (NAI) realm names from the first Access Point using a Generic Advertisement Service Query. The list of service provider subscription NAI realm names being service provider NAI realm names being supported by the first Access point, e.g., service provider NAI realm names corresponding to WLAN networks supported by the first Access Point, e.g., for which the first Access Point is providing network services, e.g., access, connection and/or authentication services.

In sub-step 1048, the mobile device identifies a service provider NAI realm name corresponding to the first network by comparing the list of service provider subscription network address identifier (NAI) realm names obtained from the first Access Point to a list of service provider NAI realm names provisioned or pre-provisioned on the mobile device, e.g., in step 1004. FIG. 15 illustrates an exemplary table 1500 of records including NAI realm names provisioned on a mobile device.

In sub-step 1050, the mobile device transmits a first enhanced Public Action Frame request to the first Access Point. The first enhanced Public Action Frame Request includes an SSID name query with a set of criterion (e.g., the set of criterion including one or more Network Access Identifier (NAI) realm names). The one or more NAI realm names in the set of criterion including a first NAI realm name corresponding to the first network. In some embodiments sub-step 1050 includes sub-step 1052. In sub-step 1052, the mobile device transmits a unicast Generic Advertisement Service (GAS) Public Action Frame Request including an Access Network Query Protocol (ANQP) vendor specific content field. The ANQP vendor specific content field including a SSID name query with a set of criterion.

Prior to transmitting the first enhanced public action frame request, the mobile device generates the first enhanced public action frame request by including the SSID name query with the set of criterion in the vendor specific content field of the first enhanced public action frame request. The SSID name query with the set of criterion is based on credential information provisioned in the mobile device and/or on information received from the first Access Point, e.g., information received in the first beacon frame.

Diagram 1800 shown in FIG. 18 illustrates an exemplary enhanced public action request implemented as a GAS/ANQP frame request including an ANQP vendor specific list/element 1804 implemented in accordance with an embodiment of the present invention. Diagram 1800 in FIG. 18 includes a diagram of a GAS frame structure 1801. The GAS frame structure includes the GAS frame 1802 and ANQP elements 1803. Diagram 804 also illustrates an enhanced ANQP vendor specific list/element 1804. The enhanced GAS frame ANQP vendor specific element 1804 has been modified to include enhanced vendor-specific content ANQP fields with SSID name query fields as shown in diagram 1813. The enhanced GAS frame ANQP vendor-specific list/element includes the following fields: INFO ID field 1806, length field 1808, organization identifier field 1810, vendor-specific content field 1812. The vendor-specific content field 1812 has been enhanced as shown in diagram 1813 to include the following fields: query type field 1814, number of NAI realms field 1816 (where in this example N is the positive integer number NAI realms), NAI #1 realm name length field 1818, NAI #1 realm name field 1820, . . . , NAI #N realm name length field 1822, and NAI #N realm name field 1824, where N is a positive integer greater than 1. The octets for each of the fields has also been shown below the fields in the diagrams 1804, 1813, 1828. As shown in legend 1826, the query type can have a value of 0-255 with 0 indicating a query for SSID name, and in this example, values 1-255 being reserved for future use.

Diagram 1828 of FIG. 18 illustrates an exemplary enhanced public action frame request which is a enhanced GAS frame request with enhanced ANQP vendor-specific content fields wherein the query type field is set to 0 (1814'), the number of NAI realms field is set to 2 (1816'), the NAI #1 realm name length field is set to 20 (1818'), the NAI #1 realm name field is set to "SERVICEPROVIDER1.COM" (1820'), the NAI #2 realm name length field is set to 20 (1822') and the NAI #2 realm name is set to "SERVICEPROVIDER2.NET" (1124'). The first NAI name realm having a NAI which is "SERVICEPROVIDER1" and the realm is "COM". The second NAI name realm having an NAI which is "SERVICEPROVIDER2" and the realm is "NET". In this example, the NAI #1 realm name and NAI #2 realm name have been provisioned in the mobile device, e.g., as described in step 1004.

In sub-step 1054, the mobile device receives a first enhanced Public Action Frame Response, e.g., a unicast Generic Advertisement Service (GAS) Public Action Frame Response including an Access Network Query Protocol (ANQP) vendor specific content field from the first Access Point in response to the first enhanced Public Action frame request.

Prior to sub-step 1054, the first Access Point, upon receiving the first enhanced public action frame request, extracts and processed the SSID name query with the set of criterion from the first enhanced Public Action Frame Request. The first Access Point uses the set of criterion, e.g., the NAI realms to identify the corresponding SSID names for each of the networks. In this example, the set of criterion is the NAI realm name for the first network, e.g., SERVICEPROVIDER1.COM. In some embodiments, the first Access Point compares the set of criterion for each SSID name query to information contained in a set of records it maintains in memory for WLAN networks it is providing services for. The records include the SSID name of the network and the corresponding set of criterion.

As described above, table 1700 of FIG. 17 illustrates a table with the rows 1708, 1710, 1712, 1714, 1716 of the table being a record containing a NAI realm name and corresponding SSID name. The first Access Point in some embodiments includes table 1700 or a similar set of records in its memory. The first Access Point determines the SSID name for the first network based on comparing the criterion provided in the SSID name query, the NAI realm name for the first network to each of the set of NAI realm name records and determines the SSID name with the matching NAI realm name provided in the query is SP1-SSID which has a NAI realm name of SERVICEPROVIDER1.COM as previously discussed and shown in table 1700.

The first Access Point generates a first enhanced Public Action Frame Response which includes a response to the SSID name query. The SSID name determined for each set of criterion provided in the first enhanced Public Action Frame Request is included in the first enhanced Public Action Frame Response. The first Access Point includes the SSID name in a vendor-specific content field of the first enhanced Public Action Frame Response. FIG. 19 illustrates an example of an enhanced Public Action Frame Response vendor specific element in accordance with an embodiment of the present invention.

Diagram 1900 shown in FIG. 19 includes diagrams 1901, 1904, 1913 and 1928. Diagram 1901 illustrates a GAS frame structure including GAS frame 1902 and ANQP elements 1903. Diagram 1904 shown in FIG. 19 illustrates an exemplary enhanced public action frame response ANQP vendor specific list/element implemented in accordance with an embodiment of the present invention. The enhanced public action frame response is a GAS/ANQP public action frame response. The enhanced public action frame response vendor specific element 1904 has been modified to include enhanced vendor-specific content fields with SSID name query response fields as shown in diagram 1913. The enhanced public action frame request vendor-specific list/element includes the following fields: INFO ID field 1906, length field 1908, organization identifier field 1910, vendor-specific content field 1912. The vendor-specific content field 1912 has been enhanced as shown in diagram 1913 to include the following fields: response type field 1914, number of SSID names field 1916 (where in this example N is the positive integer number of SSID names), SSID #1 name length field 1918, SSID #1 name field 1920, . . . , SSID #N name length field 1922, and SSID #N name field 1924, where N is a positive integer greater than 1. The octets for each of the fields has also been shown below the fields in the diagrams 1904, 1913, 1928. As shown in legend 1926, the response type can have a value of 0-255 with 0 indicating a response to a SSID name query, and in this example, values 1-255 are reserved for future use.

Examples of how to fill in or populate the fields of the enhanced public action frame request vendor-specific content fields and enhanced public action frames response vendor-specific content fields will now be discussed in connection with three examples. The example 1 SSID name query is shown in diagram 1828 in FIG. 18. The example 1 SSID name query response is shown in diagram 1928 shown in FIG. 19. The example 2 SSID name query is shown in diagram 1830 in FIG. 20. The example 2 SSID name query response is shown in diagram 1930 shown in FIG. 20. The example 3 SSID name query is shown in diagram 1832 in FIG. 21. The example 3 SSID name query response is shown in diagram 1932 shown in FIG. 21. These different examples shown how to populate the fields under different conditions. In example 1 there are two networks for which the user equipment device is provisioned with credentials and both are supported by the Access Point. In the second example, there are two networks for which the user equipment device is provisioned but only the second network is supported by the Access Point. In the third example, the SSID name query includes only criterion for a single network (e.g., the NAI realm name of SPECTRUM.COM) which is supported by the Access Point. The NAI realm name and SSID name being changed to illustrate the corresponding changes in the populated fields.

Diagram 1928 of FIG. 19 illustrates an exemplary enhanced pubic action frame response vendor-specific content entry that has been populated wherein the response type field is set to 0 (1914'), the number of SSID names is set to 2 (1916'), the SSID #1 name length field is set to 8 (1918'), the SSID #1 name field is set to "SP1-SSID" (1920'), the SSID #2 name length field is set to 8 (1922') and the SSID #2 name is set to "SP2-SSID" (1924'). This exemplary enhanced public action frame response vendor specific content fields are a response to the enhanced public action frame request vendor specific content fields shown in diagram 1828 in FIG. 18. SSID #1 name corresponding to the NAI #1 realm name, SSID #2 name corresponding to the NAI #2 realm name. In this example, the NAI #1 realm name and NAI #2 realm name have been provisioned in the mobile device, e.g., as described in step 1004 and are both supported by the Access Point hence both are included in the SSID name query and the SSID name query response.

Figure 20:
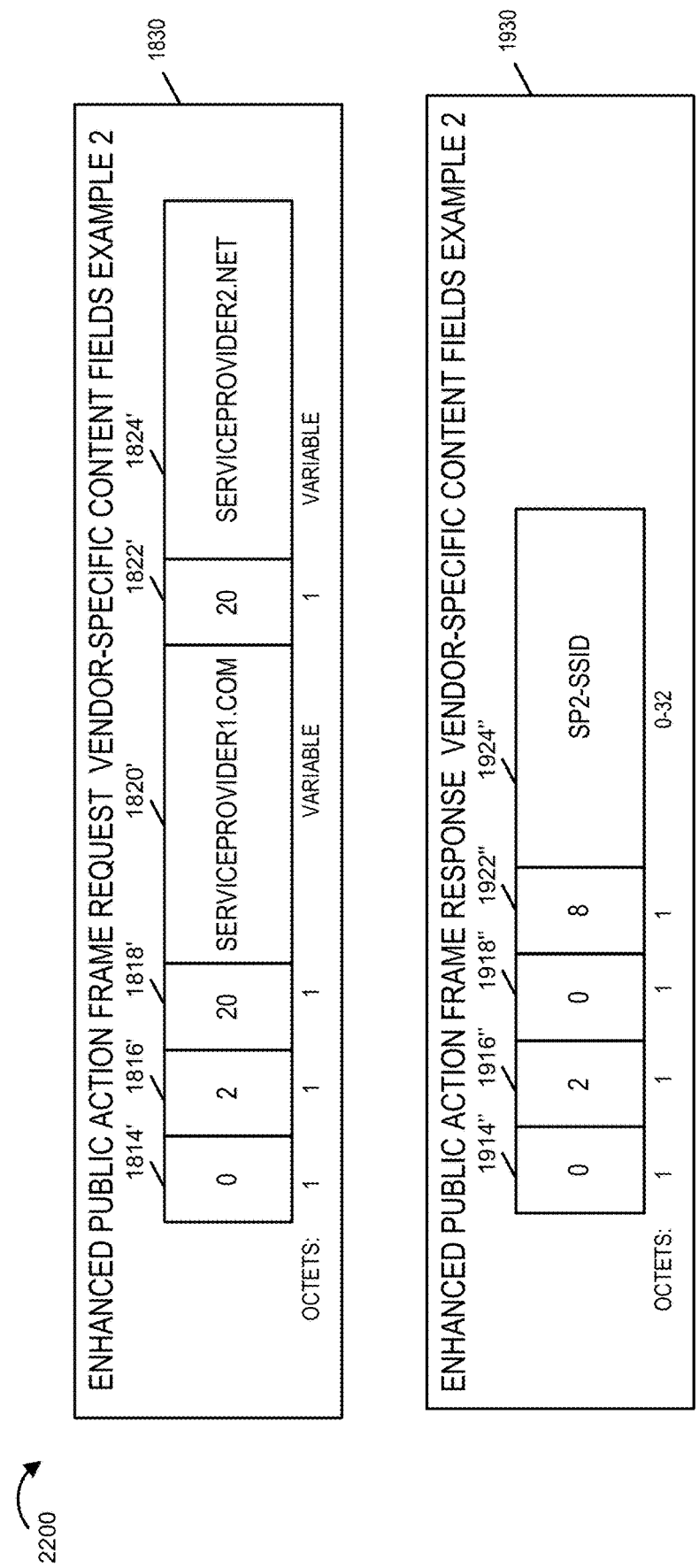
FIG. 20 illustrates another example of populated enhanced public action frame request vendor-specific content fields and another example of populated enhanced public action frame response vendor-specific content fields in accordance with an embodiment of the present invention.

Diagram 2200 in FIG. 20 illustrates a second enhanced public action frame request vendor-specific content fields example 1830 and a second enhanced public action frame response vendor-specific content fields example 1930 which is a response to the request 1830. In this second example, the user equipment device or mobile device which sends the request with the SSID name query has credentials for two networks a first network with NAI realm name "SERVICEPROVIDER1.COM" and a second network with NAI realm name SERVICEPROVIDER2.NET. The Access Point does not support the first network with NAI #1 realm name of SERVICEPROVIDER1.COM but does support the second network with NAI #2 realm name of SERVICEPROVIDER2.NET. In the second exemplary user equipment device or mobile device populates the enhanced public action frame request vendor-specific content fields as follows: query type set to 0 (1814'), Number of NAI realm names is set to 2 (1816'), NAI #1 Realm name length is set to 20 (1818'), NAI #1 realm name is set to "SERVICEPROVIDER1.COM" (1820'), NAI #2 realm name length is set to 20 (1822'), and NAI #2 realm name is set to "SERVICEPROVIDER2.NET". The Access Point which receives the request and determines there is no match for the NAI #1 realm name "SERVICEPROVIDER1.COM" and sets the NAI #1 realm name length field to a value of zero. The Access Point also determines there is a match for the NAI #2 realm name "SERVICEPROVIDER2.NET" and populates the NAI #2 realm name field with the SSID name "SP2-SSID" which is the SSID name for the second network with the NAI realm name "SERVICEPROVIDER2.NET". The enhanced public action frame response vendor specific content fields of example 2 are populated by the Access Point as follows: response type is set to 0 (1914"), number of SSID names is set to 2 (1916"), SSID #1 name length is set to 0 (1918"), SSID #2 name length is set to 8 (1922"), SSID #2 Name is set to "SP2-SSID" (1924"). The response keeps the SSID names in the same order as in the received SSID name query.

Diagram 2300 in FIG. 21 illustrates a third enhanced public action frame request vendor-specific content fields example 1832 and a third enhanced public action frame response vendor-specific content fields example 1932 which is a response to the request 1932. In this third example, the user equipment device or mobile device which sends the request with the SSID name query has credentials for a first network with NAI realm name "SPECTRUM.COM". The Access Point supports the first network with NAI #1 realm name of "SPECTRUM.COM". In this third example, the user equipment device or mobile device populates the enhanced public action frame request vendor-specific content fields as follows: query type set to 0 (1814"), Number of NAI realm names is set to 1 (1816"), NAI #1 Realm name length is set to 12 (1818"), NAI #1 realm name is set to "SPECTRUM.COM" (1820"). The Access Point after receiving the request determines there is a match for the NAI #1 realm name "SPECTRUM.COM" and populates the NAI #1 realm name field with the SSID name SPECTRUM MOBILE which is the SSID name for the first network with the NAI realm name "SPECTRUM.COM". The enhanced public action frame response vendor specific content fields of example 3 are populated by the Access Point as follows: response type is set to 0 (1914"), number of SSID names is set to 1 (1916'''), SSID #1 name length is set to 15 (1918"), SSID #1 Name is set to "SPECTRUM.COM" (1920').

In the diagrams 1828, 1928, 1830, 1930, 1832, and 1932, the number of octets of which a field is comprised is shown below field.

Returning now to the exemplary method 1000, in this exemplary method the SSID name query included a single NAI realm name, "SERVICEPROVIDER1.COM" which corresponds to a first network supported by the Access Point. In this example, the first SSID name corresponding to the first network which the Access Point included in the enhanced Public Action Frame Response is SP1-SSID.

The determined SSID name for the first network based on the criterion provided in the first enhanced Public Action Frame Request, e.g., the NAI realm name, is SP1-SSID and this is the SSID name included in the first enhanced Public Action Frame Response by the first Access Point. The first Access Point transmits the generated first enhanced Public Action Frame Response to the mobile device in response to the first enhanced Public Action Frame Request.

As previously discussed in sub-step 1036, the mobile device receives the first enhanced Probe Response from the first Access Point.

In sub-step 1056 the mobile device determines the first SSID name of the first network from the first enhanced Public Action Frame response. In some embodiments, sub-step 1056 includes one or more sub-steps 1058 and 1060. In various embodiments, the first enhanced Public Action Frame response includes a vendor specific content field including a plurality of sub-fields in which the response to the SSID name query is included.

In sub-step 1058, the mobile device extracts the first SSID name corresponding to the first network from a vendor specific content field of the first enhanced Public Action Frame Response. The first SSID name being included in the vendor specific content field of the first enhanced Public Action Frame Response by the first Access Point.

In sub-step 1060, the mobile device extracts the first SSID name corresponding to the first network from a vendor specific content field of the first GAS Public Action Frame Response. The first SSID name being including in the ANQP vendor specific content field of the first GAS Public Action Frame Response by the first Access Point. In many embodiments, the first GAS Public Action Frame Response is a unicast message.

Operation proceeds from step 1026 via connection node B 1062 to step 1064 shown on FIG. 10D.

In step 1064, the mobile device associates with the first network via the first Access Point using the first SSID name. Operation proceeds from step 1064 to step 1066.

In step 1066, the mobile device connects to the Internet via the first network. Operation proceeds from step 1066 to step 1068.

In step 1068, the process is repeated by the mobile device when the mobile device becomes disconnected from the first network and needs to reconnect to a network for which it has been provisioned, e.g., a WLAN network, via an Access Point with a hidden SSID.

While the method 1000 has focused on discovering SSIDs for hidden SSID networks from which a user equipment device, e.g., mobile device, receives beacon frames, the method is also applicable to hidden SSID networks from which a user equipment device receives a probe response with a hidden SSID during active scanning for networks as opposed to passive scanning.

The exemplary method 1000 may be, and in some embodiments is, implemented using a set of criterion to be included in an SSID query for the first network defined by the service operator which provides the services of the first network. The set of criterion for the first network being included, e.g., stored in memory, in the mobile device during provisioning. The set of criterion for the first network being stored in the first Access Point, e.g., when initiated, activated, or updated, along with the corresponding SSID name for the first network. In this way, the set of criterion can be used as index to look up SSID name for first network by the first Access Point in response to an SSID query from a mobile device. In some such embodiments, the set of criterion can be defined for example as: (i) the NAI realm name of the service provider of the first network (as described in detail in the method 1000), (ii) the PLMN ID belonging to or corresponding to the first network and/or the service provider which provides the first network, and/or (iii) the Roaming Consortium Identifier corresponding to the first network and/or the service provider which provides the first network.

Various exemplary numbered embodiments illustrating different features of the present invention will now be discussed. The various features discussed may be used in variety of different combinations. The numbered embodiments are only exemplary and are not meant to be limiting to the scope of the invention. The various method embodiments may be, and in some embodiments are, implemented on system 100 of FIG. 1.

List of Exemplary Numbered Method Embodiments

Method Embodiment 1. A communications method comprising: receiving, at a mobile device, a first beacon frame having a Service Set Identifier (SSID) field set to NULL from a first Access Point; determining, at the mobile device, based on information received from the first Access Point that the mobile device is provisioned to connect to a first network advertised by the first beacon frame; and discovering, by the mobile device, a first SSID name for the first network advertised by the first beacon frame for which the mobile device is provisioned.

Method Embodiment 2. The communications method of Method Embodiment 1, wherein said discovering, by the mobile device, a first SSID name for the first network advertised by the first beacon frame for which the mobile device is provisioned includes: (i) transmitting, by the mobile device, a first enhanced probe request to the first Access Point, said first enhanced probe request including a SSID name query with a set of criterion; (ii) receiving, by the mobile device, a first enhanced probe response from the first Access Point in response to said first probe request; and (iii) determining said first SSID name from the first enhanced probe response.

Method Embodiment 2A. The communications method of Method Embodiment 2, further comprising: initiating, by the mobile device, an SSID discovery procedure in response to receiving the first beacon frame having a Service Set Identifier (SSID) field set to NULL from the first Access Point.

Method Embodiment 2B. The communications method of Method Embodiment 2, wherein said first enhanced probe request is generated using information contained in or derived from the first beacon frame, e.g., frequency spectrum on which the first beacon frame was received, timing information included in the beacon frame, AP address information included in the first beacon frame.

Method Embodiment 3. The communications method of Method Embodiment 2, wherein the set of criterion included in the first enhanced probe request includes one or more subscription identifiers.

Method Embodiment 3A. The communications method of Method Embodiment 3, wherein the one or more subscription identifiers include a first subscription identifier (e.g., NAI/realm name, PLMN ID, Roaming Consortium ID) corresponding to or belonging to a first service provider which provides the first network.

Method Embodiment 3A1. The communications method of Method Embodiment 3A, wherein the first subscription identifier is part of subscription credentials corresponding to the first service provider and/or the first network.

Method Embodiment 3A2. The communications method of Method Embodiment 3A, wherein the first Access Point utilizes the first subscription identifier to determine whether or not to provide the SSID name for the first network to the mobile device in response to the first enhanced probe request.

Method Embodiment 3A3. The communications method of Method Embodiment 3A, wherein the first network is a Wireless Local Area Network; and wherein the first service provider is a mobile network operator.

Method Embodiment 3B. The communications method of Method Embodiment 3A, wherein the one or more subscription identifiers includes a first subscription identifier, a second subscription identifier and a third subscription identifier; wherein said first subscription identifier is different than said second subscription identifier; wherein said first subscription identifier is different than said third subscription identifier; wherein said second subscription identifier is different than said third subscription identifier; wherein said first subscription identifier and said second subscription identifier belong to the first service provider; and wherein the third subscription identifier belongs to a second service provider, said second service provider being different than said first service provider.

Method Embodiment 3C. The communications method of Method Embodiment 2, wherein the first Access Point utilizes the first set of criterion to determine whether or not to provide the SSID name for the first network to the mobile device in response to the first enhanced probe request.

Method Embodiment 3C1. The communications method of Method Embodiment 3C, wherein the first Access Point makes the determination to provide the mobile device the SSID name for the first network when the first set of criterion include information (e.g., NAI/realm, PLMN ID, and/or Roaming Consortium ID) corresponding to the first network (e.g., NAI/realm, PLMN ID, and/or Roaming Consortium ID which belongs to or corresponds to the service provider of the first network).

Method Embodiment 4. The communications method of Method Embodiment 3, wherein the one or more subscription identifiers in the first enhanced probe request are service provider subscription identifiers, each of said service provider subscription identifiers being one of the following: a Network Access Identifier (NAI) realm name, a Public Land Mobile Network (PLMN) Identifier, or a Roaming Consortium Identifier (RCI).

Method Embodiment 5. The communications method of Method Embodiment 4, wherein the one or more service provider subscription identifiers includes a first service provider subscription identifier, said first service provider subscription identifier corresponding to or belonging to a first service provider that provides the first network.

Method Embodiment 5A. The communications method of Method Embodiment 5, wherein the first service provider subscription identifier is a first NAI realm name, the first NAI realm name corresponding to or belonging to the first service provider which provides the first network.

Method Embodiment 5B. The communications method of Method Embodiment 2, wherein the SSID name query with the set of criterion are included in a vendor specific content field of the first enhanced probe request.

Method Embodiment 5C. The communications method of Method Embodiment 2, wherein said first SSID name is included in a vendor specific content field of the first enhanced probe response.

Method Embodiment 6. The communications method of Method Embodiment 1, wherein said discovering, by the mobile device, a first SSID name for the first network advertised by the first beacon frame for which the mobile device is provisioned includes: (i) obtaining, by the mobile device, a list of service provider subscription identifiers from the first Access Point using a Generic Advertisement Service query, said list of service provider subscription identifiers being service provider subscription identifiers supported by the first Access Point; and (ii) identifying the first SSID name for the first network by comparing the list of supported service provider subscription identifiers to a list of pre-provisioned service provider subscription identifiers for which corresponding SSID names have also been pre-provisioned on the mobile device.

Method Embodiment 6A. The communications method of Method Embodiment 6, wherein each of said service provider subscription identifiers included in the list of service provider subscription identifiers is one of the following: a Network Address Identifier (NAI) realm name, a Public Land Mobile Network (PLMN) Identifier, or a Roaming Consortium Identifier; and wherein each of the pre-provisioned service provider subscription identifiers is one of the following: a Network Address Identifier (NAI) realm name, a Public Land Mobile Network (PLMN) Identifier, or a Roaming Consortium Identifier.

Method Embodiment 7. The communications method of Method Embodiment 1, wherein said discovering, by the mobile device, a first SSID name for the first network advertised by the first beacon frame for which the mobile device is provisioned includes: (i) obtaining, by the mobile device, a list of service provider subscription identifiers from the first Access Point using a Generic Advertisement Service query, said list of service provider subscription identifiers being service provider subscription identifiers supported by the first Access Point; and (ii) identifying a service provider subscription identifier corresponding to the first network by comparing the list of service provider subscription identifiers obtained from the first Access Point to a list of service provider subscription identifiers pre-provisioned on the mobile device; (iii) transmitting, by the mobile device, an enhanced public action frame request to the first Access Point, said enhanced public action frame request including a SSID name query with a set of criterion; (iv) receiving, by the mobile device, an enhanced public action frame response from the first Access Point in response to the enhanced public action frame request; and (v) determining said first SSID name from the enhanced public action frame response.

Method Embodiment 7A. The communications method of Method Embodiment 7, wherein each of said service provider subscription identifiers included in the list of service provider subscription identifiers is one of the following: a Network Address Identifier (NAI) realm name, a Public Land Mobile Network (PLMN) Identifier, or a Roaming Consortium Identifier; and wherein each of the pre-provisioned service provider subscription identifiers is one of the following: a Network Address Identifier (NAI) realm name, a Public Land Mobile Network (PLMN) Identifier, or a Roaming Consortium Identifier.

Method Embodiment 8. The communications method of Method Embodiment 7, wherein the set of criterion included in the enhanced public action frame request includes one or more service provider subscription identifiers.

Method Embodiment 8A. The communications method of Method Embodiment 8, wherein the one or more service provider subscription identifiers includes a first service provider subscription identifier corresponding to or belonging to a first service provider which provides the first network.

Method Embodiment 8B. The communications method of Method Embodiment 8, wherein the enhanced public action frame request is a unicast Generic Advertisement Service (GAS) public action frame request including an Access Network Query Protocol (ANQP) vendor specific content field; and wherein the SSID name query with the set of criterion are included in the Access Network Query Protocol (ANQP) vendor specific content field of the unicast GAS public action frame request.

Method Embodiment 8C. The communications method of Method Embodiment 8B, wherein the enhanced public action frame response is a unicast Generic Advertisement Service (GAS) public action frame response including an Access Network Query Protocol (ANQP) vendor specific content field; and wherein the first SSID name is included in the vendor specific content field of the unicast GAS public action frame response.

Method Embodiment 1A. The communications method of Method Embodiment 1, wherein said first network is a passpoint enabled hidden wireless local area network; and wherein said mobile device is a Wi-Fi device.

Method Embodiment 1B. The communications method of Method Embodiment 1, wherein said first network is a passpoint enabled hidden wireless local area network; and wherein said mobile device is a smartphone with Wi-Fi capability.

Method Embodiment 9 The communications method of Method Embodiment 1, further comprising: associating, by the mobile device, with the first network via the first Access Point using the first SSID name.

Method Embodiment 10. The communications method of Method Embodiment 1, further comprising: connecting, by the mobile device, to the Internet via the first network.

Method Embodiment 11. The communications method of Method Embodiment 1, wherein the first beacon frame received by the mobile device is received from a first Access Point prior to the mobile device associating with the first Access Point.

Method Embodiment 11A. The communications method of Method Embodiment 11, wherein the first Access Point is a Hotspot 2.0 Passpoint Access Point, said Hotspot 2.0 Passpoint Access Point being an Access Point that supports IEEE 802.11u standard based protocol to enable network discovery.

Method Embodiment 11A1 The communications method of Method Embodiment 11A, wherein the first Access Point further includes enhanced network discovery routines for discovering hidden SSID network names.

Method Embodiment 11B. The communications method of Method Embodiment 11A, further comprising: advertising, by the first Access Point, available network services at regular intervals by broadcasting beacon frames, said beacon frames having a hidden SSID, said hidden SSID including an SSID field set to NULL; and wherein said first beacon frame having a Service Set Identifier (SSID) field set to NULL received by the mobile device is one of said beacon frames broadcasted by the first Access Point during said advertising, by the first Access Point, available network services at regular intervals by broadcasting beacon frames.

Method Embodiment 12. The communication method of Method Embodiment 9, further comprising: performing passive scanning at the mobile device prior to said associating, by the mobile device, with the first network using the first SSID name; and wherein said first beacon frame with a Service Set Identifier (SSID) field set to NULL is received by the mobile device during said passive scanning.

Method Embodiment 12A. The communications method of Method Embodiment 12, wherein said passive scanning includes performing by the mobile device, a one-by-one channel scan of each of a plurality of different channels to listen to the beacons on each of the plurality of different channels.

Method Embodiment 13. A communications method comprising: transmitting, from a first Access Point, a first beacon frame advertising a first network, said first beacon frame having a Service Set Identifier (SSID) field set to NULL;

receiving, at the first Access Point, from a mobile device a first request message including a SSID name query with a set of criterion, said first request message not including a SSID name; determining, by the first Access Point, based on the set of criterion included in the SSID name query whether or not to provide the SSID name of the first network advertised by the first beacon frame to the mobile device; and when the first Access Point determines to provide the SSID name of the first network advertised by the first beacon frame based on the set of criterion included in the SSID name query, transmitting a first response message to the mobile device including a SSID query name response including the SSID name of the first network.

Method Embodiment 14. The communications method of Method Embodiment 13, further comprising: when the first Access Point determines not to provide the SSID name of the first network advertised by the first beacon frame based on the set of criterion included in the SSID name query, transmitting a first response message to the mobile device which includes a SSID query name response that does not include the SSID name of the first network.

Method Embodiment 15. The communications method of Method Embodiment 13, wherein the first Access Point is a Passpoint hotspot 2.0 Access Point with hidden SSID name enabled; and wherein the first network advertised by the first Access Point is a Wireless Local Area Network (WLAN).

Method Embodiment 16. The communications method of Method Embodiment 13, wherein said set of criterion included in the SSID name query includes one or more service provider identifiers.

Method Embodiment 17. The communications method of Method Embodiment 16, wherein said one or more service provider identifiers includes a first service provider identifier corresponding to or belonging to a first service provider which provides the first network.

Method Embodiment 18. The communications method of Method Embodiment 16, wherein each of said one or more service provider identifiers is one of the following: a Network Access Identifier (NAI) realm name, a Public Land Mobile Network (PLMN) Identifier, or a Roaming Consortium Identifier (RCI).

Method Embodiment 19. The communications method of Method Embodiment 16, wherein said first request message is a first enhanced probe request; and wherein said first response message is a first enhanced probe response.

Method Embodiment 20. The communications method of Method Embodiment 16, wherein said first request message is a first enhanced public action frame message; and wherein said first response message is a first enhanced public action frame response message.

Method Embodiment 21. The communications method of Method Embodiment 13, wherein the SSID name query with the set of criterion are included in a vendor specific content field of the first request message.

Method Embodiment 22. The communications method of Method Embodiment 21, wherein said SSID name of the first network is included in a vendor specific content field of the first response message when the first Access Point determines to provide the SSID name of the first network advertised by the first beacon frame based on the set of criterion included in the SSID name query.

Method Embodiment 23. The communications method of Method Embodiment 13, wherein said first request message is received at the first Access Point prior to the mobile device associating with the first Access Point.

Method Embodiment 24. The communications method of Method Embodiment 17 and 18, wherein the mobile device is pre-provisioned with a service provider identifier and subscription credentials corresponding to the first network but not the SSID name of the first network.

List of Exemplary Numbered System Embodiments

System Embodiment 1. A communications system comprising: a mobile device, said mobile device including: a memory; and a first processor that controls the mobile device to perform the following operations: receiving, at the mobile device, a first beacon frame having a Service Set Identifier (SSID) field set to NULL from a first Access Point; determining, at the mobile device, based on information received from the first Access Point that the mobile device is provisioned to connect to a first network advertised by the first beacon frame; discovering, by the mobile device, a first SSID name for the first network advertised by the first beacon frame for which the mobile device is provisioned.

System Embodiment 2. The communications system of System Embodiment 1, wherein said discovering, by the mobile device, a first SSID name for the first network advertised by the first beacon frame for which the mobile device is provisioned includes: (i) transmitting, by the mobile device, a first enhanced probe request to the first Access Point, said first enhanced probe request including a SSID name query with a set of criterion; (ii) receiving, by the mobile device, a first enhanced probe response from the first Access Point in response to said first probe request; and (iii) determining said first SSID name from the first enhanced probe response.

System Embodiment 2A. The communications system of System Embodiment 2, wherein the first processor further controls the mobile device to perform the operation of: initiating, by the mobile device, an SSID discovery procedure in response to receiving the first beacon frame having a Service Set Identifier (SSID) field set to NULL from the first Access Point.

System Embodiment 2B. The communications method of System Embodiment 2, wherein said first enhanced probe request is generated using information contained in or derived from the first beacon frame, e.g., frequency spectrum on which the first beacon frame was received, timing information included in the beacon frame, AP address information included in the first beacon frame.

System Embodiment 3. The communications system of System Embodiment 2, wherein the set of criterion included in the first enhanced probe request includes one or more subscription identifiers.

System Embodiment 3A. The communications system of System Embodiment 3, wherein the one or more subscription identifiers include a first subscription identifier (e.g., NAI/realm name, PLMN ID, Roaming Consortium ID) corresponding to or belonging to a first service provider which provides the first network.

System Embodiment 3A1. The communications system of System Embodiment 3A, wherein the first subscription identifier is part of subscription credentials corresponding to the first service provider and/or the first network.

System Embodiment 3A2. The communications system of System Embodiment 3A, wherein the first Access Point utilizes the first subscription identifier to determine whether or not to provide the SSID name for the first network to the mobile device in response to the first enhanced probe request.

System Embodiment 3A3. The communications system of System Embodiment 3A, wherein the first network is a Wireless Local Area Network; and wherein the first service provider is a mobile network operator.

System Embodiment 3B. The communications system of System Embodiment 3A, wherein the one or more subscription identifiers includes a first subscription identifier, a second subscription identifier and a third subscription identifier; wherein said first subscription identifier is different than said second subscription identifier; wherein said first subscription identifier is different than said third subscription identifier; wherein said second subscription identifier is different than said third subscription identifier; wherein said first subscription identifier and said second subscription identifier belong to the first service provider; and wherein the third subscription identifier belongs to a second service provider, said second service provider being different than said first service provider.

System Embodiment 3C. The communications system of System Embodiment 2, wherein the first Access Point utilizes the first set of criterion to determine whether or not to provide the SSID name for the first network to the mobile device in response to the first enhanced probe request.

System Embodiment 3C1. The communications system of System Embodiment 3C, wherein the first Access Point makes the determination to provide the mobile device the SSID name for the first network when the first set of criterion include information (e.g., NAI/realm, PLMN ID, and/or Roaming Consortium ID) corresponding to the first network (e.g., NAI/realm, PLMN ID, and/or Roaming Consortium ID which belongs to or corresponds to the service provider of the first network).

System Embodiment 4. The communications system of System Embodiment 3, wherein the one or more subscription identifiers in the first enhanced probe request are service provider subscription identifiers, each of said service provider subscription identifiers being one of the following: a Network Access Identifier (NAI) realm name, a Public Land Mobile Network (PLMN) Identifier, or a Roaming Consortium Identifier (RCI).

System Embodiment 5. The communications system of System Embodiment 4, wherein the one or more service provider subscription identifiers includes a first service provider subscription identifier, said first service provider subscription identifier corresponding to or belonging to a first service provider that provides the first network.

System Embodiment 5A. The communications system of System Embodiment 5, wherein the first service provider subscription identifier is a first NAI realm name, the first NAI realm name corresponding to or belonging to the first service provider which provides the first network.

System Embodiment 5B. The communications system of System Embodiment 2, wherein the SSID name query with the set of criterion are included in a vendor specific content field of the first enhanced probe request.

System Embodiment 5C. The communications system of System Embodiment 2, wherein said first SSID name is included in a vendor specific content field of the first enhanced probe response.

System Embodiment 6. The communications system of System Embodiment 1, wherein said discovering, by the mobile device, a first SSID name for the first network advertised by the first beacon frame for which the mobile device is provisioned includes: (i) obtaining, by the mobile device, a list of service provider subscription identifiers from the first Access Point using a Generic Advertisement Service query, said list of service provider subscription identifiers being service provider subscription identifiers supported by the first Access Point; and (ii) identifying the first SSID name for the first network by comparing the list of supported service provider subscription identifiers to a list of pre-provisioned service provider subscription identifiers for which corresponding SSID names have also been pre-provisioned on the mobile device.

System Embodiment 6A. The communications system of System Embodiment 6, wherein each of said service provider subscription identifiers included in the list of service provider subscription identifiers is one of the following: a Network Address Identifier (NAI) realm name, a Public Land Mobile Network (PLMN) Identifier, or a Roaming Consortium Identifier; and wherein each of the pre-provisioned service provider subscription identifiers is one of the following: a Network Address Identifier (NAI) realm name, a Public Land Mobile Network (PLMN) Identifier, or a Roaming Consortium Identifier.

System Embodiment 7. The communications system of System Embodiment 1, wherein said discovering, by the mobile device, a first SSID name for the first network advertised by the first beacon frame for which the mobile device is provisioned includes: (i) obtaining, by the mobile device, a list of service provider subscription identifiers from the first Access Point using a Generic Advertisement Service query, said list of service provider subscription identifiers being service provider subscription identifiers supported by the first Access Point; and (ii) identifying a service provider subscription identifiers corresponding to the first network by comparing the list of service provider subscription identifiers obtained from the first Access Point to a list of service provider subscription identifiers pre-provisioned on the mobile device; (iii) transmitting, by the mobile device, an enhanced public action frame request to the first Access Point, said enhanced public action frame request including a SSID name query with a set of criterion; (iv) receiving, by the mobile device, an enhanced public action frame response from the first Access Point in response to the enhanced public action frame request; and (v) determining said first SSID name from the enhanced public action frame response.

System Embodiment 7A. The communications system of System Embodiment 7, wherein each of said service provider subscription identifiers included in the list of service provider subscription identifiers is one of the following: a Network Address Identifier (NAI) realm name, a Public Land Mobile Network (PLMN) Identifier, or a Roaming Consortium Identifier; and wherein each of the pre-provisioned service provider subscription identifiers is one of the following: a Network Address Identifier (NAI) realm name, a Public Land Mobile Network (PLMN) Identifier, or a Roaming Consortium Identifier.

System Embodiment 8. The communications system of System Embodiment 7, wherein the set of criterion included in the enhanced public action frame request includes one or more service provider subscription identifiers.

System Embodiment 8A. The communications system of System Embodiment 8, wherein the one or more service provider subscription identifiers includes a first service provider subscription identifier corresponding to or belonging to a first service provider which provides the first network.

System Embodiment 8B. The communications system of System Embodiment 8, wherein the enhanced public action frame request is a unicast Generic Advertisement Service (GAS) public action frame request including an Access Network Query Protocol (ANQP) vendor specific content field; and wherein the SSID name query with the set of criterion are included in the Access Network Query Protocol (ANQP) vendor specific content field of the unicast GAS public action frame request.

System Embodiment 8C. The communications system of System Embodiment 8B, wherein the enhanced public action frame response is a unicast Generic Advertisement Service (GAS) public action frame response including an Access Network Query Protocol (ANQP) vendor specific content field; and wherein the first SSID name is included in the vendor specific content field of the unicast GAS public action frame response.

System Embodiment 1A. The communications system of System Embodiment 1, wherein said first network is a passpoint enabled hidden wireless local area network; and wherein said mobile device is a Wi-Fi device.

System Embodiment 1, wherein said first network is a passpoint enabled hidden wireless local area network; and wherein said mobile device is a smartphone with Wi-Fi capability.

System Embodiment 9. The communications system of System Embodiment 1, wherein the first processor further controls the mobile device to perform the additional operation of: associating, by the mobile device, with the first network via the first Access Point using the first SSID name.

System Embodiment 10. The communications system of System Embodiment 1, wherein the first processor further controls the mobile device to perform the additional operation of: connecting, by the mobile device, to the Internet via the first network.

System Embodiment 11. The communications system of System Embodiment 1, wherein the first beacon frame received by the mobile device is received from a first Access Point prior to the mobile device associating with the first Access Point.

System Embodiment 11A. The communications system of System Embodiment 11, wherein the first Access Point is a Hotspot 2.0 Passpoint Access Point, said Hotspot 2.0 Passpoint Access Point being an Access Point that supports IEEE 802.11u standard based protocol to enable network discovery.

System Embodiment 11A1. The communications system of System Embodiment 11A, wherein the first Access Point further includes enhanced network discovery routines for discovering hidden SSID network names.

System Embodiment 11B. The communications system of System Embodiment 11A, wherein said first Access Point includes a second processor, said second processor controlling the first Access Point to perform the following operations: advertising, by the first Access Point, available network services at regular intervals by broadcasting beacon frames, said beacon frames having a hidden SSID, said hidden SSID including an SSID field set to NULL; and wherein said first beacon frame having a Service Set Identifier (SSID) field set to NULL received by the mobile device is one of said beacon frames broadcasted by the first Access Point during said advertising, by the first Access Point, available network services at regular intervals by broadcasting beacon frames.

System Embodiment 12. The communication system of System Embodiment 9, wherein said first processor further controls the mobile device to perform the following additional operation: performing passive scanning at the mobile device prior to said associating, by the mobile device, with the first network using the first SSID name; and wherein said first beacon frame with a Service Set Identifier (SSID) field set to NULL is received by the mobile device during said passive scanning.

System Embodiment 12A. The communications method of System Embodiment 12, wherein said passive scanning includes performing by the mobile device, a one-by-one channel scan of each of a plurality of different channels to listen to the beacons on each of the plurality of different channels.

System Embodiment 13. A communications system comprising: a first Access Point, said first Access Point including: a memory; and a first processor that controls the first Access Point to perform the following operations: transmitting, from the first Access Point, a first beacon frame advertising a first network, said first beacon frame having a Service Set Identifier (SSID) field set to NULL; receiving, at the first Access Point, from a mobile device a first request message including a SSID name query with a set of criterion, said first request message not including a SSID name; determining, by the first Access Point, based on the set of criterion included in the SSID name query whether or not to provide the SSID name of the first network advertised by the first beacon frame to the mobile device; and when the first Access Point determines to provide the SSID name of the first network advertised by the first beacon frame based on the set of criterion included in the SSID name query, transmitting a first response message to the mobile device including a SSID query name response including the SSID name of the first network.

System Embodiment 14. The communications system of System Embodiment 13, wherein the first processor further controls the first Access Point to perform the following operation: transmitting a first response message to the mobile device which includes a SSID query name response that does not include the SSID name of the first network when the first Access Point determines not to provide the SSID name of the first network advertised by the first beacon frame based on the set of criterion included in the SSID name query.

System Embodiment 15. The communications system of System Embodiment 13, wherein the first Access Point is a Passpoint hotspot 2.0 Access Point with hidden SSID name enabled; and wherein the first network advertised by the first Access Point is a Wireless Local Area Network (WLAN).

System Embodiment 16. The communications system of System Embodiment 13, wherein said set of criterion included in the SSID name query includes one or more service provider identifiers.

System Embodiment 17. The communications system of System Embodiment 16, wherein said one or more service provider identifiers includes a first service provider identifier corresponding to or belonging to a first service provider which provides the first network.

System Embodiment 18. The communications system of System Embodiment 16, wherein each of said one or more service provider identifiers is one of the following: a Network Access Identifier (NAI) realm name, a Public Land Mobile Network (PLMN) Identifier, or a Roaming Consortium Identifier (RCI).

System Embodiment 19. The communications system of System Embodiment 16, wherein said first request message is a first enhanced probe request; and wherein said first response message is a first enhanced probe response.

System Embodiment 20. The communications system of System Embodiment 16, wherein said first request message is a first enhanced public action frame message; and wherein said first response message is a first enhanced public action frame response message.

System Embodiment 21. The communications system of System Embodiment 13, wherein the SSID name query with the set of criterion are included in a vendor specific content field of the first request message.

System Embodiment 22. The communications system of System Embodiment 21, wherein said SSID name of the first network is included in a vendor specific content field of the first response message when the first Access Point determines to provide the SSID name of the first network advertised by the first beacon frame based on the set of criterion included in the SSID name query.

System Embodiment 23. The communications system of System Embodiment 13, wherein said first request message is received at the first Access Point prior to the mobile device associating with the first Access Point.

System Embodiment 24. The communications system of System Embodiments 17 and 18, wherein the mobile device is pre-provisioned with a service provider identifier and subscription credentials corresponding to the first network but not the SSID name of the first network.

List of Exemplary Numbered Non-Transitory Computer Readable Medium Embodiments

Non-transitory Computer Readable Medium Embodiment 1. A non-transitory computer readable medium including a first set of computer executable instructions which when executed by a processor of a mobile device cause the mobile to perform the steps of: receiving, at the mobile device, a first beacon frame having a Service Set Identifier (SSID) field set to NULL from a first Access Point; determining, at the mobile device, based on information received from the first Access Point that the mobile device is provisioned to connect to a first network advertised by the first beacon frame; discovering, by the mobile device, a first SSID name for the first network advertised by the first beacon frame for which the mobile device is provisioned.

Non-transitory Computer Readable Medium Embodiment 2. The non-transitory computer readable medium of Non-transitory Computer Readable Medium Embodiment 1, wherein said discovering, by the mobile device, a first SSID name for the first network advertised by the first beacon frame for which the mobile device is provisioned includes: (i) transmitting, by the mobile device, a first enhanced probe request to the first Access Point, said first enhanced probe request including a SSID name query with a set of criterion; (ii) receiving, by the mobile device, a first enhanced probe response from the first Access Point in response to said first probe request; and (iii) determining said first SSID name from the first enhanced probe response.

Non-transitory Computer Readable Medium Embodiment 3. The non-transitory computer readable medium of Non-transitory Computer Readable Medium Embodiment 2, wherein the set of criterion included in the first enhanced probe request includes one or more service provider subscription identifiers.

Non-transitory Computer Readable Medium Embodiment 3A. The non-transitory computer readable medium of Non-transitory Computer Readable Medium Embodiment 3, wherein the one or more service provider subscription identifiers includes a first service provider subscription identifier corresponding to or belonging to first service provider which provides the first network.

Non-transitory Computer Readable Medium Embodiment 3B. The non-transitory computer readable medium of Non-transitory Computer Readable Medium Embodiment 2, wherein the SSID name query with the set of criterion are included in a vendor specific content field of the first enhanced probe request.

Non-transitory Computer Readable Medium Embodiment 4. The non-transitory computer readable medium of Non-transitory Computer Readable Medium Embodiment 2, wherein said first SSID name is included in a vendor specific content field of the first enhanced probe response.

Non-transitory Computer Readable Medium Embodiment 5. The non-transitory computer readable medium of Non-transitory Computer Readable Medium Embodiment 1, wherein said discovering, by the mobile device, a first SSID name for the first network advertised by the first beacon frame for which the mobile device is provisioned includes: (i) obtaining, by the mobile device, a list of service provider subscription identifiers from the first Access Point using a Generic Advertisement Service query, said list of service provider subscription identifiers being service provider subscription identifiers supported by the first Access Point; and (ii) identifying the first SSID name for the first network by comparing the list of supported service provider subscription identifiers to a list of pre-provisioned service provider subscription identifiers for which corresponding SSID names have also been pre-provisioned on the mobile device.

Non-transitory Computer Readable Medium Embodiment 6. The non-transitory computer readable medium of Non-transitory Computer Readable Medium Embodiment 1, wherein said discovering, by the mobile device, a first SSID name for the first network advertised by the first beacon frame for which the mobile device is provisioned includes: (i) obtaining, by the mobile device, a list of service provider subscription identifiers from the first Access Point using a Generic Advertisement Service query, said list of service provider subscription identifiers being service provider subscription identifiers supported by the first Access Point; and (ii) identifying a service provider subscription identifier corresponding to the first network by comparing the list of service provider subscription identifiers obtained from the first Access Point to a list of service provider subscription identifiers pre-provisioned on the mobile device; (iii) transmitting, by the mobile device, an enhanced public action frame request to the first Access Point, said enhanced public action frame request including a SSID name query with a set of criterion; (iv) receiving, by the mobile device, an enhanced public action frame response from the first Access Point in response to the enhanced public action frame request; and (v) determining said first SSID name from the enhanced public action frame response.

Non-transitory Computer Readable Medium Embodiment 7. The non-transitory computer readable medium of Non-transitory Computer Readable Medium Embodiment 5 or 6, wherein each of said service provider subscription identifiers included in the list of service provider subscription identifiers is one of the following: a Network Address Identifier (NAI) realm name, a Public Land Mobile Network (PLMN) Identifier, or a Roaming Consortium Identifier; and wherein each of the pre-provisioned service provider subscription identifiers is one of the following: a Network Address Identifier (NAI) realm name, a Public Land Mobile Network (PLMN) Identifier, or a Roaming Consortium Identifier.

Non-transitory Computer Readable Medium Embodiment 8. A non-transitory computer readable medium including a first set of computer executable instructions which when executed by a processor of a first Access Point cause the first Access Point to perform the steps of: transmitting, from the first Access Point, a first beacon frame advertising a first network, said first beacon frame having a Service Set Identifier (SSID) field set to NULL; receiving, at the first Access Point, from a mobile device a first request message including a SSID name query with a set of criterion, said first request message not including a SSID name; determining, by the first Access Point, based on the set of criterion included in the SSID name query whether or not to provide the SSID name of the first network advertised by the first beacon frame to the mobile device; and when the first Access Point determines to provide the SSID name of the first network advertised by the first beacon frame based on the set of criterion included in the SSID name query, transmitting a first response message to the mobile device including a SSID query name response including the SSID name of the first network.

The techniques of various embodiments may be implemented using software, hardware and/or a combination of software and hardware. Various embodiments are directed to apparatus, e.g., user equipment devices, wireless devices, mobile devices, Access Points, smartphones, subscriber devices, WLAN controllers, Wireless Gateways, AAA servers, servers, nodes and/or elements. Various embodiments are also directed to methods, e.g., method of controlling and/or operating user equipment devices, wireless devices, mobile devices, Access Points, smartphones, subscriber devices, WLAN controllers, Wireless Gateways, AAA servers, servers, nodes and/or elements. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements or steps are implemented using hardware circuitry.

In various embodiments devices, e.g., user equipment devices, wireless devices, mobile devices, Access Points, smartphones, subscriber devices, WLAN controllers, Wireless Gateways, AAA servers, servers, nodes and/or elements described herein are implemented using one or more components to perform the steps corresponding to one or more methods, for example, provisioning user equipment devices, generating messages, message reception, message transmission, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more devices, servers, nodes and/or elements. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., user equipment devices, wireless devices, mobile devices, Access Points, smartphones, subscriber devices, WLAN controllers, Wireless Gateways, AAA servers, servers, nodes and/or elements, are configured to perform the steps of the methods described as being performed by the user equipment devices, wireless devices, mobile devices, Access Points, smartphones, subscriber devices, WLAN controllers, Wireless Gateways, AAA servers, servers, nodes and/or elements. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., user equipment devices, wireless devices, mobile devices, Access Points, smartphones, subscriber devices, WLAN controllers, Wireless Gateways, AAA servers, servers, nodes and/or elements, with a processor which includes a component corresponding to each of the steps of the various described methods performed by the device in which the processor is included. In some but not all embodiments a device, e.g., user equipment devices, wireless devices, mobile devices, Access Points, smartphones, subscriber devices, WLAN controllers, Wireless Gateways, AAA servers, servers, nodes and/or elements, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above. Depending on the embodiment, the computer program product can, and sometimes does, include different code for each step to be performed. Thus, the computer program product may, and sometimes does, include code for each individual step of a method, e.g., a method of controlling a device, e.g., user equipment devices, wireless devices, mobile devices, Access Points, smartphones, subscriber devices, WLAN controllers, Wireless Gateways, AAA servers, servers, nodes and/or elements. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a user equipment devices, wireless devices, mobile devices, Access Points, smartphones, subscriber devices, WLAN controllers, Wireless Gateways, AAA servers, servers, nodes and/or elements or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications method comprising:
receiving, at a mobile device, a first beacon frame having a Service Set Identifier (SSID) field set to NULL from a first Access Point;
determining, at the mobile device, based on information received from the first Access Point that the mobile device is provisioned to connect to a first network advertised by the first beacon frame; and
discovering, by the mobile device, a first SSID name for the first network advertised by the first beacon frame for which the mobile device is provisioned; and
wherein said discovering, by the mobile device, the first SSID name for the first network advertised by the first beacon frame for which the mobile device is provisioned includes:
(i) transmitting, by the mobile device, a first enhanced probe request to the first Access Point, said first enhanced probe request including a SSID name query with a set of criterion;
(ii) receiving, by the mobile device, a first enhanced probe response from the first Access Point in response to said first enhanced probe request; and
(iii) determining said first SSID name from the first enhanced probe response.

2. The communications method of claim 1,
wherein the set of criterion included in the first enhanced probe request includes one or more subscription identifiers.

3. The communications method of claim 2,
wherein the one or more subscription identifiers included in the first enhanced probe request are service provider subscription identifiers, each of said service provider subscription identifiers being one of: a Network Access Identifier (NAI) realm name, a Public Land Mobile Network (PLMN) Identifier, or a Roaming Consortium Identifier (RCI).

4. The communications method of claim 3,
wherein the one or more service provider subscription identifiers includes a first service provider subscription identifier, said first service provider subscription identifier corresponding to or belonging to a first service provider that provides the first network.

5. The communications method of claim 1, further comprising:
associating, by the mobile device, with the first network via the first Access Point using the first SSID name.

6. The communications method of claim 1, further comprising:
connecting, by the mobile device, to the Internet via the first network.

7. The communications method of claim 1,
wherein the first beacon frame received by the mobile device is received from the first Access Point prior to the mobile device associating with the first Access Point.

8. A communications method comprising:
receiving, at a mobile device, a first beacon frame having a Service Set Identifier (SSID) field set to NULL from a first Access Point;
determining, at the mobile device, based on information received from the first Access Point that the mobile device is provisioned to connect to a first network advertised by the first beacon frame; and
discovering, by the mobile device, a first SSID name for the first network advertised by the first beacon frame for which the mobile device is provisioned; and
wherein said discovering, by the mobile device, the first SSID name for the first network advertised by the first beacon frame for which the mobile device is provisioned includes:
(i) obtaining, by the mobile device, a list of service provider subscription identifiers from the first Access Point using a Generic Advertisement Service query, said list of service provider subscription identifiers being service provider subscription identifiers supported by the first Access Point; and
(ii) identifying the first SSID name for the first network by comparing the list of supported service provider subscription identifiers to a list of pre-provisioned service provider subscription identifiers for which corresponding SSID names have also been pre-provisioned on the mobile device.

9. The communications method of claim 8,
wherein the list of service provider subscription identifiers includes a first service provider subscription identifier, said first service provider subscription identifier corresponding to or belonging to a first service provider that provides the first network; and
wherein the first service provider subscription identifier is one of: a Network Access Identifier (NAI) realm name, a Public Land Mobile Network (PLMN) Identifier, or a Roaming Consortium Identifier (RCI).

10. A communications method comprising:
receiving, at a mobile device, a first beacon frame having a Service Set Identifier (SSID) field set to NULL from a first Access Point;
determining, at the mobile device, based on information received from the first Access Point that the mobile device is provisioned to connect to a first network advertised by the first beacon frame; and
discovering, by the mobile device, a first SSID name for the first network advertised by the first beacon frame for which the mobile device is provisioned; and
wherein said discovering, by the mobile device, the first SSID name for the first network advertised by the first beacon frame for which the mobile device is provisioned includes:
(i) obtaining, by the mobile device, a list of service provider subscription identifiers from the first Access Point using a Generic Advertisement Service query, said list of service provider subscription identifiers being service provider subscription identifiers supported by the first Access Point;
(ii) identifying a service provider subscription identifier corresponding to the first network by comparing the list of service provider subscription identifiers obtained from the first Access Point to a list of service provider subscription identifiers pre-provisioned on the mobile device;

(iii) transmitting, by the mobile device, an enhanced public action frame request to the first Access Point, said enhanced public action frame request including a SSID name query with a set of criterion;

(iv) receiving, by the mobile device, an enhanced public action frame response from the first Access Point in response to the enhanced public action frame request; and (v) determining said first SSID name from the enhanced public action frame response.

11. The communications method of claim 10, wherein the set of criterion included in the enhanced public action frame request includes one or more service provider subscription identifiers.

12. The communications method of claim 11, wherein said one or more service provider subscription identifiers included in the set of criterion includes a first service provider subscription identifier, said first service provider subscription identifier corresponding to or belonging to a first service provider that provides the first network; and
wherein the first service provider subscription identifier is one of: a Network Access Identifier (NAI) realm name, a Public Land Mobile Network (PLMN) Identifier, or a Roaming Consortium Identifier (RCI).

13. A communications system comprising:
a mobile device, said mobile device including:
a memory; and
a first processor that controls the mobile device to perform operations, said operations including:
receiving a first beacon frame having a Service Set Identifier (SSID) field set to NULL from a first Access Point;
determining based on information received from the first Access Point that the mobile device is provisioned to connect to a first network advertised by the first beacon frame; and
discovering a first SSID name for the first network advertised by the first beacon frame for which the mobile device is provisioned; and
wherein said discovering, the first SSID name for the first network advertised by the first beacon frame for which the mobile device is provisioned includes:
(i) transmitting a first enhanced probe request to the first Access Point, said first enhanced probe request including a SSID name query with a set of criterion;
(ii) receiving a first enhanced probe response from the first Access Point in response to said first enhanced probe request; and
(iii) determining said first SSID name from the first enhanced probe response.

14. The communications system of claim 13, wherein the set of criterion included in the first enhanced probe request includes one or more subscription identifiers.

15. The communications system of claim 14, wherein the one or more subscription identifiers included in the first enhanced probe request are service provider subscription identifiers, each of said service provider subscription identifiers being one of: a Network Access Identifier (NAI) realm name, a Public Land Mobile Network (PLMN) Identifier, or a Roaming Consortium Identifier (RCI).

16. The communications system of claim 15, wherein the one or more service provider subscription identifiers includes a first service provider subscription identifier, said first service provider subscription identifier corresponding to or belonging to a first service provider that provides the first network.

17. A communications system comprising:
a mobile device, said mobile device including:
a memory; and
a first processor that controls the mobile device to perform operations, said operations including:
receiving a first beacon frame having a Service Set Identifier (SSID) field set to NULL from a first Access Point;
determining based on information received from the first Access Point that the mobile device is provisioned to connect to a first network advertised by the first beacon frame; and
discovering a first SSID name for the first network advertised by the first beacon frame for which the mobile device is provisioned; and
wherein said discovering the first SSID name for the first network advertised by the first beacon frame for which the mobile device is provisioned includes:
(i) obtaining a list of service provider subscription identifiers from the first Access Point using a Generic Advertisement Service query, said list of service provider subscription identifiers being service provider subscription identifiers supported by the first Access Point; and
(ii) identifying the first SSID name for the first network by comparing the list of supported service provider subscription identifiers to a list of pre-provisioned service provider subscription identifiers for which corresponding SSID names have also been pre-provisioned on the mobile device.

18. The communications system of claim 17, wherein the list of service provider subscription identifiers includes a first service provider subscription identifier, said first service provider subscription identifier corresponding to or belonging to a first service provider that provides the first network; and
wherein the first service provider subscription identifier is one of: a Network Access Identifier (NAI) realm name, a Public Land Mobile Network (PLMN) Identifier, or a Roaming Consortium Identifier (RCI).

19. A communications system comprising:
a mobile device, said mobile device including:
a memory; and
a first processor that controls the mobile device to perform operations, said operations including:
receiving a first beacon frame having a Service Set Identifier (SSID) field set to NULL from a first Access Point;
determining based on information received from the first Access Point that the mobile device is provisioned to connect to a first network advertised by the first beacon frame; and
discovering a first SSID name for the first network advertised by the first beacon frame for which the mobile device is provisioned; and
wherein said discovering the first SSID name for the first network advertised by the first beacon frame for which the mobile device is provisioned includes:
(i) obtaining a list of service provider subscription identifiers from the first Access Point using a Generic Advertisement Service query, said list of service provider subscription identifiers being service provider subscription identifiers supported by the first Access Point;

(ii) identifying a service provider subscription identifier corresponding to the first network by comparing the list of service provider subscription identifiers obtained from the first Access Point to a list of service provider subscription identifiers pre-provisioned on the mobile device;

(iii) transmitting an enhanced public action frame request to the first Access Point, said enhanced public action frame request including a SSID name query with a set of criterion;

(iv) receiving an enhanced public action frame response from the first Access Point in response to the enhanced public action frame request; and (v) determining said first SSID name from the enhanced public action frame response.

20. The communications system of claim 19,
wherein the set of criterion included in the enhanced public action frame request includes one or more service provider subscription identifiers.

21. The communications system of claim 20,
wherein said one or more service provider subscription identifiers included in the set of criterion include a first service provider subscription identifier, said first service provider subscription identifier corresponding to or belonging to a first service provider that provides the first network; and
wherein the first service provider subscription identifier is one of: a Network Access Identifier (NAI) realm name, a Public Land Mobile Network (PLMN) Identifier, or a Roaming Consortium Identifier (RCI).

22. A non-transitory computer readable medium including a first set of computer executable instructions which when executed by a processor of a mobile device cause the mobile device to:

receive a first beacon frame having a Service Set Identifier (SSID) field set to NULL from a first Access Point;

determine based on information received from the first Access Point that the mobile device is provisioned to connect to a first network advertised by the first beacon frame; and discover a first SSID name for the first network advertised by the first beacon frame for which the mobile device is provisioned; and wherein said discovering the first SSID name for the first network advertised by the first beacon frame for which the mobile device is provisioned includes:

(i) obtaining a list of service provider subscription identifiers from the first Access Point using a Generic Advertisement Service query, said list of service provider subscription identifiers being service provider subscription identifiers supported by the first Access Point; and (ii) identifying the first SSID name for the first network by comparing the list of supported service provider subscription identifiers to a list of pre-provisioned service provider subscription identifiers for which corresponding SSID names have also been pre-provisioned on the mobile device.

* * * * *